United States Patent
Van Thomme

(10) Patent No.: US 11,244,376 B1
(45) Date of Patent: Feb. 8, 2022

(54) SYSTEMS AND METHODS FOR GENERATING A GIFT LIST OF ITEMS AND MANAGING DISTRIBUTION OF ITEMS FROM THE GIFT LIST OF ITEMS BY SHARING ONE OR MORE ITEMS ON AN ITEM AND PERSONAL LEVEL AMONG DIFFERENT PURCHASERS OR GROUPS OF PURCHASERS OF THE ITEMS

(71) Applicant: Giftzapz, LLC, Ankeny, IA (US)

(72) Inventor: Todd A. Van Thomme, Ankeny, IA (US)

(73) Assignee: Giftzapz, LLC, Ankeny, IA (US)

( * ) Notice: Subject to any disclaimer, the term of this patent is extended or adjusted under 35 U.S.C. 154(b) by 387 days.

(21) Appl. No.: 16/022,053

(22) Filed: Jun. 28, 2018

Related U.S. Application Data

(63) Continuation of application No. 14/555,953, filed on Nov. 28, 2014, now abandoned.

(60) Provisional application No. 61/909,615, filed on Nov. 27, 2013.

(51) Int. Cl.
  *G06Q 30/00* (2012.01)
  *G06Q 30/06* (2012.01)
(52) U.S. Cl.
  CPC ................ *G06Q 30/0633* (2013.01)
(58) Field of Classification Search
  None
  See application file for complete search history.

(56) References Cited

U.S. PATENT DOCUMENTS

| | | | |
|---|---|---|---|
| 8,442,875 B1 | 5/2013 | Cohen et al. | |
| 8,781,502 B1* | 7/2014 | Middleton | H04W 4/023 455/456.3 |
| 9,619,833 B2* | 4/2017 | Sivaraman | H04N 21/44213 |
| 9,773,273 B2* | 9/2017 | Erez | G07F 17/40 |
| 2005/0033644 A1 | 2/2005 | Veeneman et al. | |
| 2006/0080174 A1* | 4/2006 | Veeneman | G06Q 30/02 705/14.36 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Nyemaster Goode, P.C.

(57) ABSTRACT

A special programs computer, which executes the program on a non-transitory computer readable medium, stores one or more programs and the graphical user interface on a computing device with a touch screen display, a memory, at least one camera configured to input information about an item and one or more processors to execute one or more programs stored in the memory. The touch screen device is operatively connected to one or more database servers via a wired or wireless network. Unlike traditional registries, the special programs computer systems herein allow for sharing individual selected items (at the item level) off a list with one or more selected individuals and also prevents the gift receiver from being notified that the gifted item has been purchased for them until after a later date while simultaneously preventing display of the item to other users after its purchase.

18 Claims, 61 Drawing Sheets

(56) References Cited

U.S. PATENT DOCUMENTS

| | | | | |
|---|---|---|---|---|
| 2008/0228597 A1* | 9/2008 | Sondles | ............. | G06Q 30/0633 |
| | | | | 705/14.73 |
| 2009/0254453 A1 | 10/2009 | Sanguinetti et al. | | |
| 2011/0251924 A1* | 10/2011 | Savilia | ................... | G06Q 30/02 |
| | | | | 705/27.1 |
| 2012/0253972 A1* | 10/2012 | Oskolkov | .............. | G06Q 30/06 |
| | | | | 705/26.8 |
| 2012/0323728 A1* | 12/2012 | Mutukuru | ........... | G06Q 30/0241 |
| | | | | 705/26.8 |
| 2013/0191251 A1* | 7/2013 | Martin | ................... | G06Q 20/12 |
| | | | | 705/26.61 |
| 2014/0207609 A1* | 7/2014 | Earhart | .................. | G06Q 50/01 |
| | | | | 705/26.7 |
| 2014/0244369 A1* | 8/2014 | Calman | .............. | G06Q 30/0633 |
| | | | | 705/14.23 |
| 2014/0249953 A1* | 9/2014 | Sandridge | .......... | G06Q 30/0633 |
| | | | | 705/26.8 |
| 2014/0258012 A1* | 9/2014 | Zamer | ................ | G06Q 30/0601 |
| | | | | 705/26.1 |

OTHER PUBLICATIONS wiki.gis.com; "Location-based service"; Feb. 18, 2011; https://web.archive.org/web/20110218043859/http://wiki.gis.com/wiki/index.php/Location-based_service (Year: 2011).*

Josh Asch; "5 QR Code Readers for iPhone"; Nov. 9, 2010; gigaom.com/2010/11/09/5-qr-code-readers-for-iphone/ (Year: 2010).*

Victoria Colliver; "Online wish lists guiding giving Gift registries have recently proliferated on the Web, cutting down on guesswork"; Dec. 15, 1999; San Francisco Media Company (Year: 1999).*

* cited by examiner

| |
|---|
| ●●●∞ PHONE 🔾    4:21 PM    ✻ 86%🔋 |
| ❮ Back           Sign Up |
| Full Name |
| Username |
| Email |
| Password |
| Verify Password |
| Zip Code |
| |
| Profile Information<br>e.g. Clothing sizes, kids ages,<br>favorite color, etc. |
| |
| Agree to Terms of Use         ⬭ |
| |
| SIGN UP |

FIG. 3B

| Done | Item Tags | + |
|---|---|---|
| Alex | | |
| Christmas | | ✔ |
| Cole | | |
| Kari | | |
| Nathan | | |
| Taryn | | |
| Todd | | ✔ |
| Todd's Birthday | | |

FIG. 7E

| Done | Item Tags | + |
|---|---|---|

Add Tag

Tag Name
_____

Enter Description
_____

Tag Type
_____

Add      Cancel

Taryn

Todd ✓

FIG. 7F

SYSTEMS AND METHODS FOR GENERATING A GIFT LIST OF ITEMS AND MANAGING DISTRIBUTION OF ITEMS FROM THE GIFT LIST OF ITEMS BY SHARING ONE OR MORE ITEMS ON AN ITEM AND PERSONAL LEVEL AMONG DIFFERENT PURCHASERS OR GROUPS OF PURCHASERS OF THE ITEMS

CROSS-REFERENCE TO RELATED APPLICATIONS

This application is a continuation of U.S. application Ser. No. 14/555,953, filed Nov. 28, 2014, entitled "SYSTEMS AND METHODS FOR GENERATING A GIFT LIST OF ITEMS AND MANAGING DISTRIBUTION OF ITEMS FROM THE GIFT LIST OF ITEMS BY SHARING ONE OR MORE ITEMS ON AN ITEM AND PERSONAL LEVEL AMONG DIFFERENT PURCHASERS OR GROUPS OF PURCHASERS OF THE ITEMS," which claims priority to and the benefit of U.S. Provisional Application Ser. No. 61/909,615, filed Nov. 27, 2013, entitled "SYSTEMS AND METHODS FOR GENERATING A GIFT LIST OF ITEMS, MANAGING THE LIST AND SHARING ONE OR MORE ITEMS," the entire disclosures of which are hereby incorporated by reference in their entireties.

BACKGROUND OF THE INVENTION

Currently there exists the ability to create registry listings at various retailers for a given event such as a wedding or baby shower. Generally speaking, the individual or couple needs to check out specialized equipment from each individual retailer where they choose to create a listing of goods or services they would like to receive in connection with the upcoming event. As a result, when an individual wants to register and create a gift registry at an individual retailer (such as TARGET®, CRATE AND BARREL®, WILLIAMS-SONOMA®, etc.), the couple needs to travel to the retailer's physical location, use the retailer's equipment to scan the items they are interested in receiving, and input the quantity desired into the individual retailer's system. Thereafter, a potential purchaser (giftor) needs to retrieve the entire list from the individual retailer's database in order to view the listing prior to making a purchase from the items the giftee is interested in receiving. In each instance, the person or couple ("the couple") who created the list or people who may wish to purchase an item off the gift registry may access the data and readily determine how many of each item have been purchased well prior to the event actually taking place. In this manner, the gift giving enjoyment/receiving enjoyment is hindered. Take, for example, a situation involving a couple preparing for an upcoming marriage, although the exemplary embodiments are not limited thereto. The gift registry fails them for at least two reasons. The first reason is that everyone can access the registry and see all of the items the couple would like to receive. The second reason is that the couple who sets up the registry can determine at any time what items have been purchased for them. The problem with the first situation is as follows. Perhaps a couple desires some items from BLOOMINGDALES® and some items from VICTORIA'S SECRET®, the couple might not want, for example, the bride's mother to see what she would like to receive from VICTORIA'S SECRET®. However, the bride might be okay with her best friends knowing what she wants to receive as gifts from VICTORIA'S SECRET®. The problem with the second situation is that prior to the wedding, for example, the couple can go onto the gift registry and see what items have been purchased and what items have not yet been purchased. This takes away part of the surprise of opening the wedding gifts. Additionally, there is significant difficulty in creating multiple registries for multiple different categories of goods or services.

Although mobile applications may allow a user to create a listing of gift items across multiple locations using a mobile phone, these mobile applications are essentially only online or mobile versions of traditional "registries" discussed above, in the above registry creation methods, the creation of a registry suffers from similar defects in that each item on those registries, including how many items have been purchased or are still needed, also are visible to the person who created the registry well prior to the date of an event occurring, and the list of items wished for are open to everyone to see. Additionally, such systems require that the entire listing of information on the registry be shared.

BRIEF DESCRIPTION OF THE. DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. In addition, drawings are not necessarily to scale. Certain features of the invention may be exaggerated in scale or shown in schematic form in the interest of clarity and conciseness.

Figure 2A:
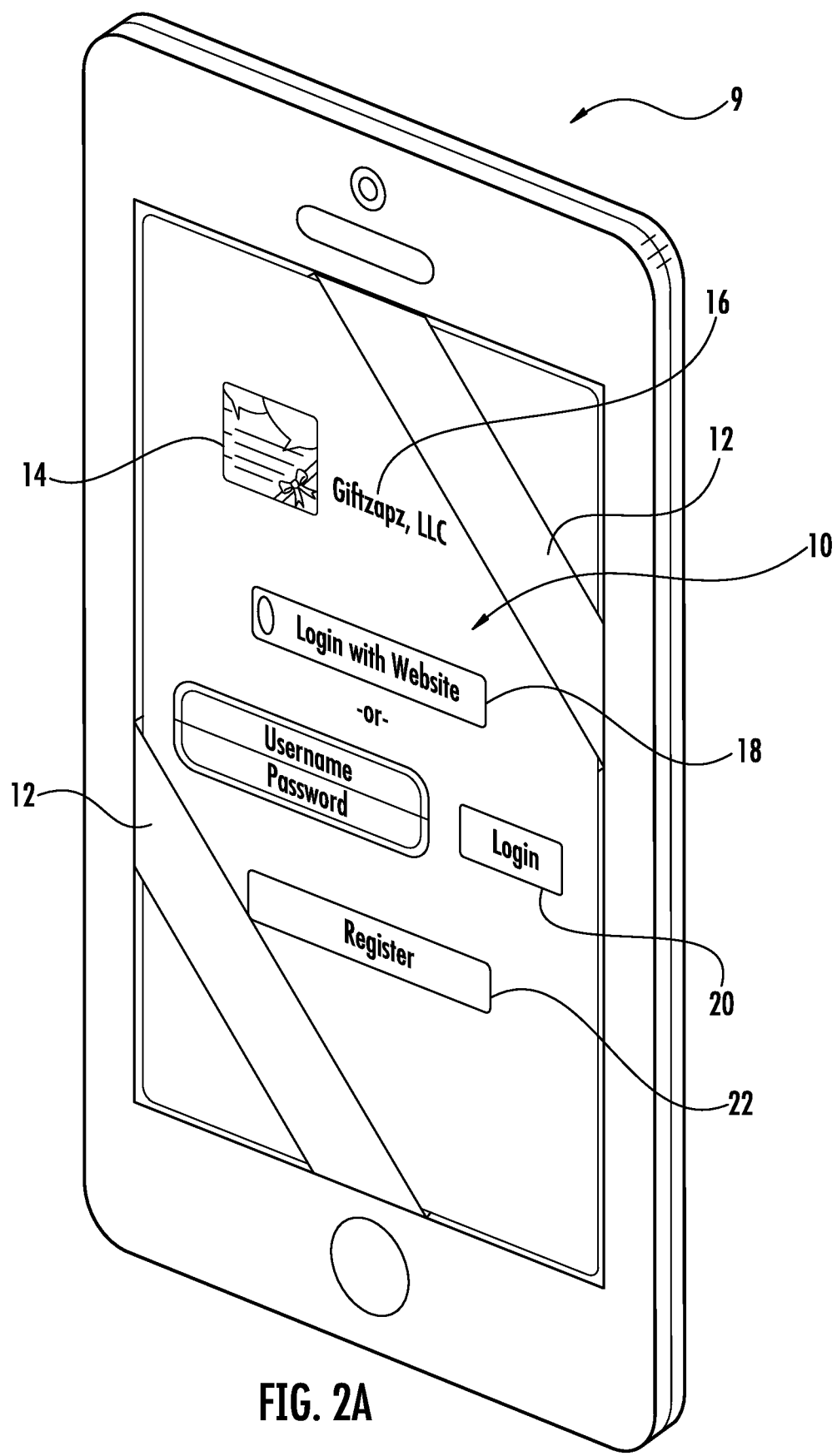
FIG. 2A is a dashboard-style landing screen shown on a mobile computing device incorporating at least one camera, typically on the back side and more typically on the front and back side of the device.
Figure 2B:
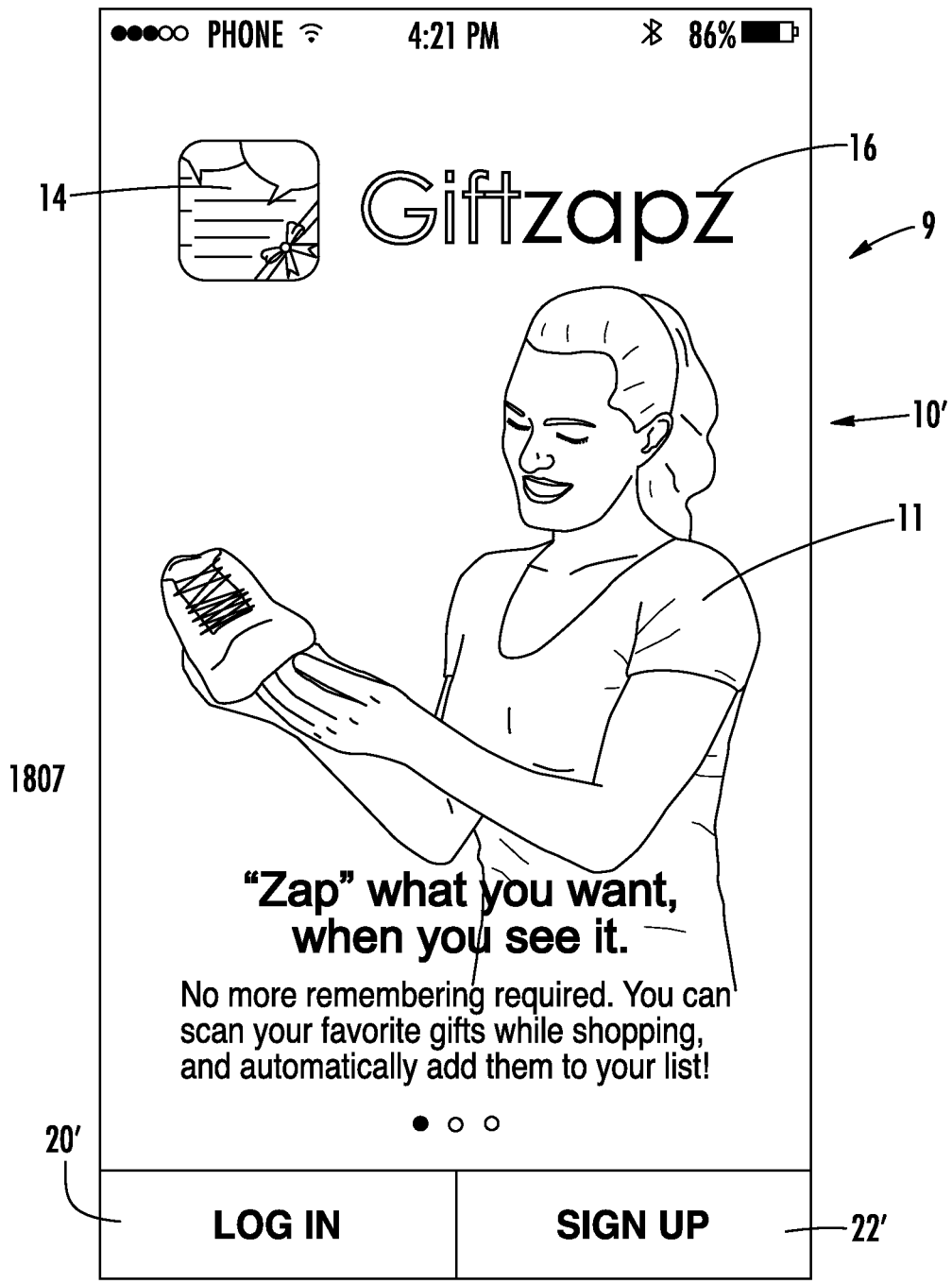
Figure 2C:
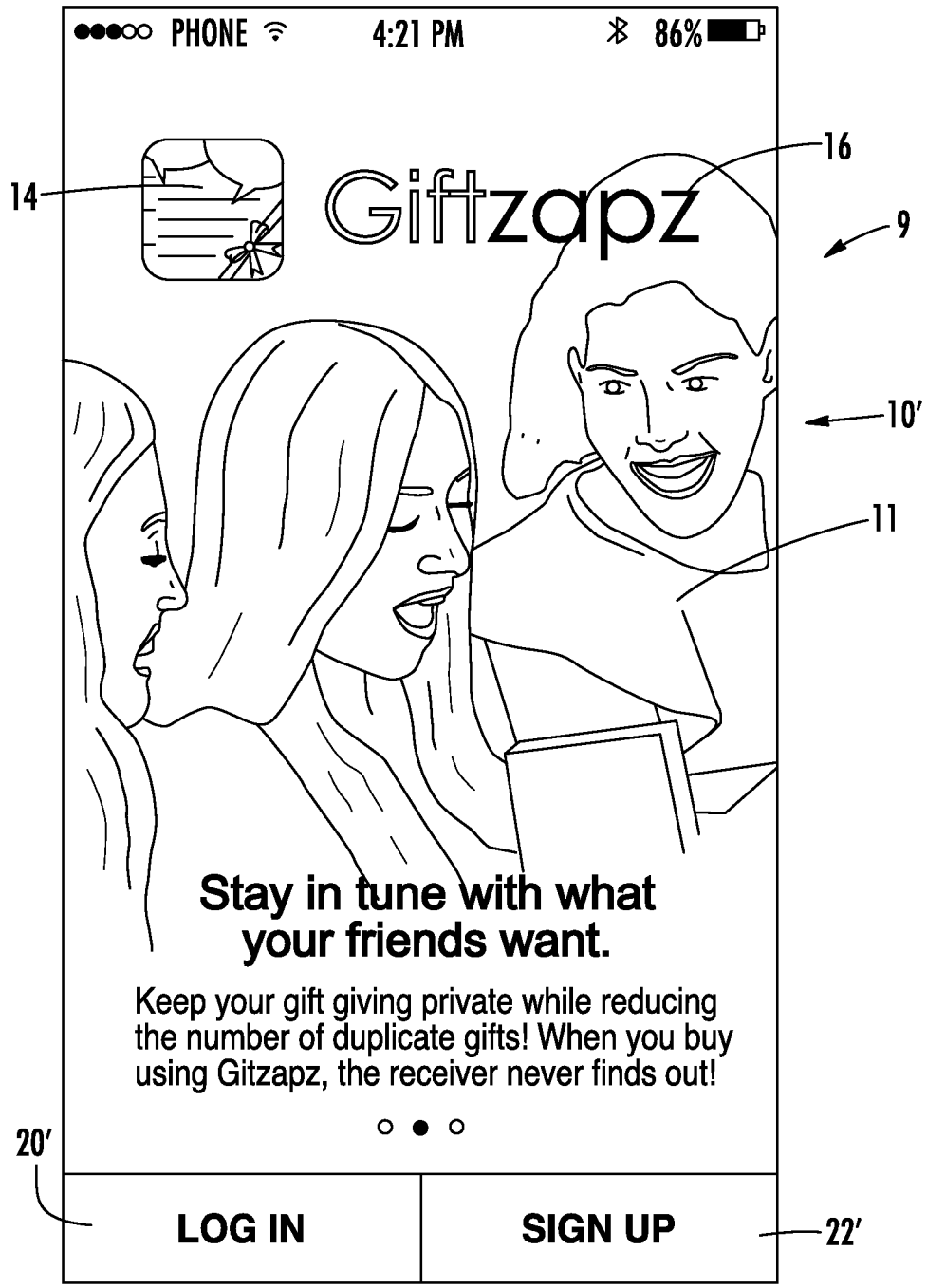
Figure 2D:
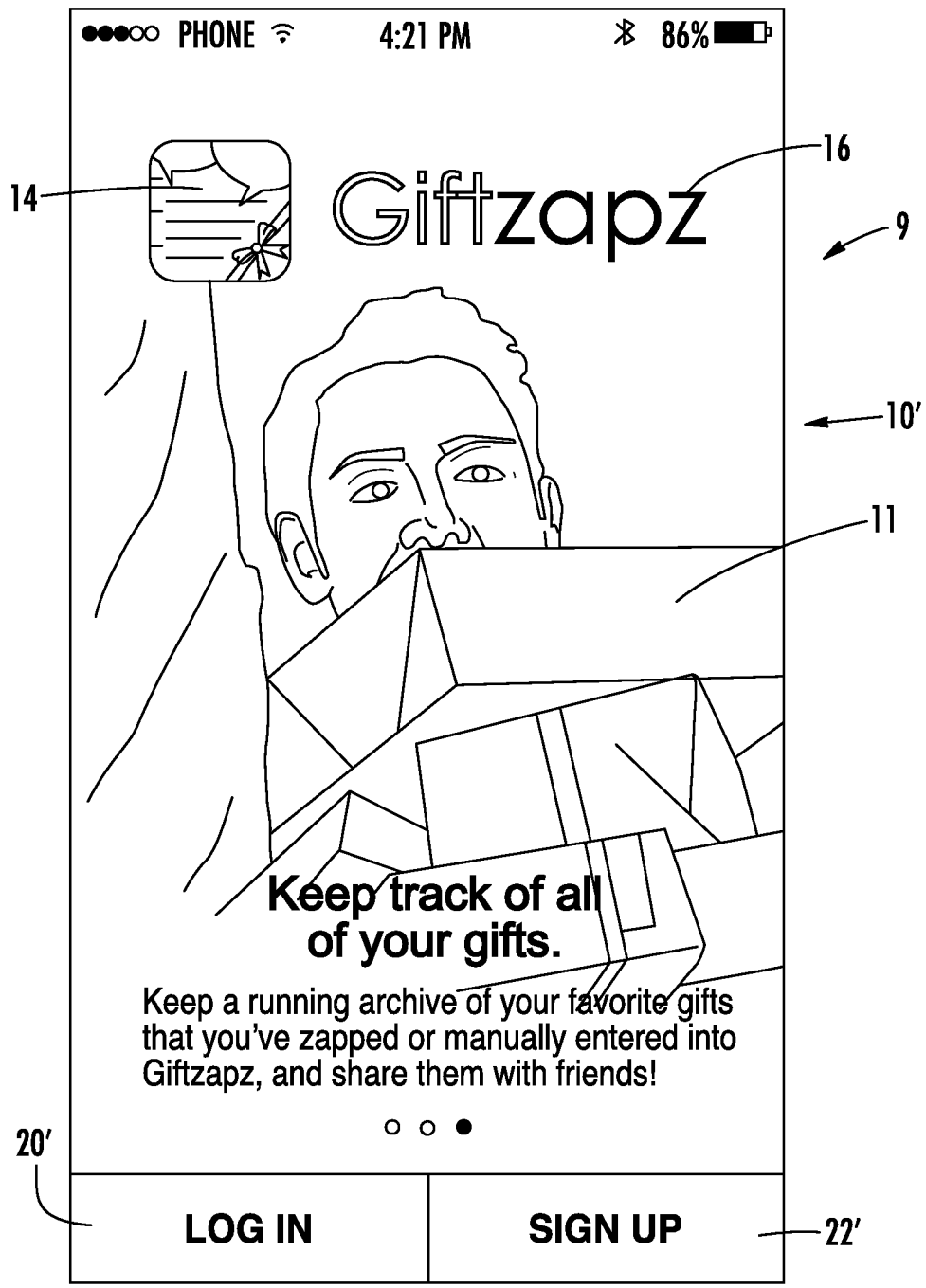
Figure 2E:
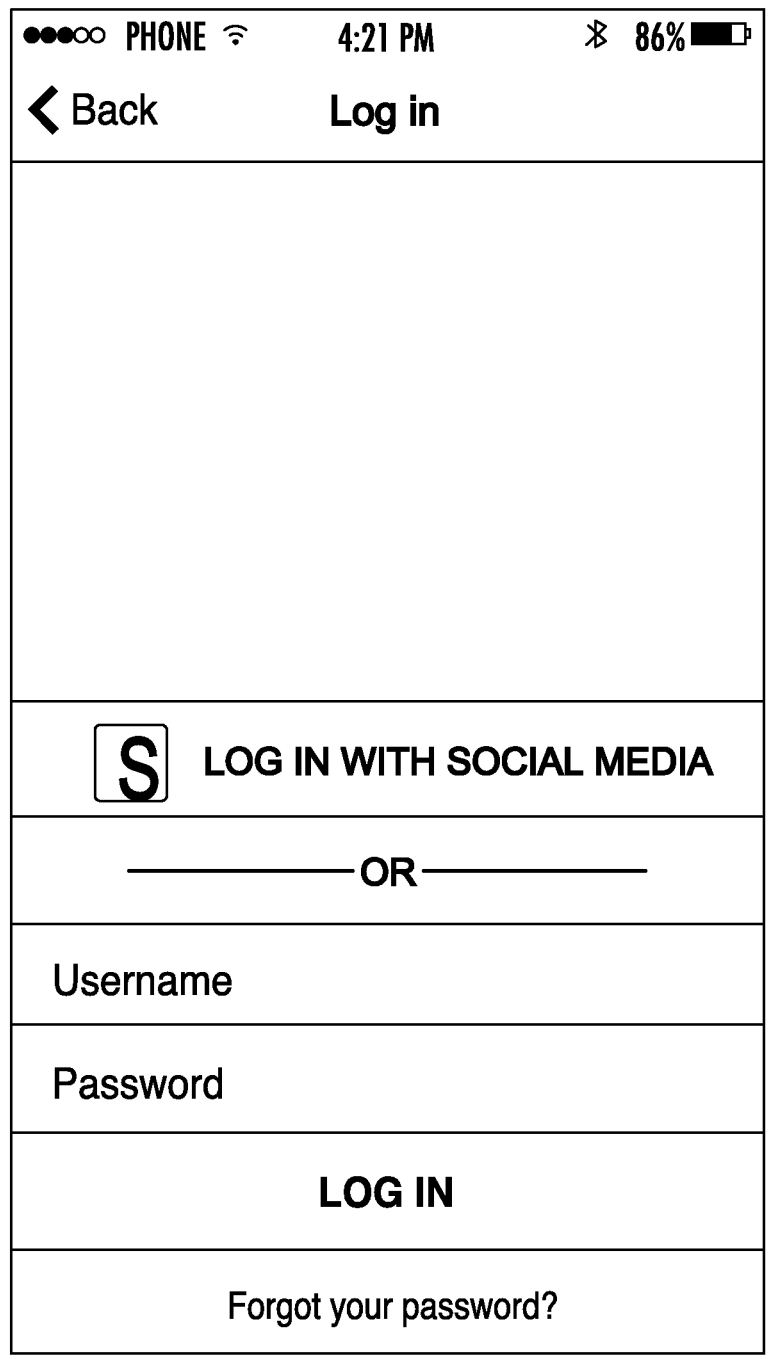
Figure 3A:
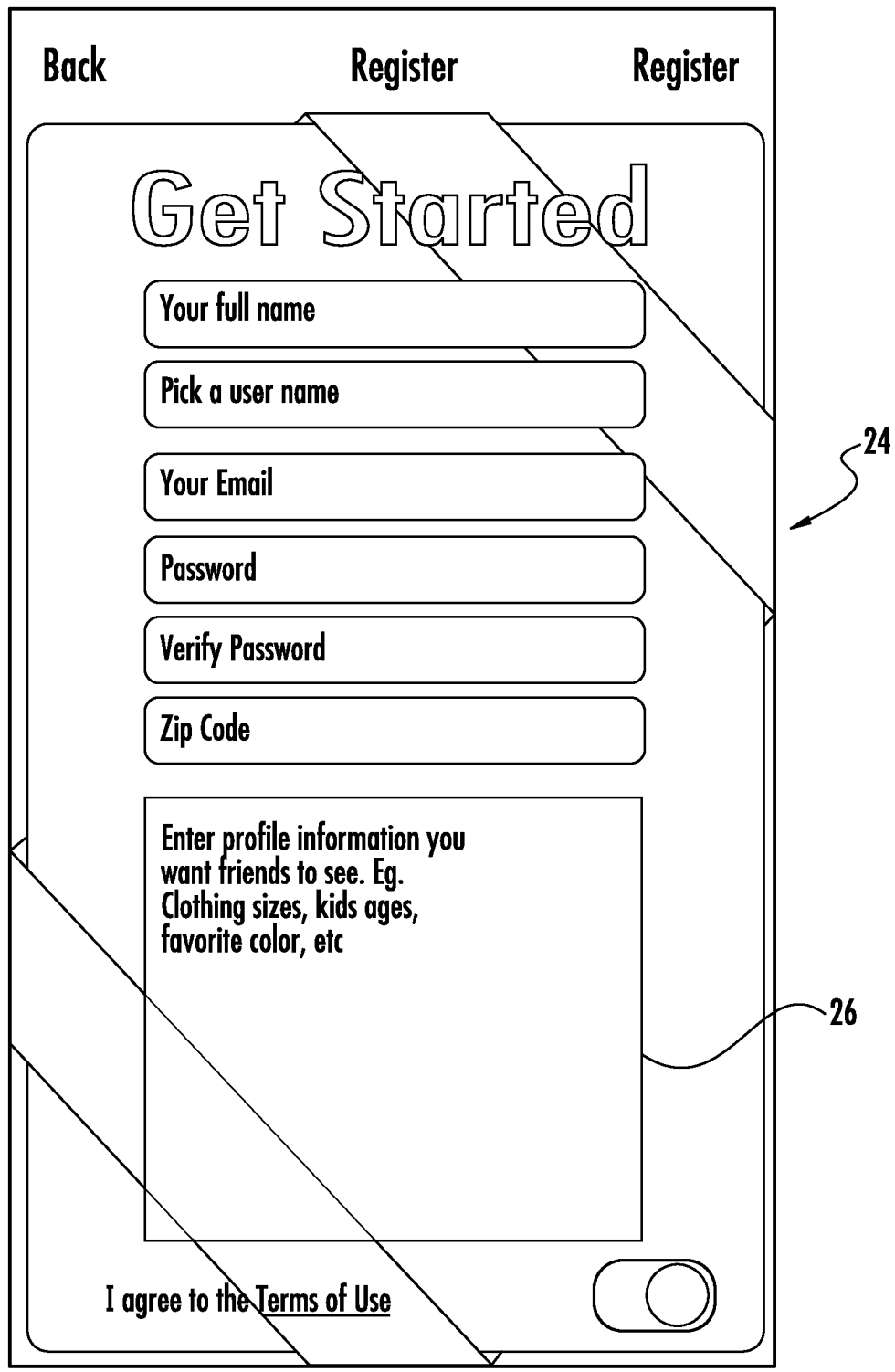
Figure 4A:
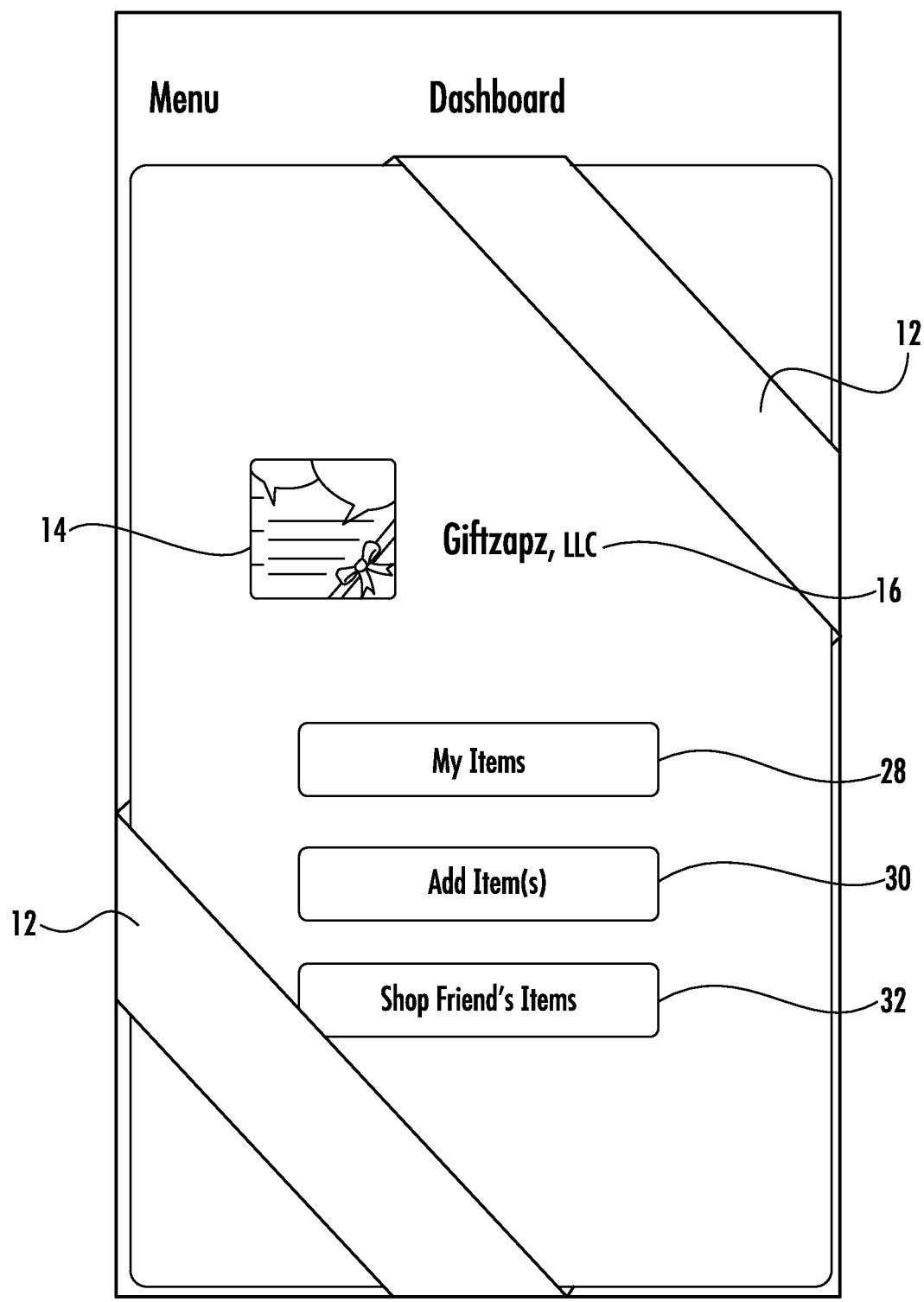
Figure 4B:
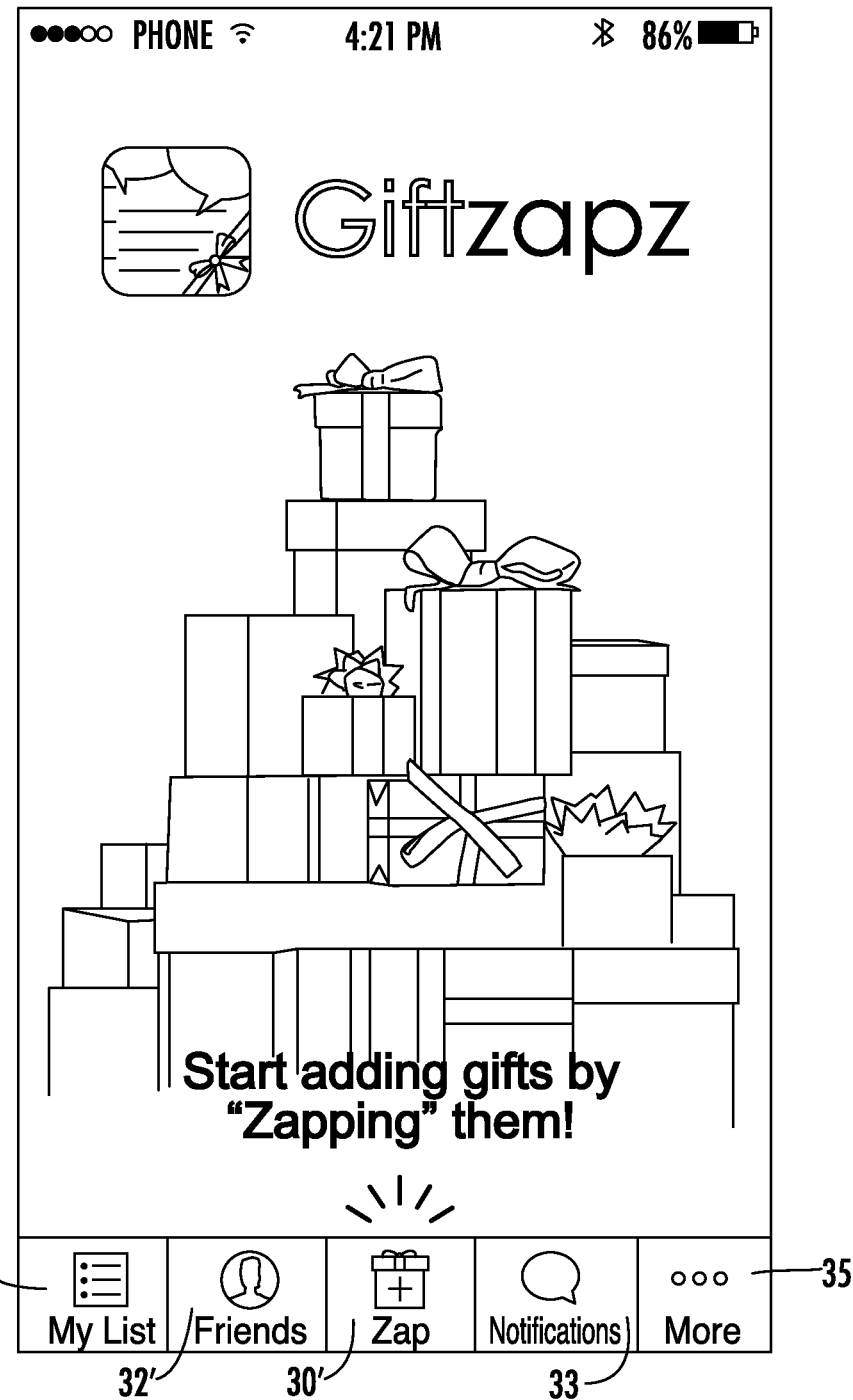
Figure 5:
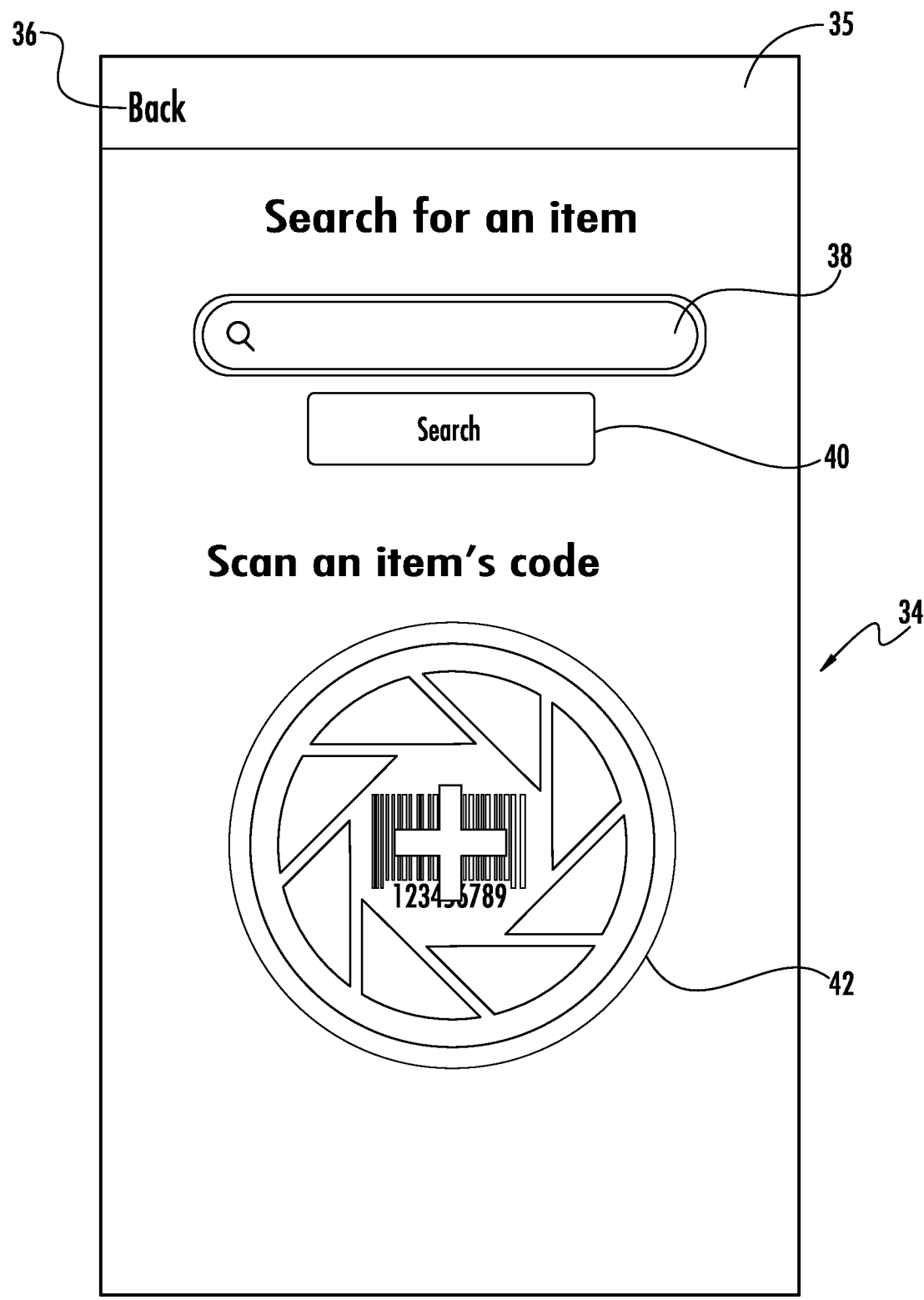
Figure 6:
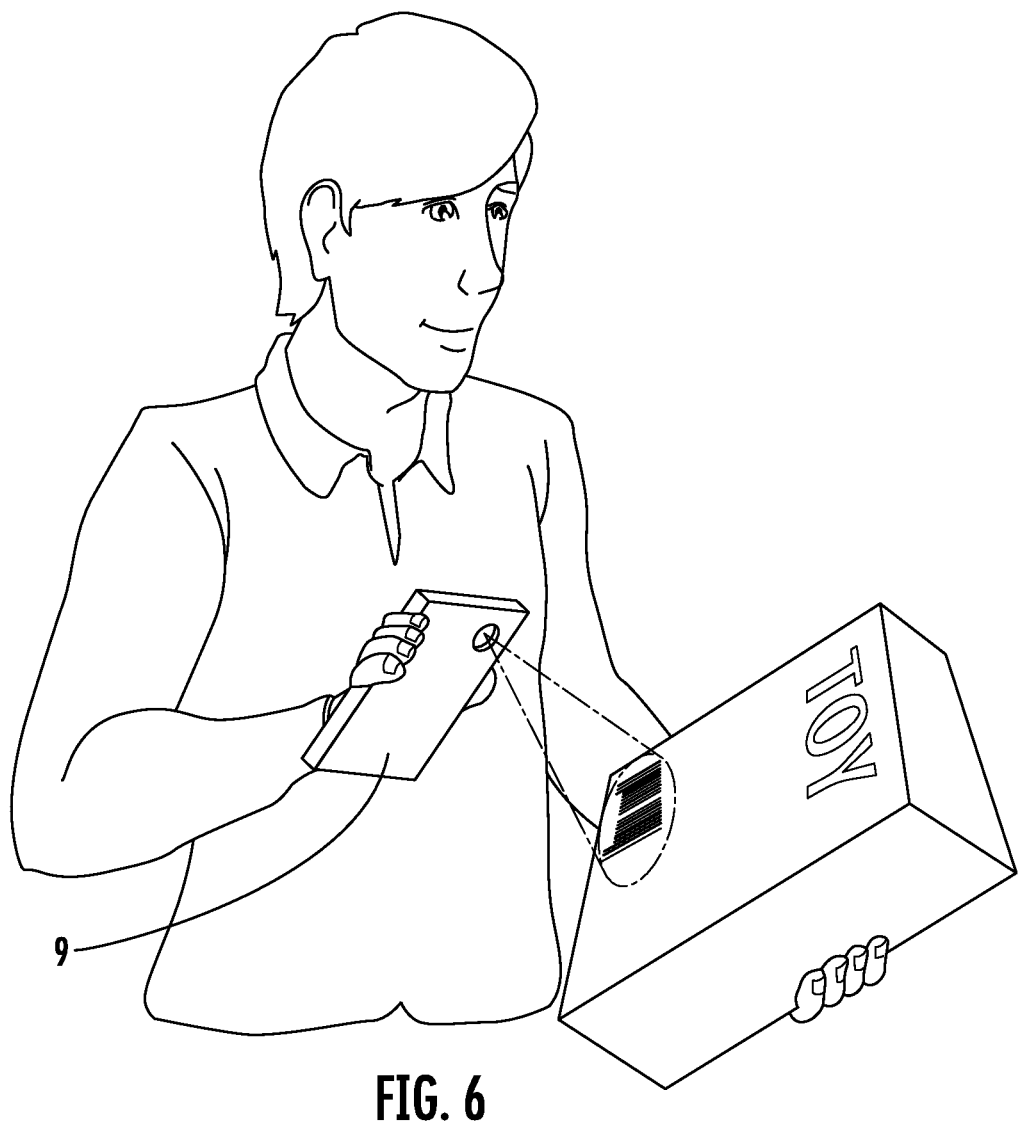
Figure 7:
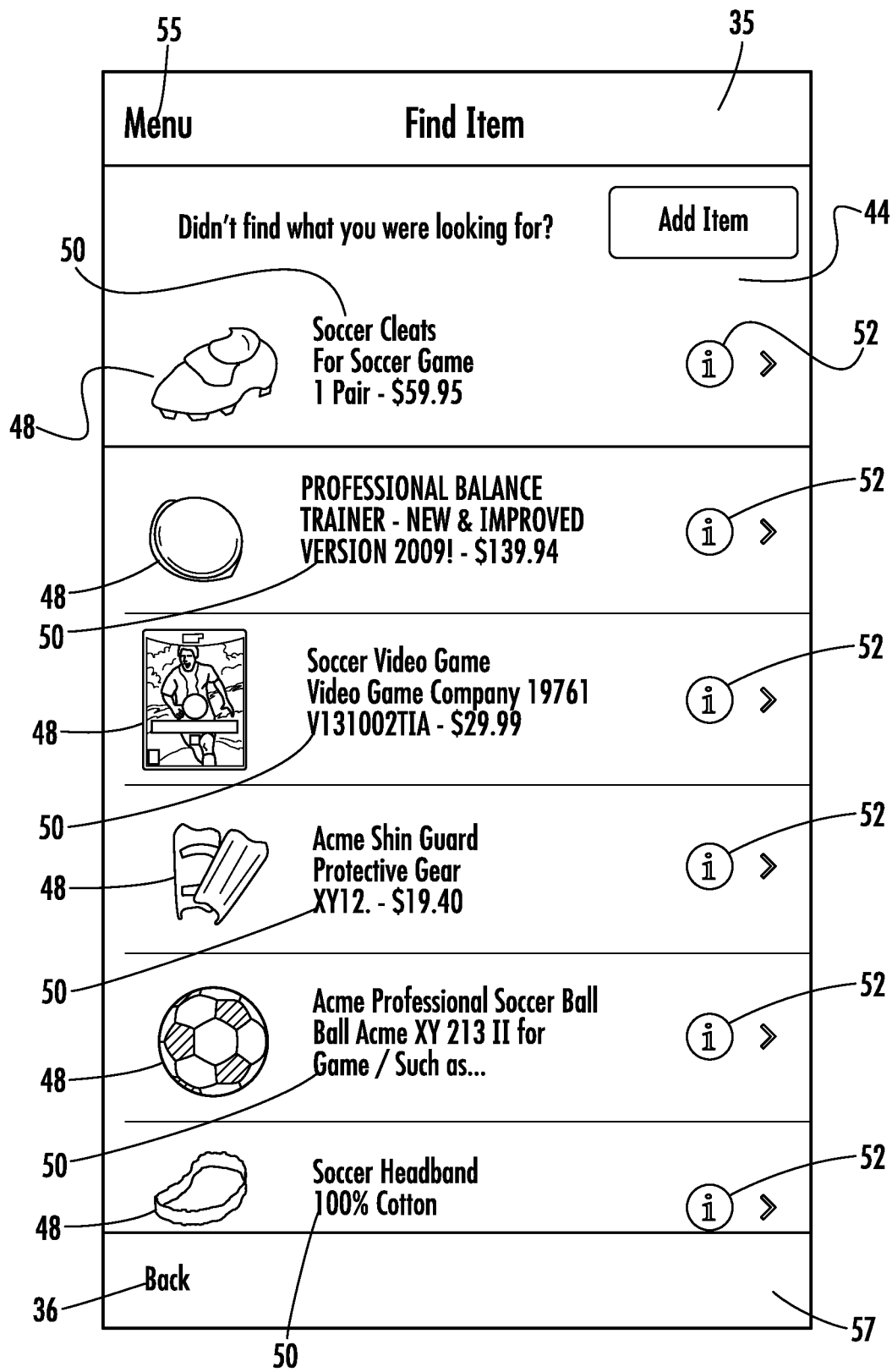
Figure 7A:
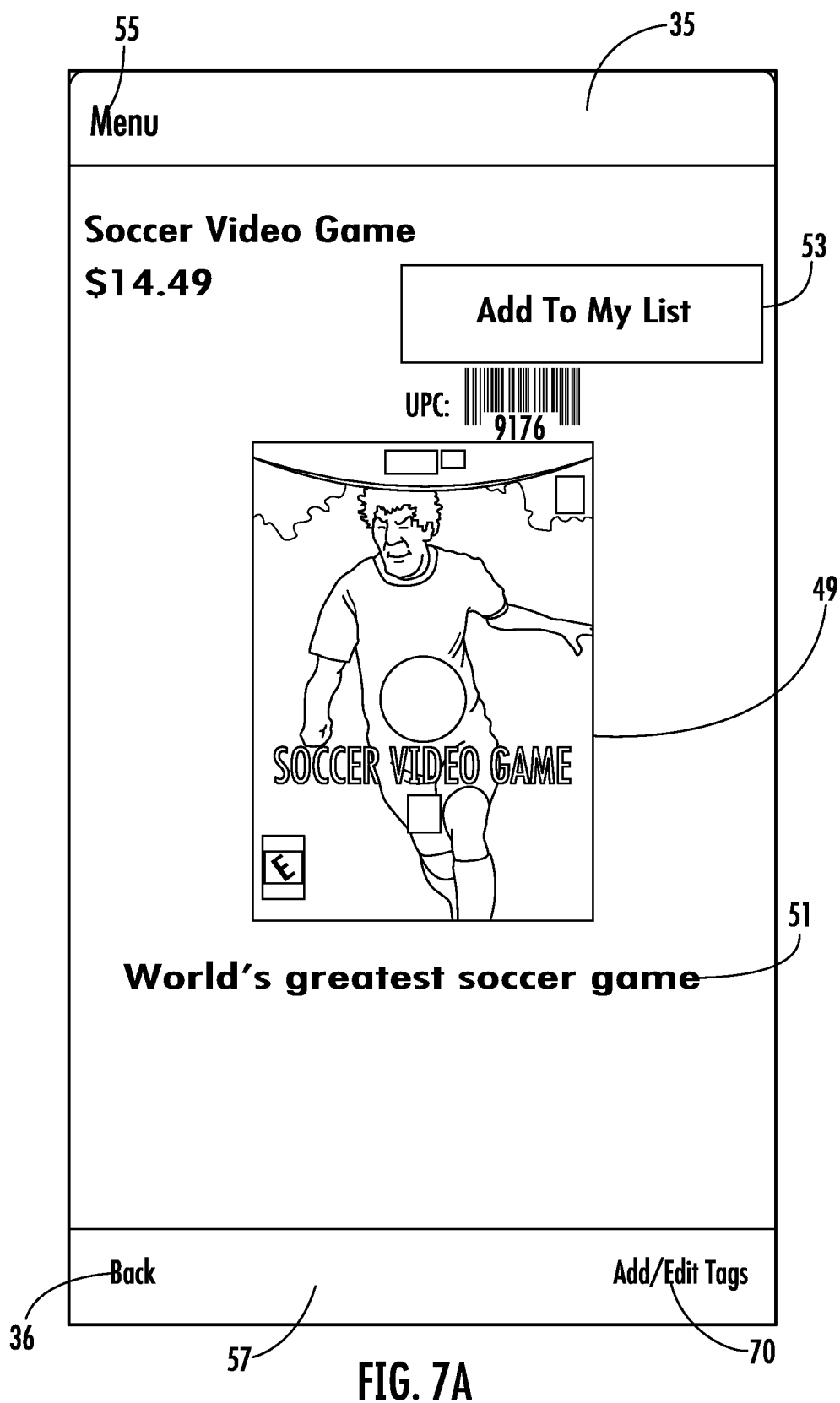
Figure 7B:
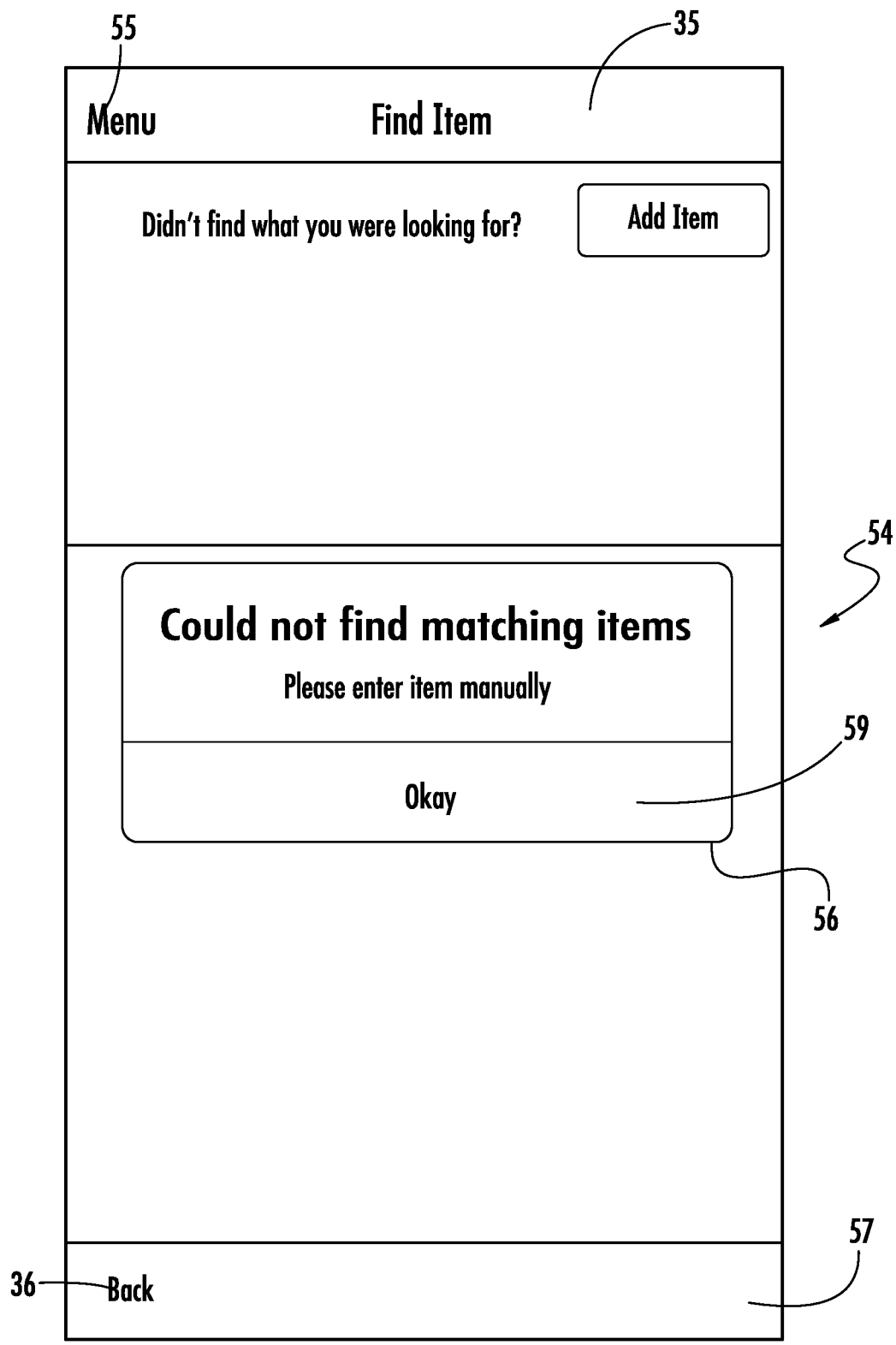
Figure 7C:
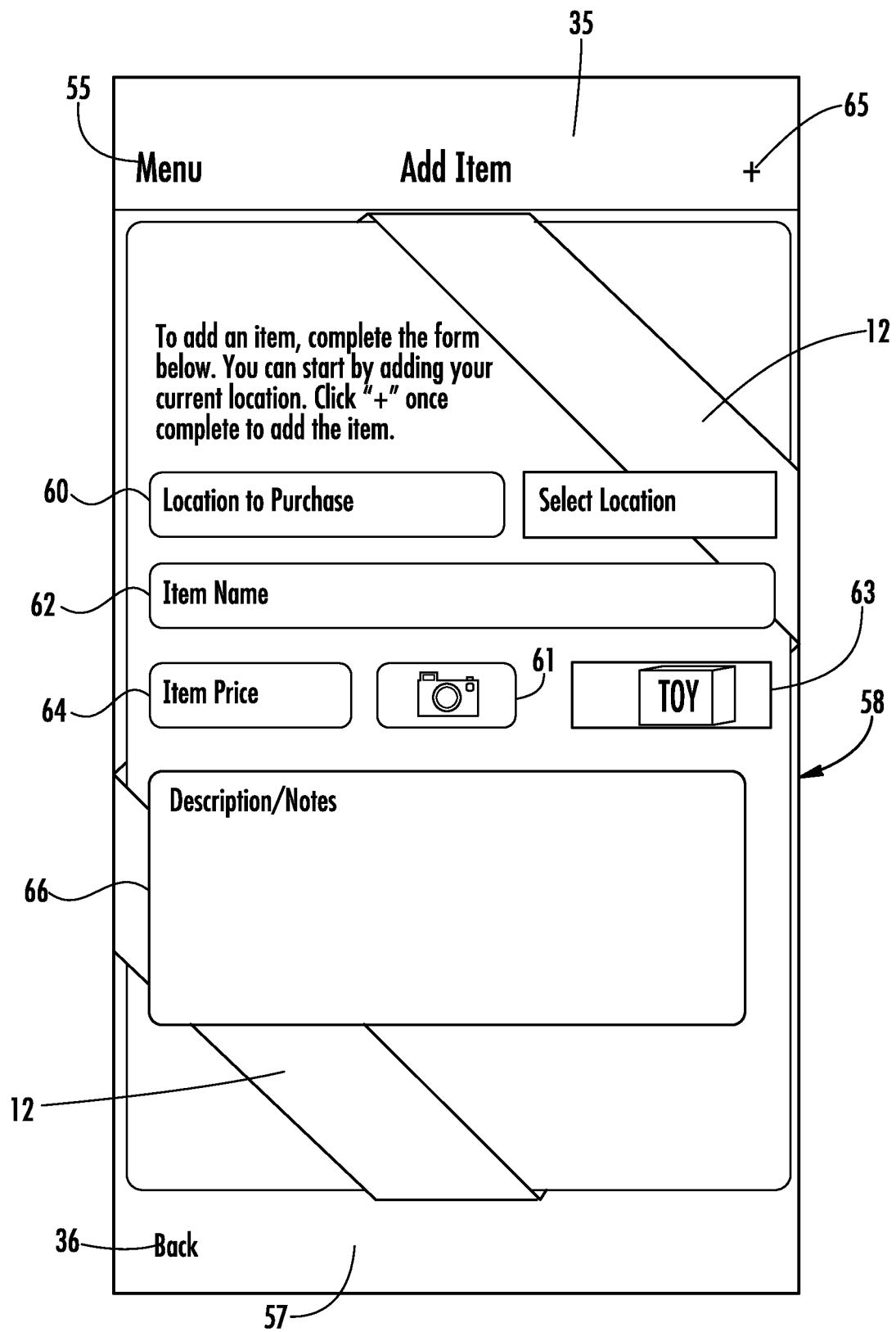
Figure 7D:
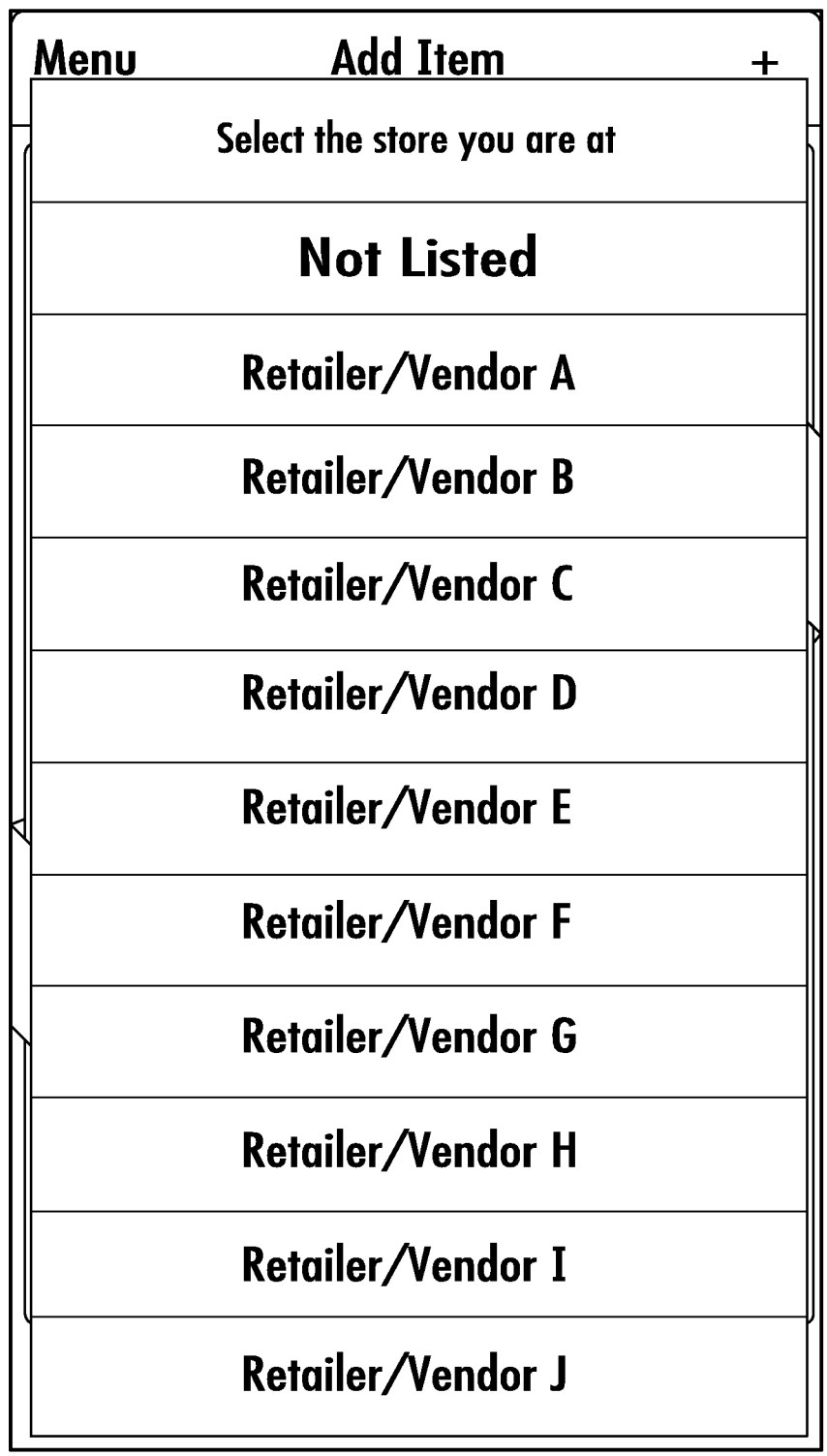
Figure 8:
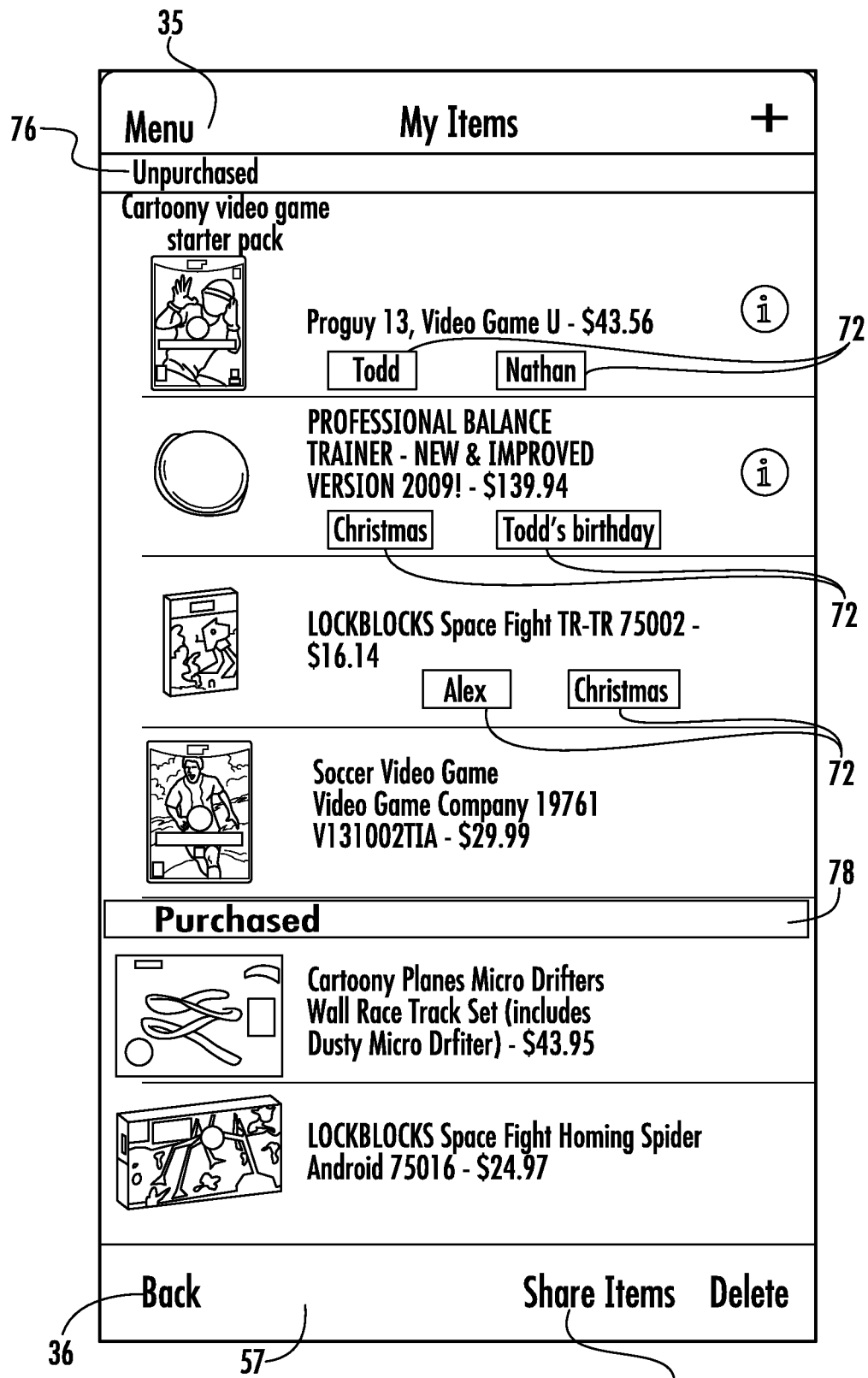
Figure 8A:
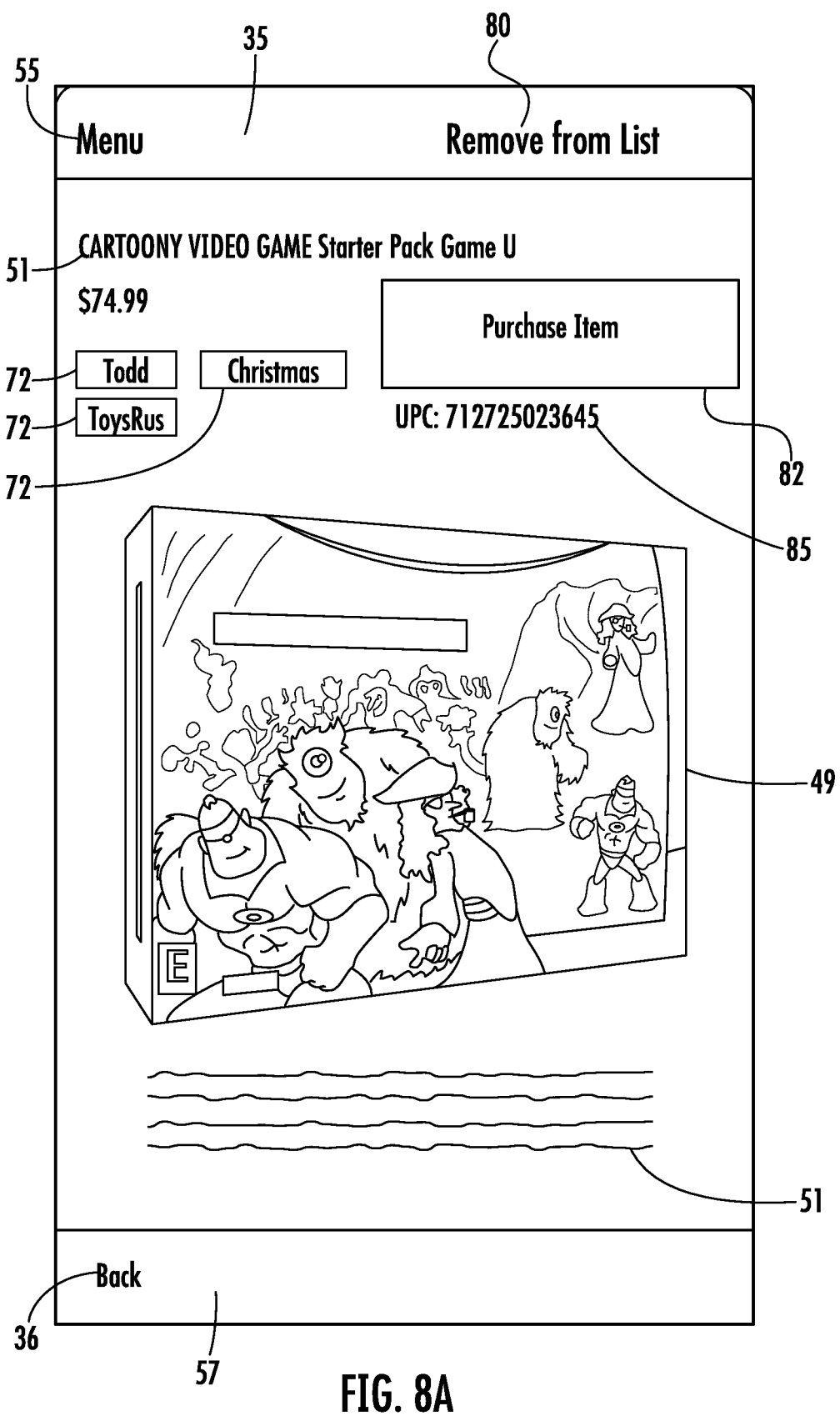
Figure 8B:
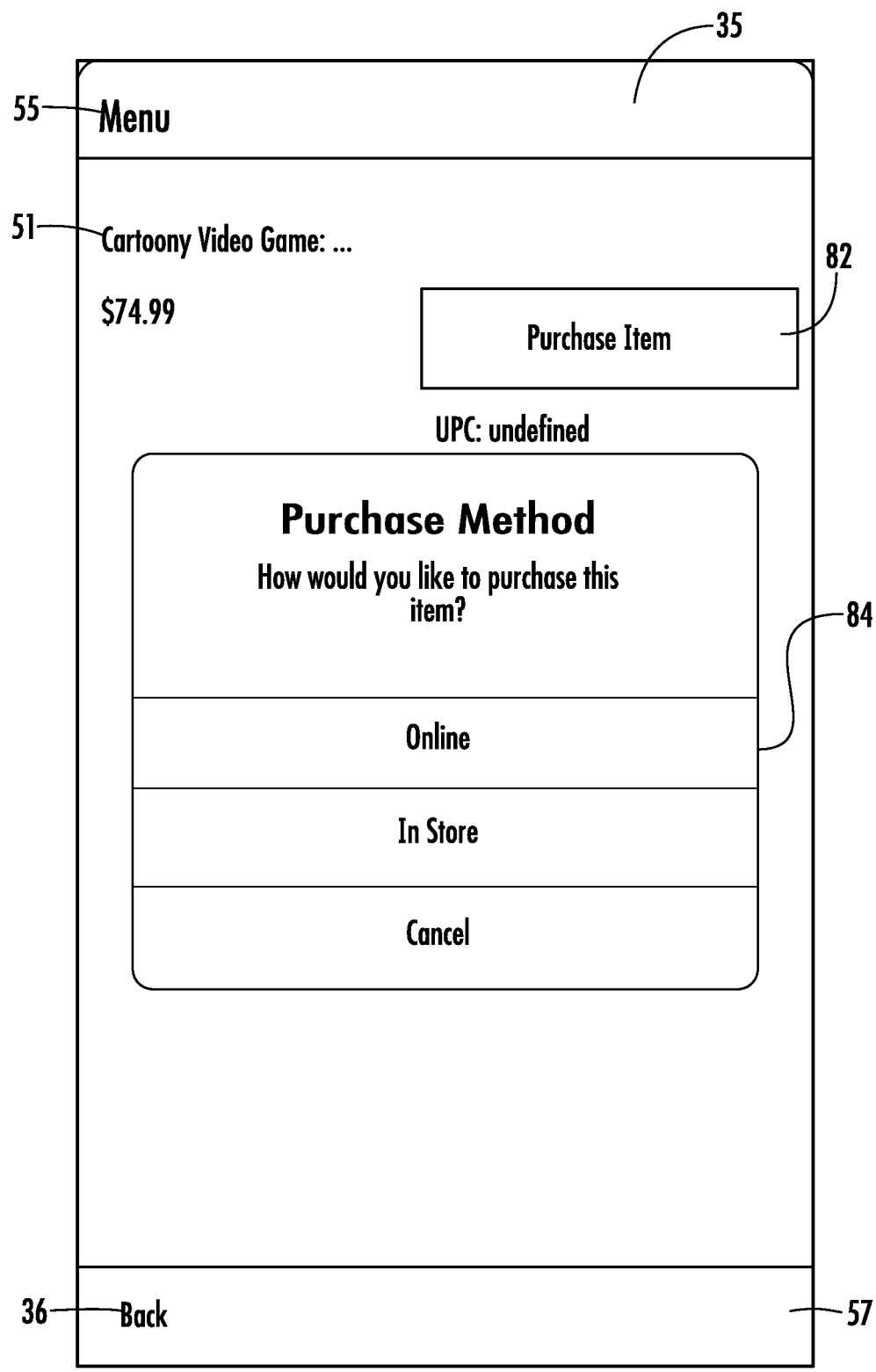
Figure 8C:
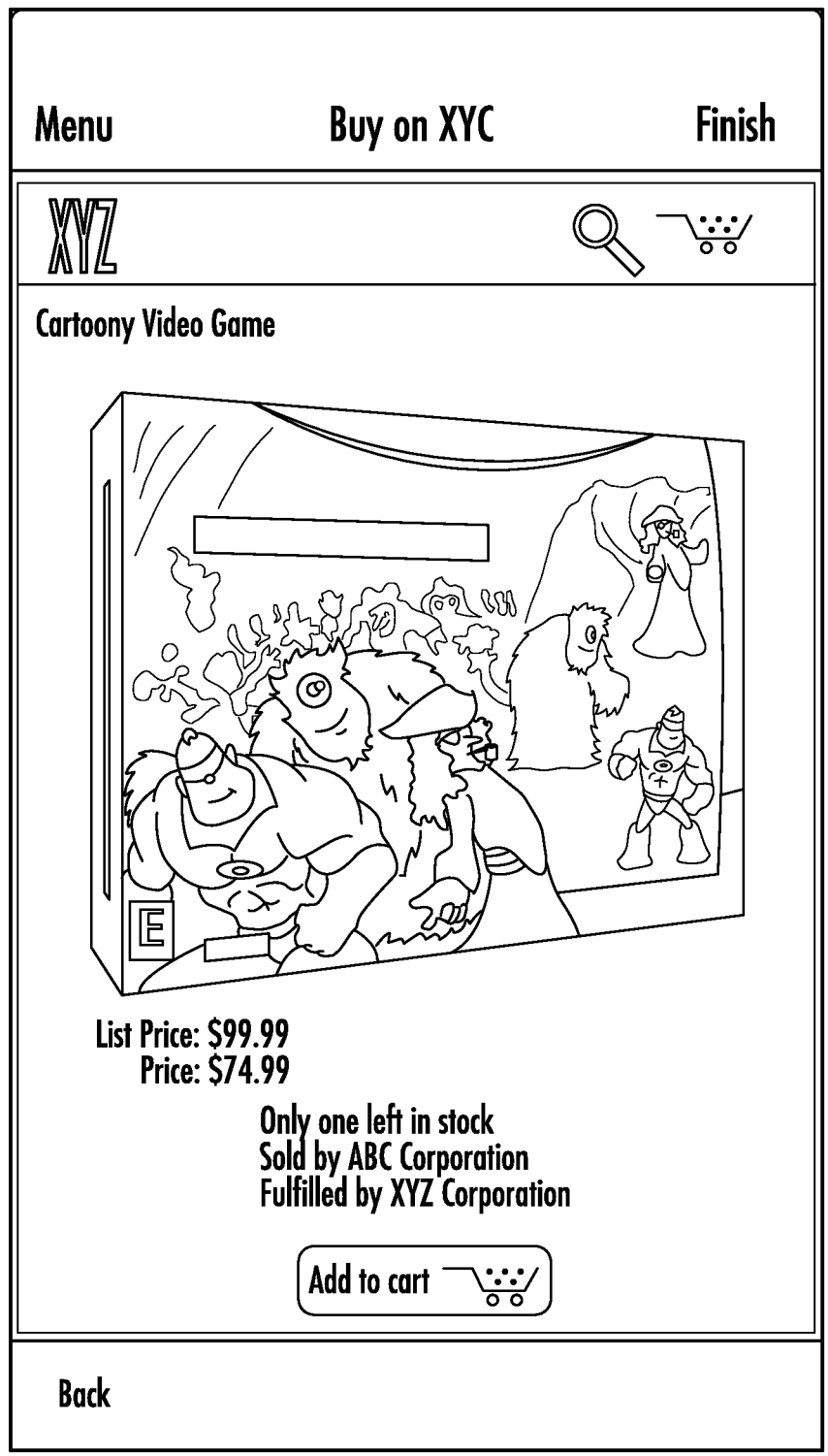
Figure 8D:
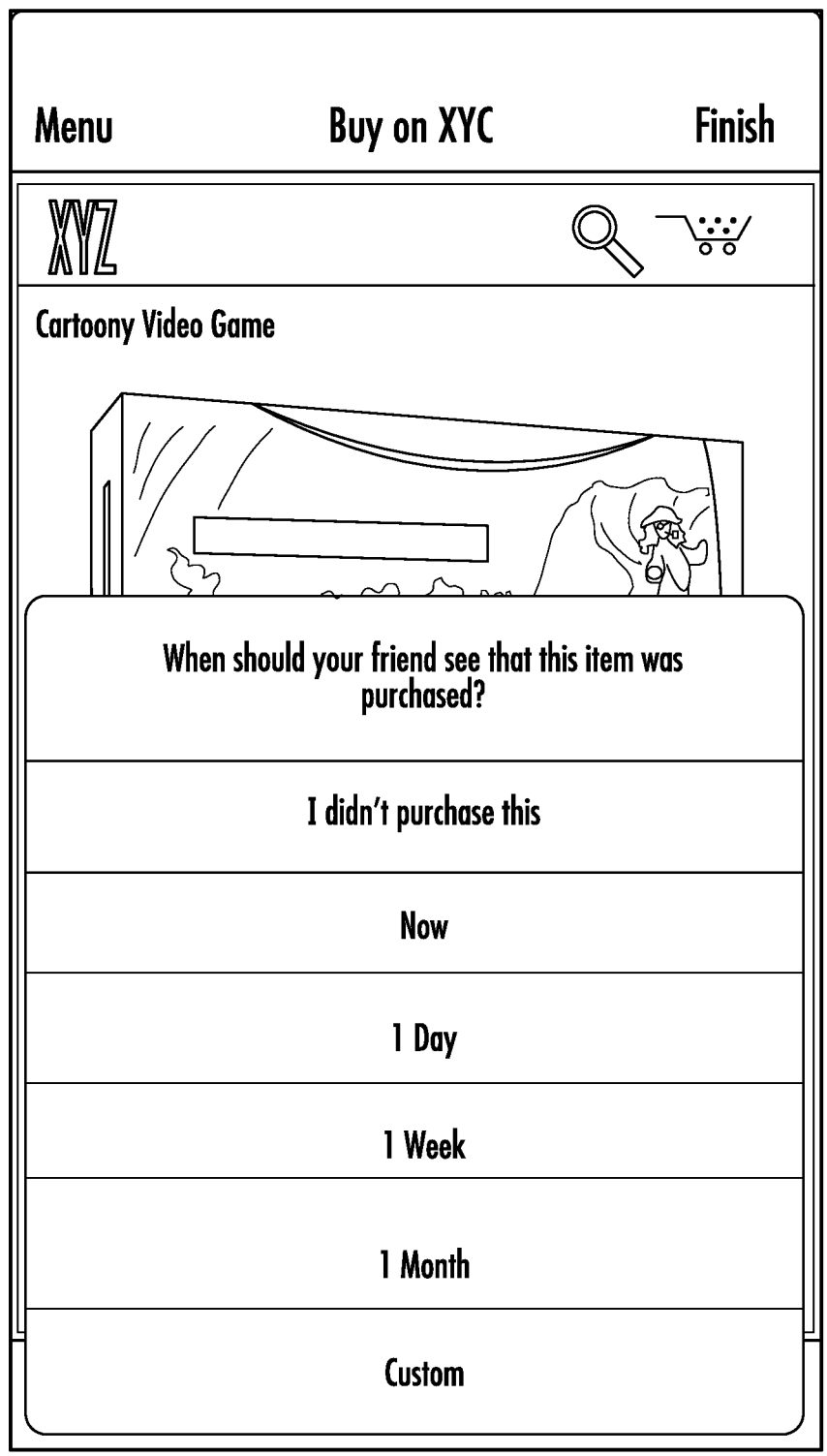
Figure 8E:
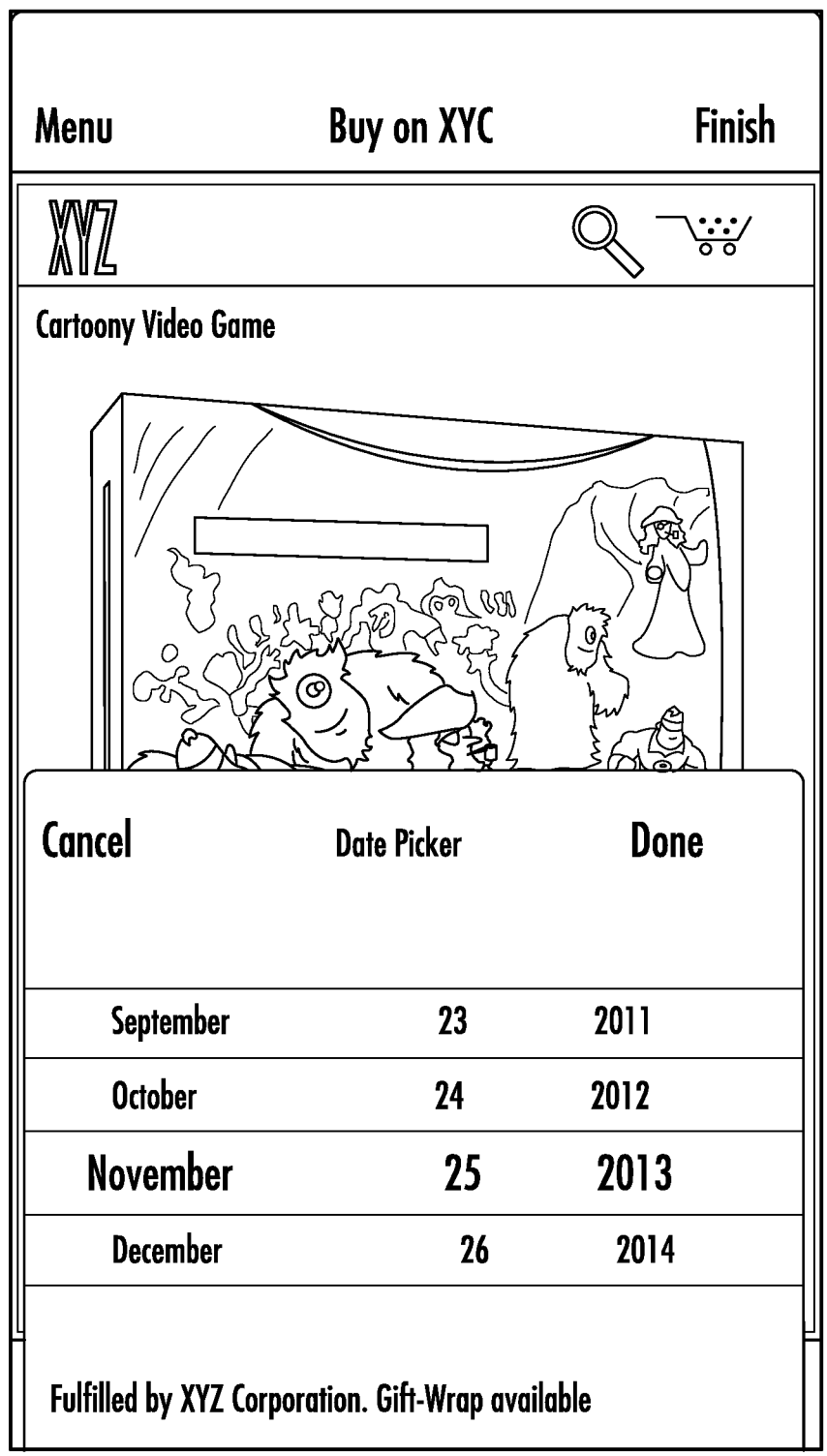
Figure 9:
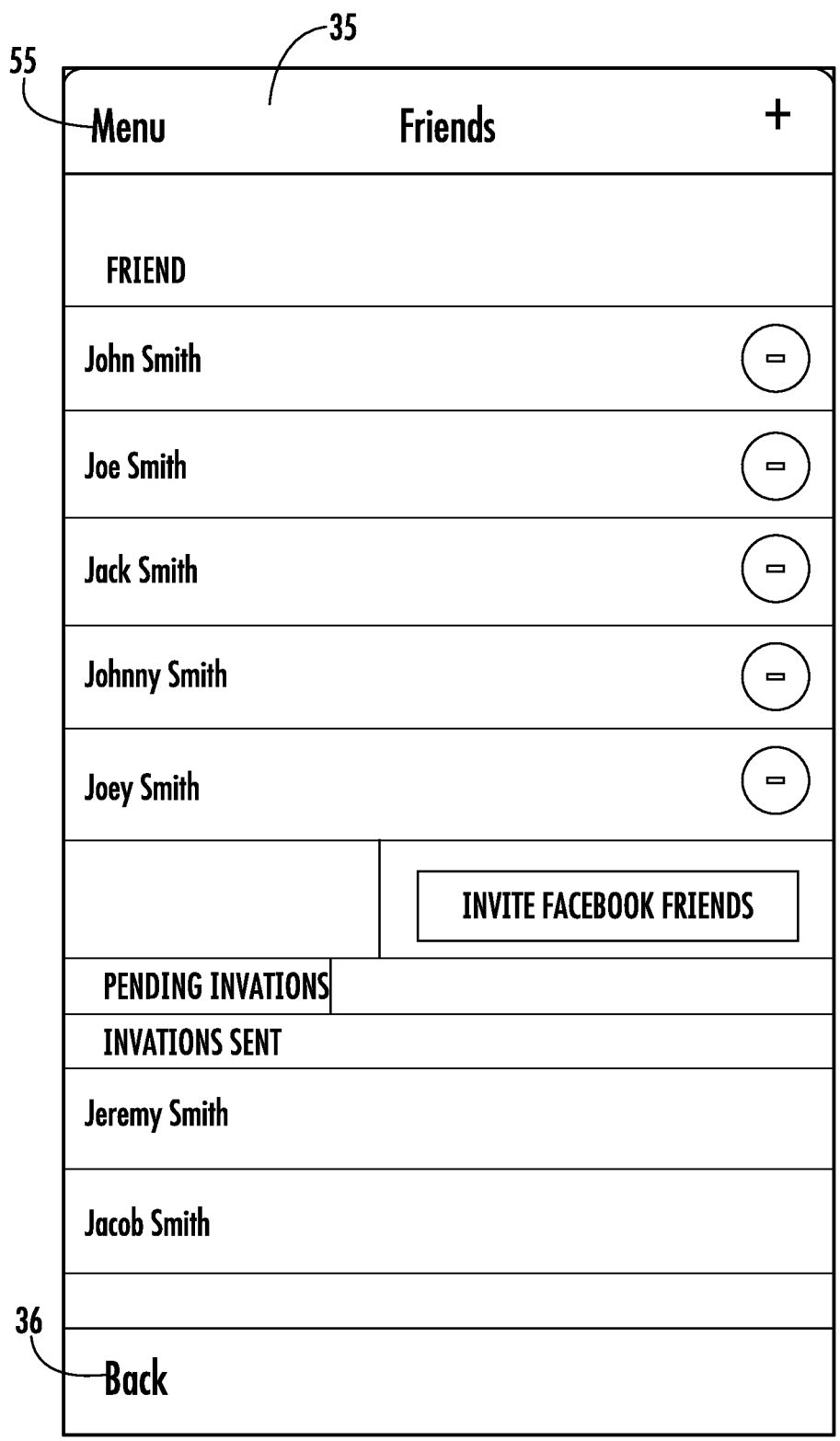
Figure 10:
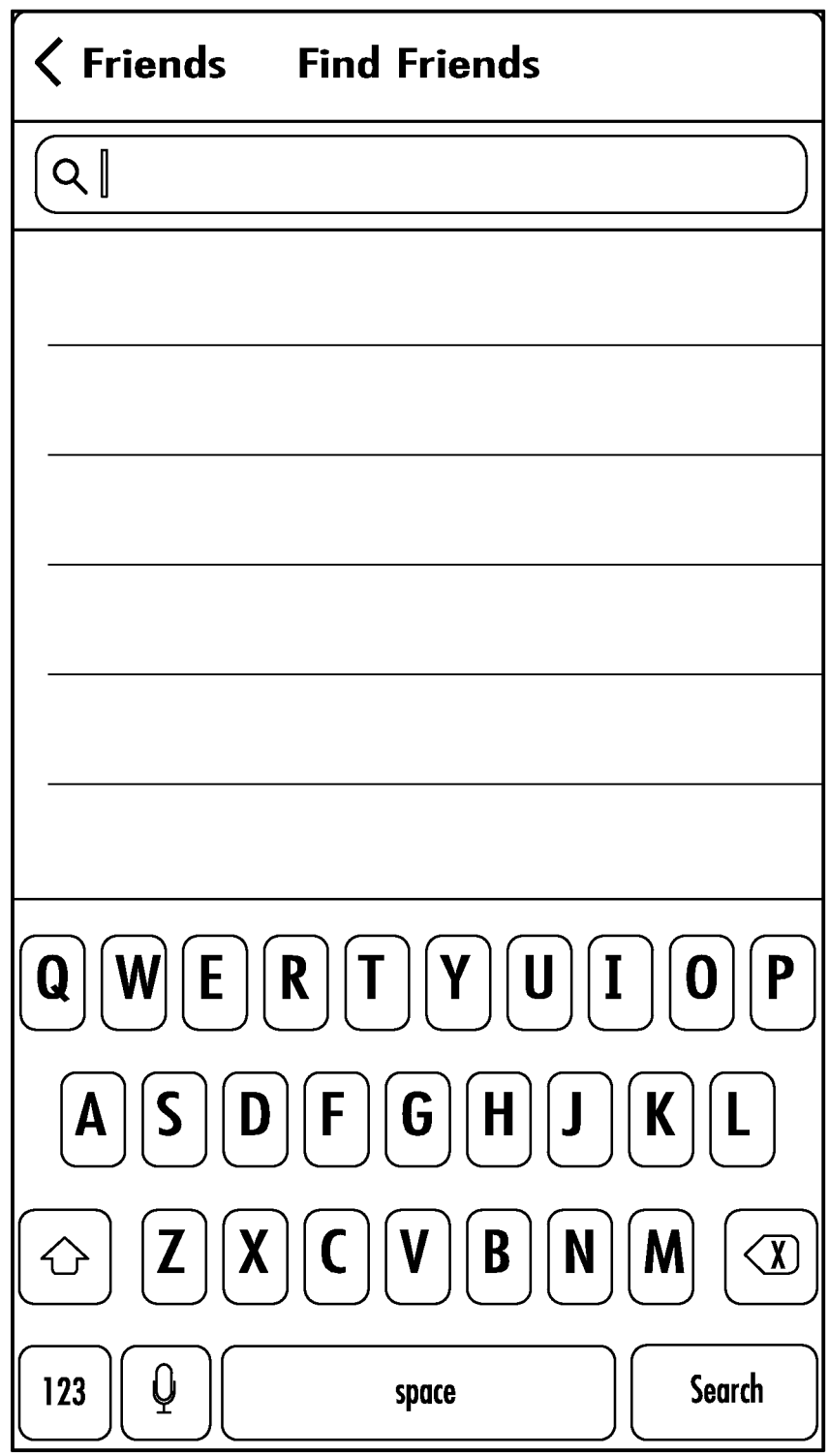
Figure 11A:
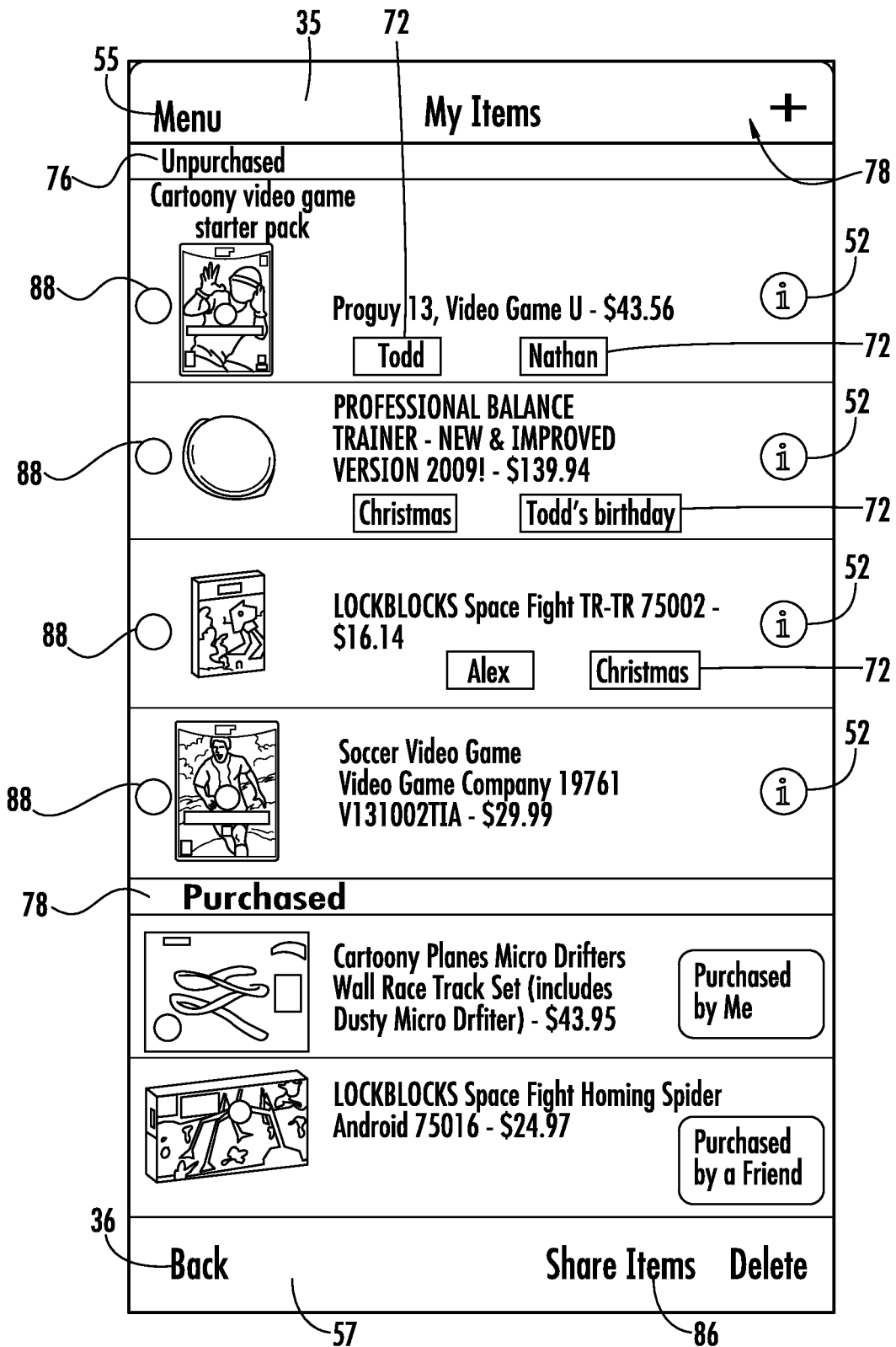
Figure 11B:
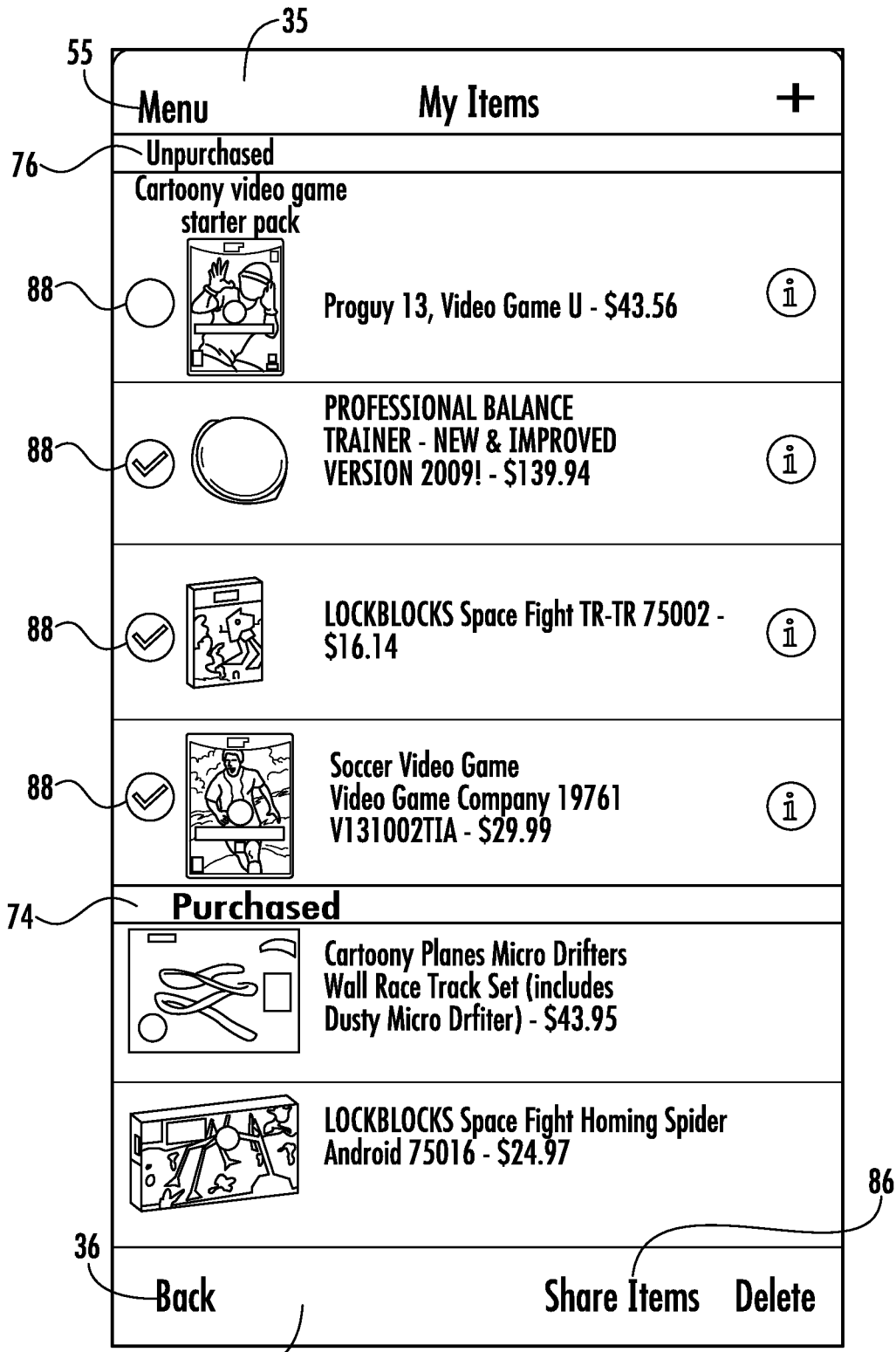
Figure 11C:
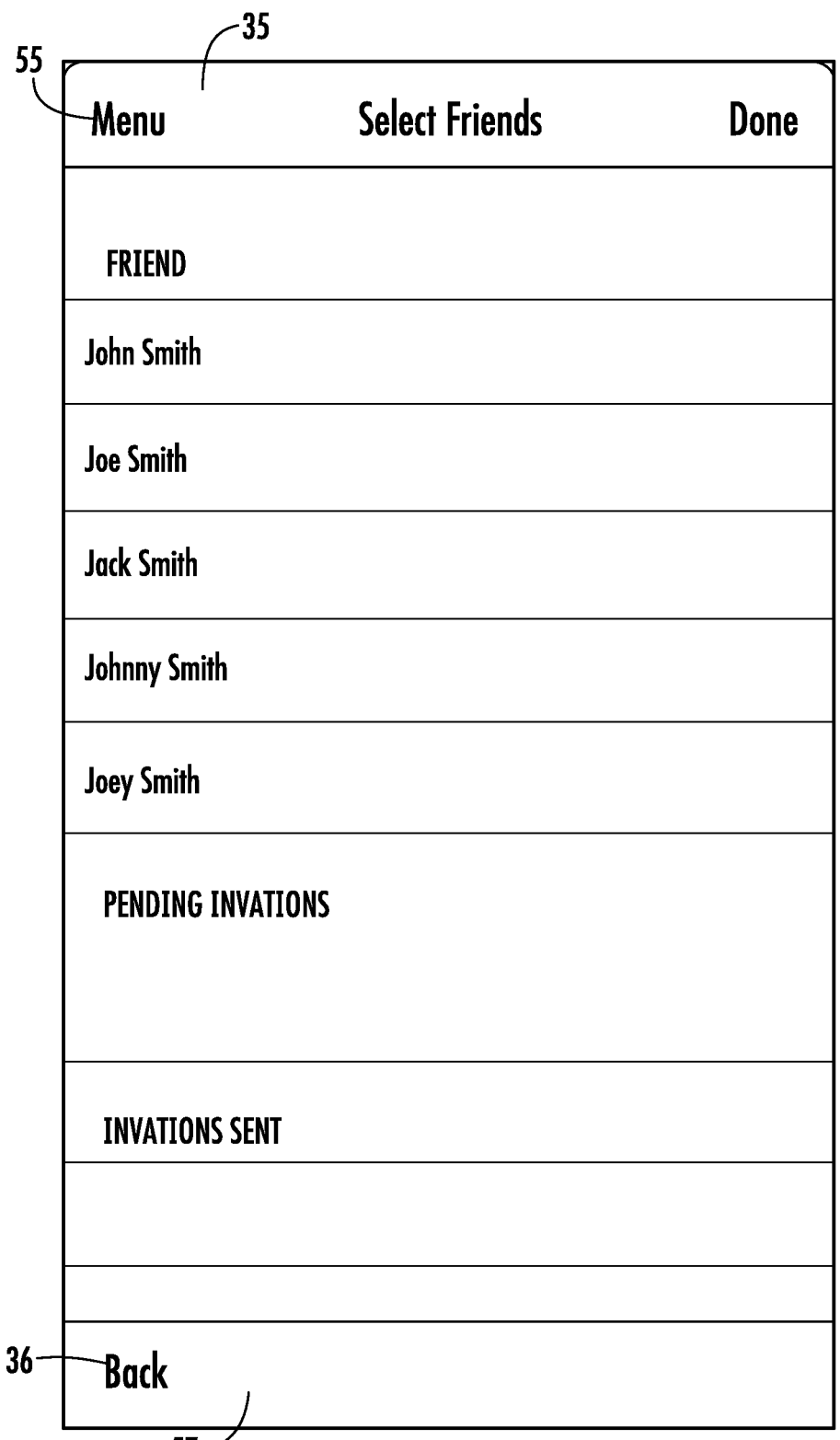
Figure 11D:
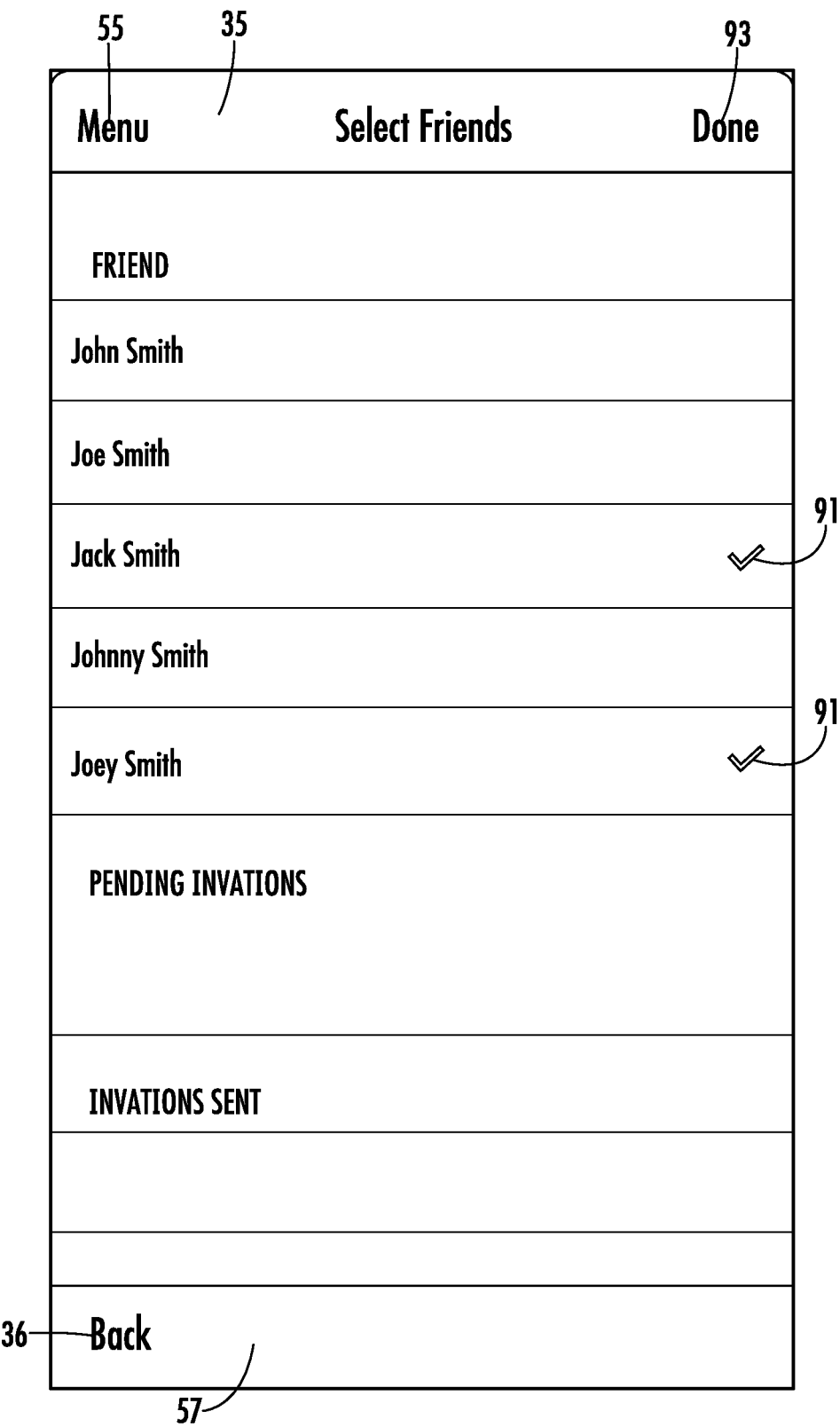
Figure 11E:
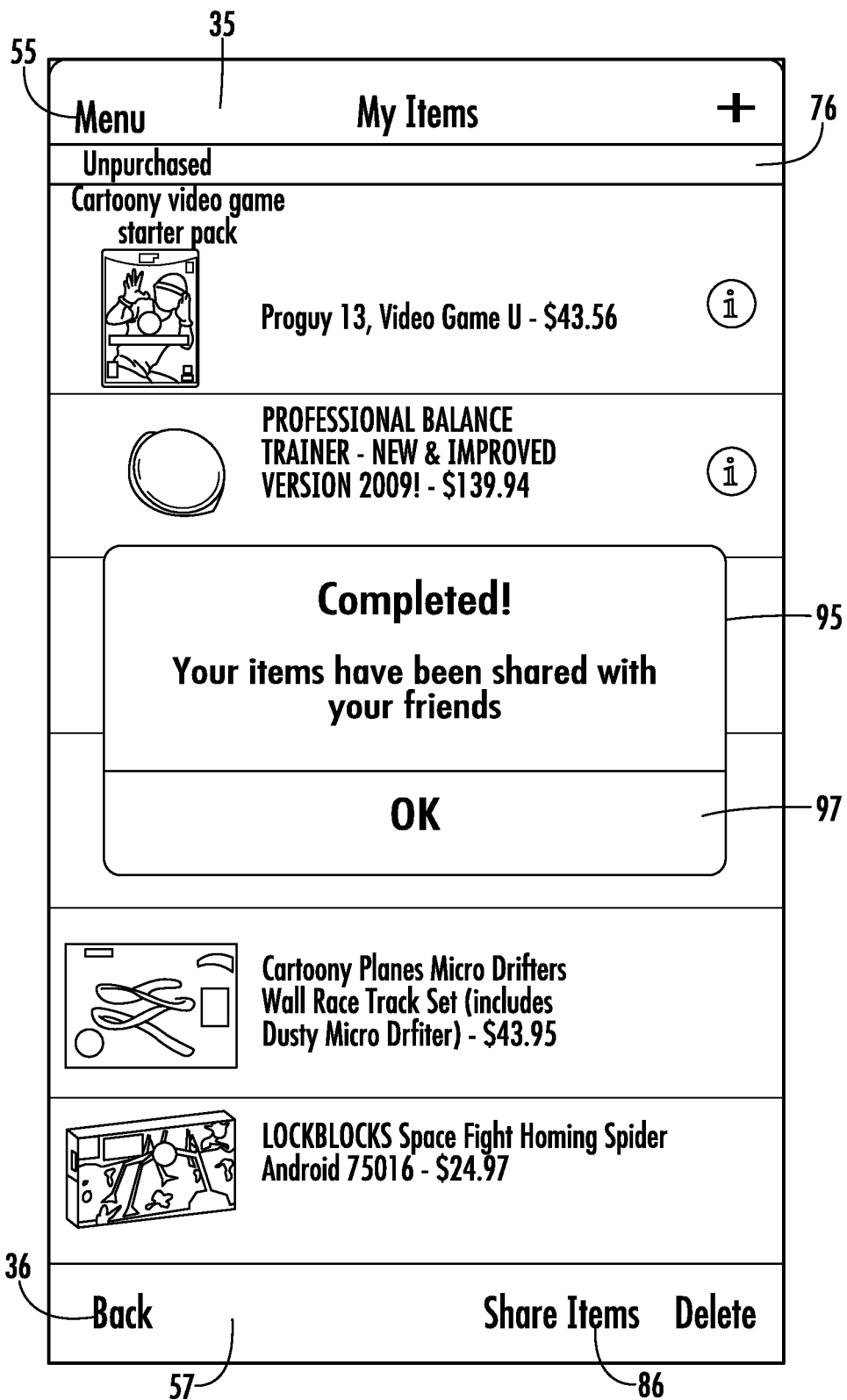
Figure 12:
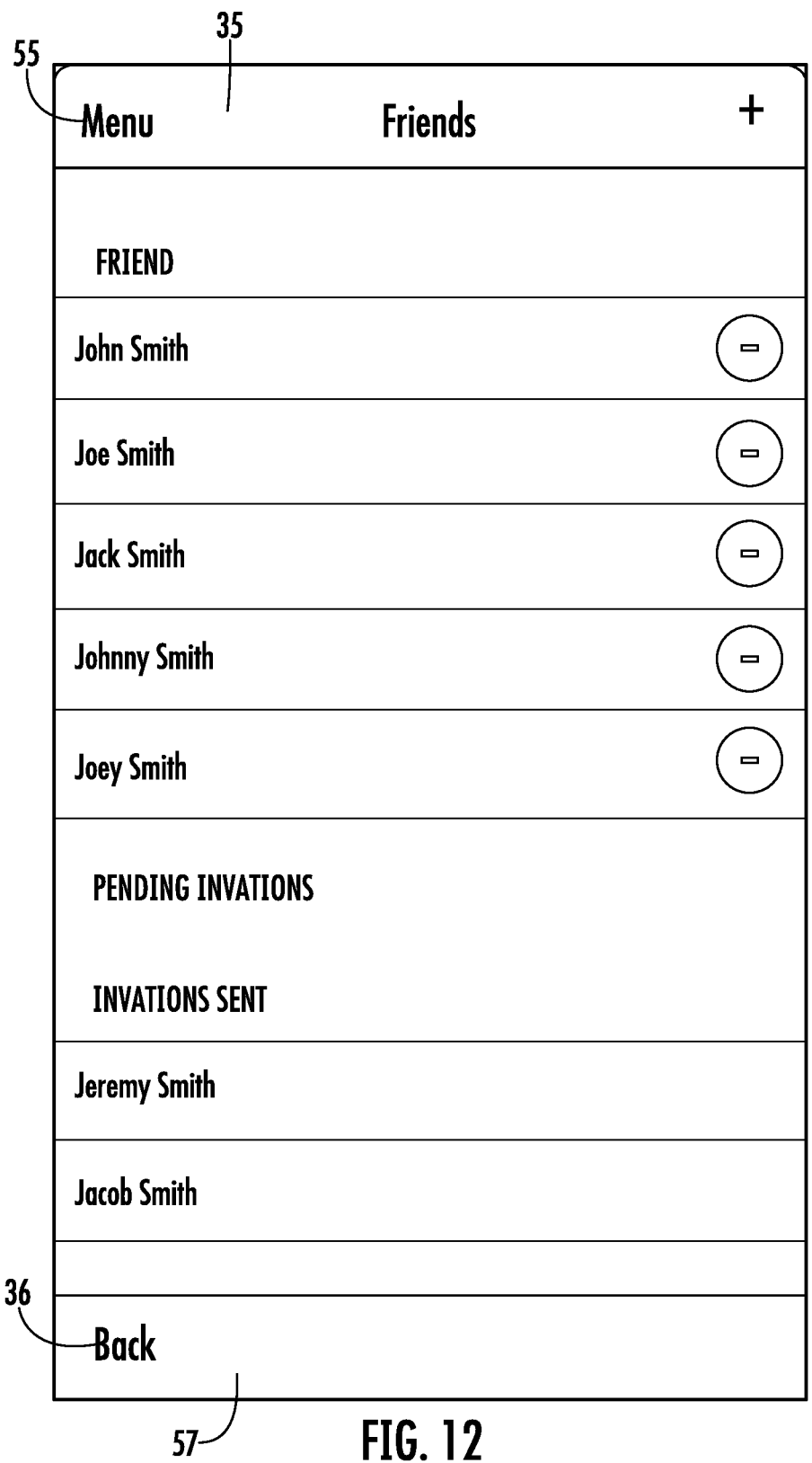
Figure 13:
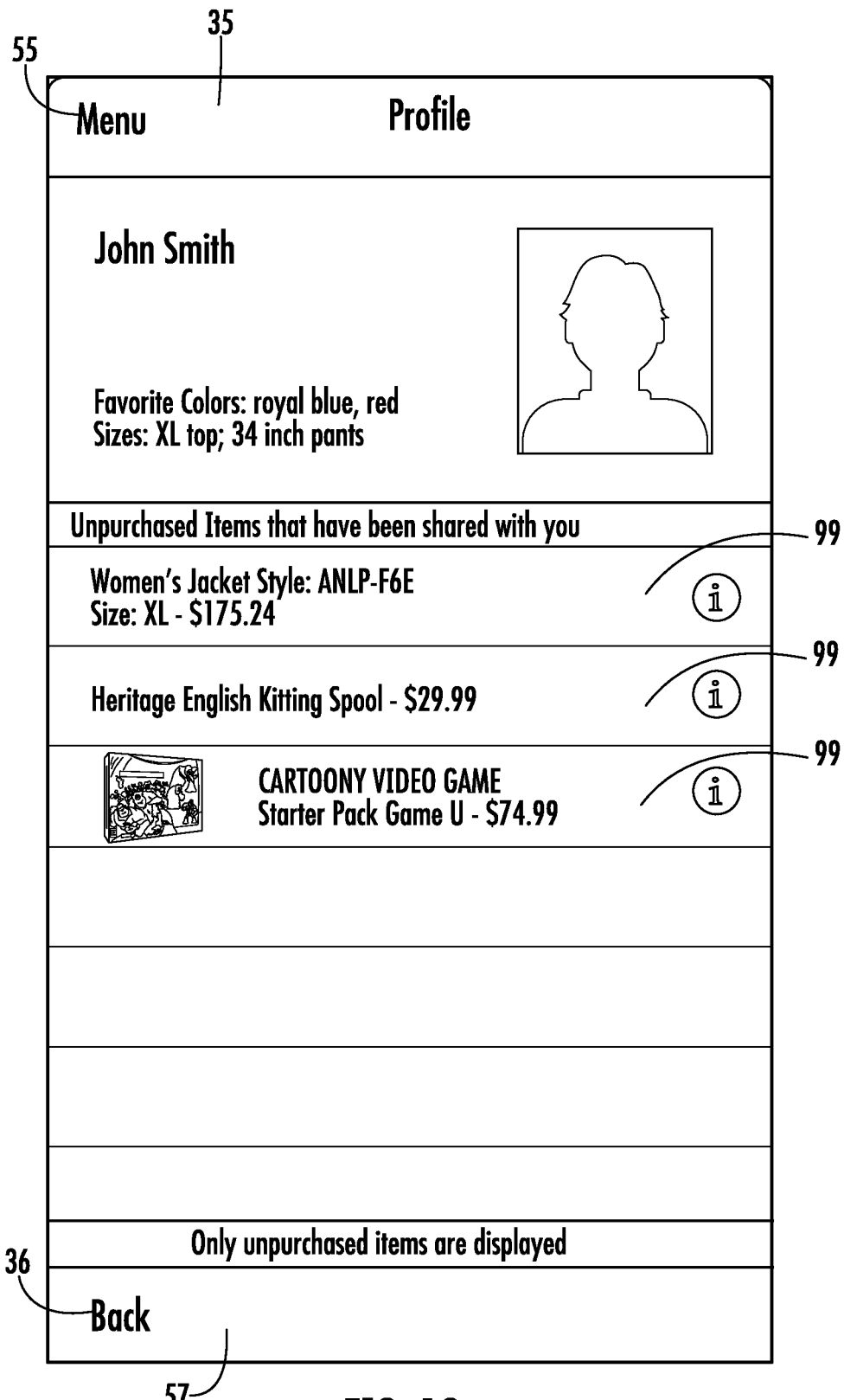
Figure 13A:
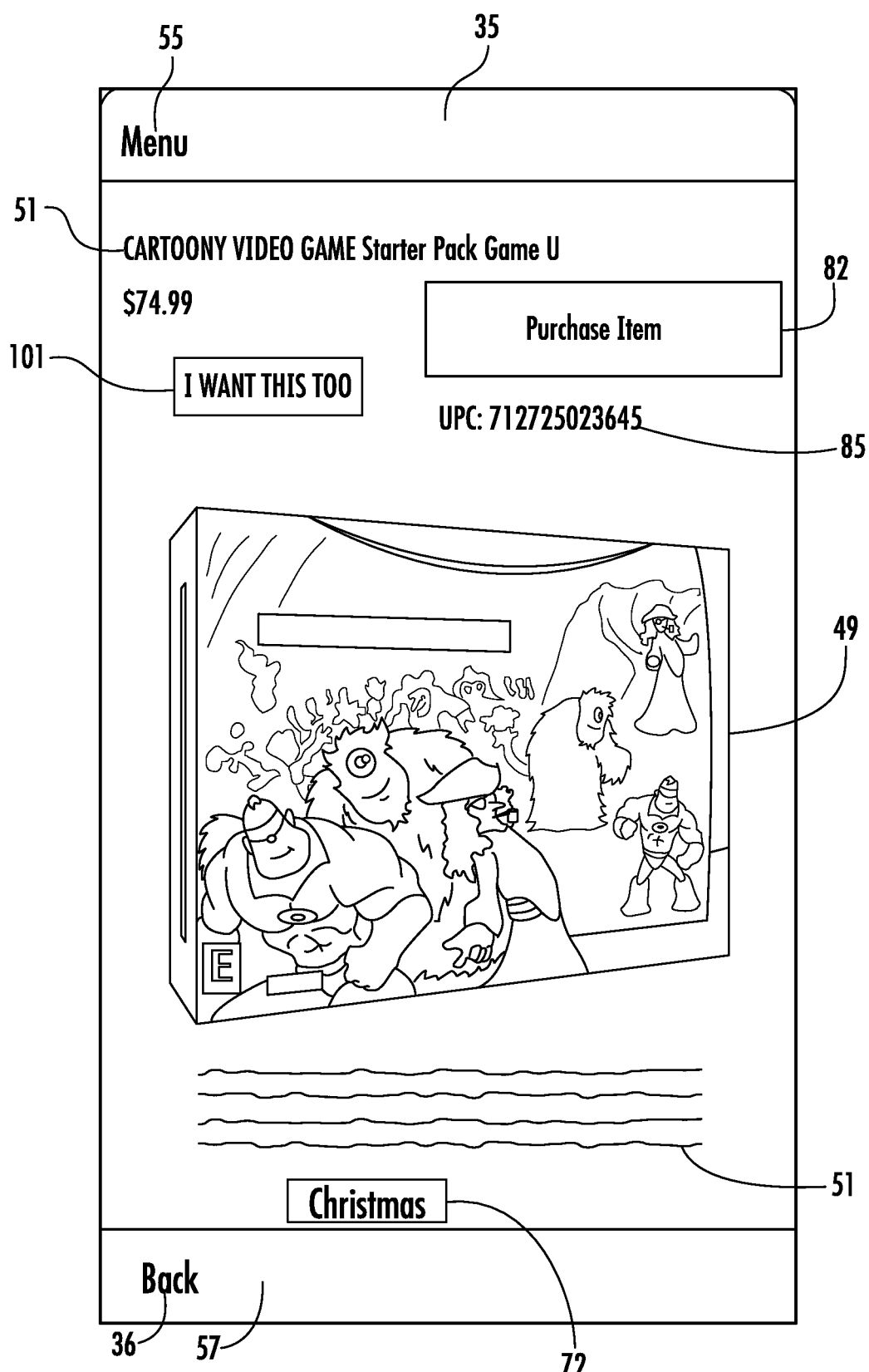
Figure 13B:
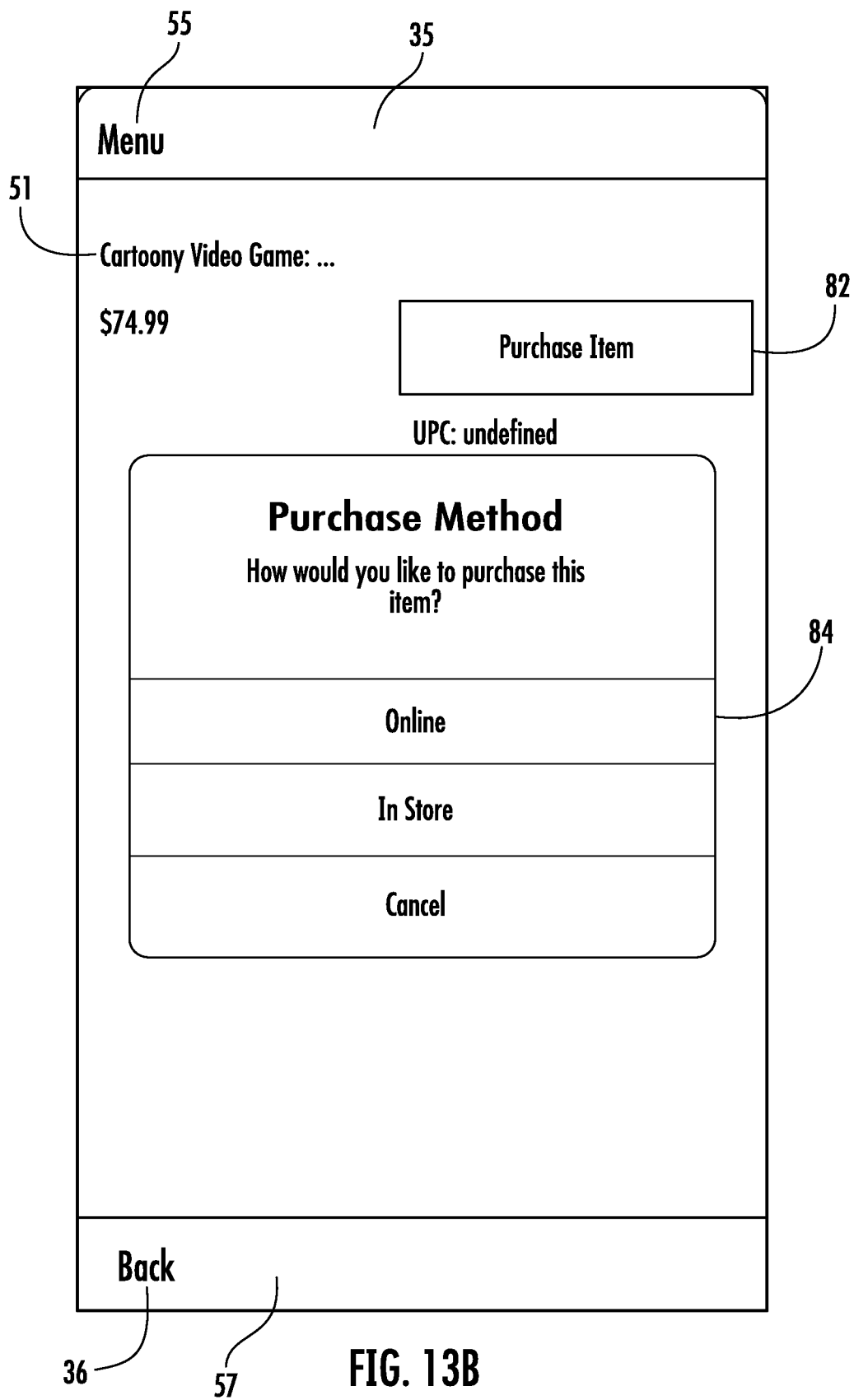
Figure 13C:
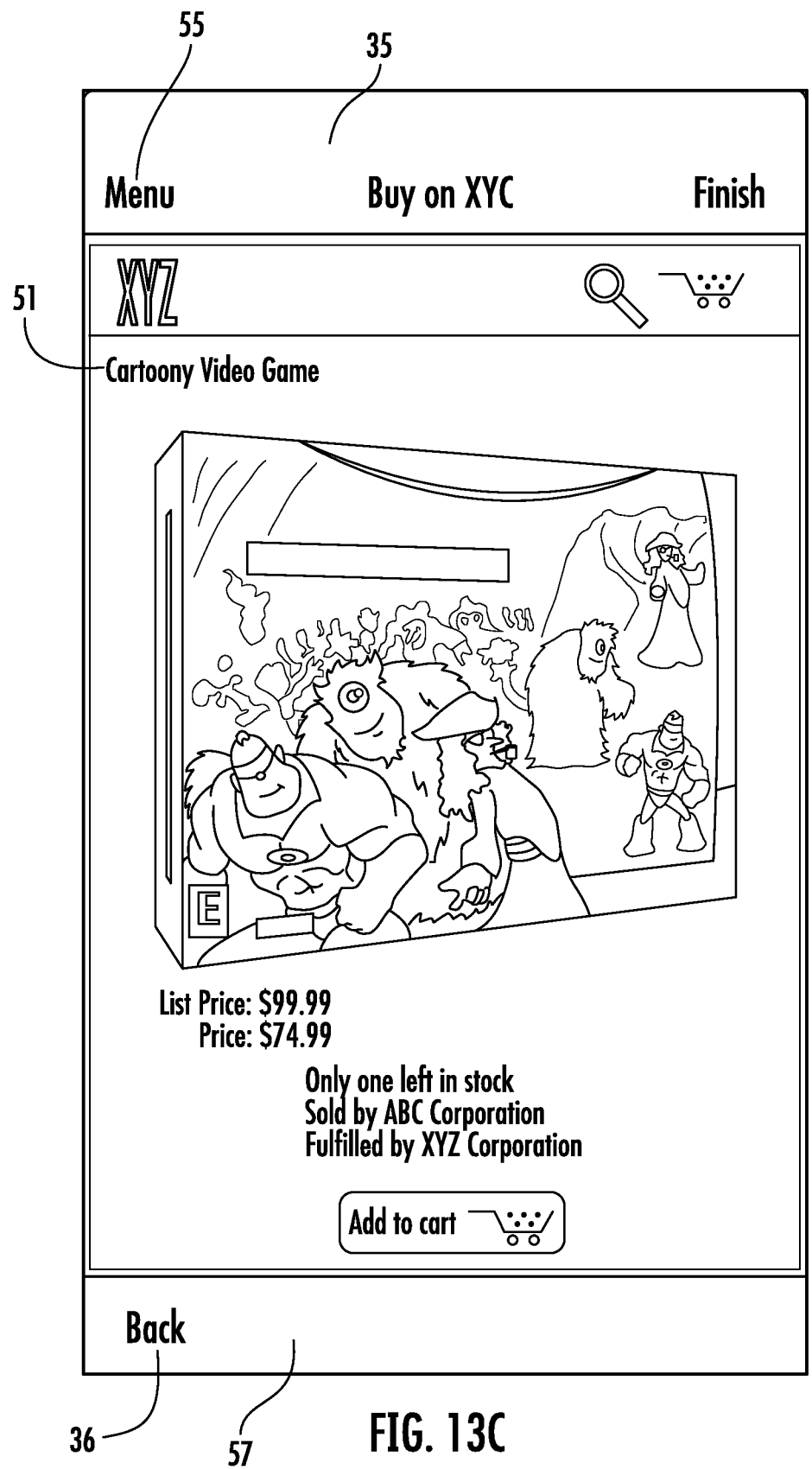
Figure 13D:
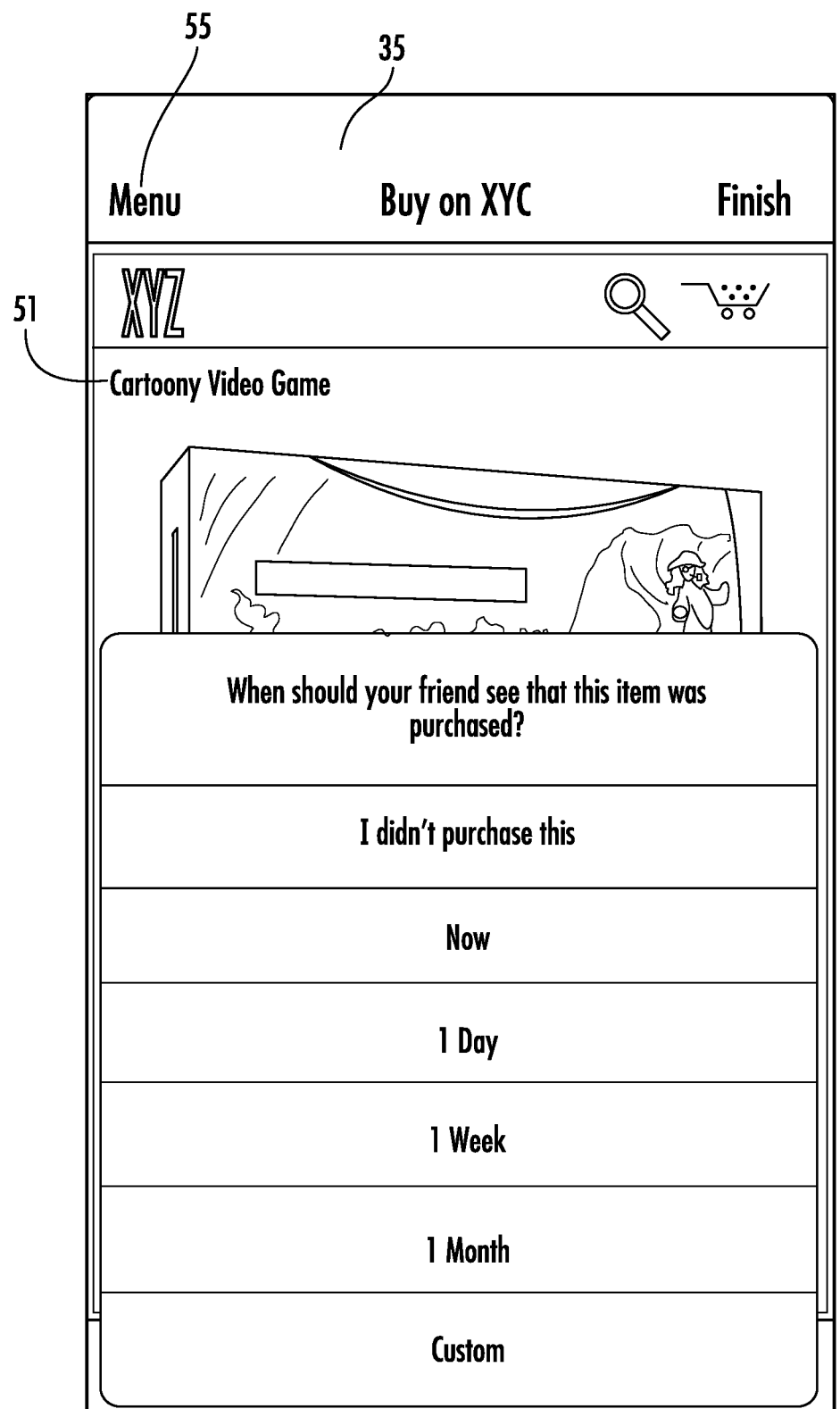
Figure 13E:
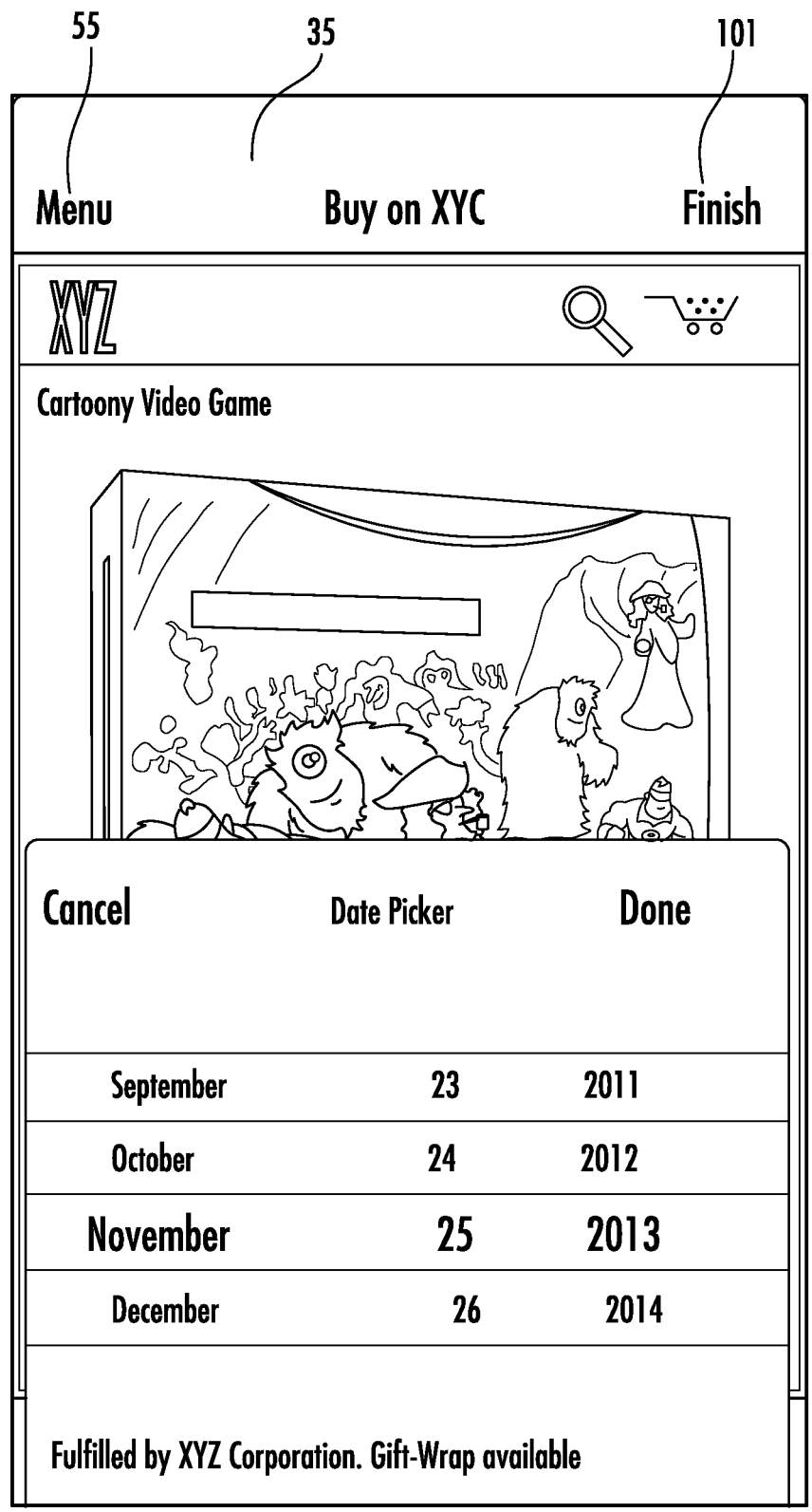
Figure 14:
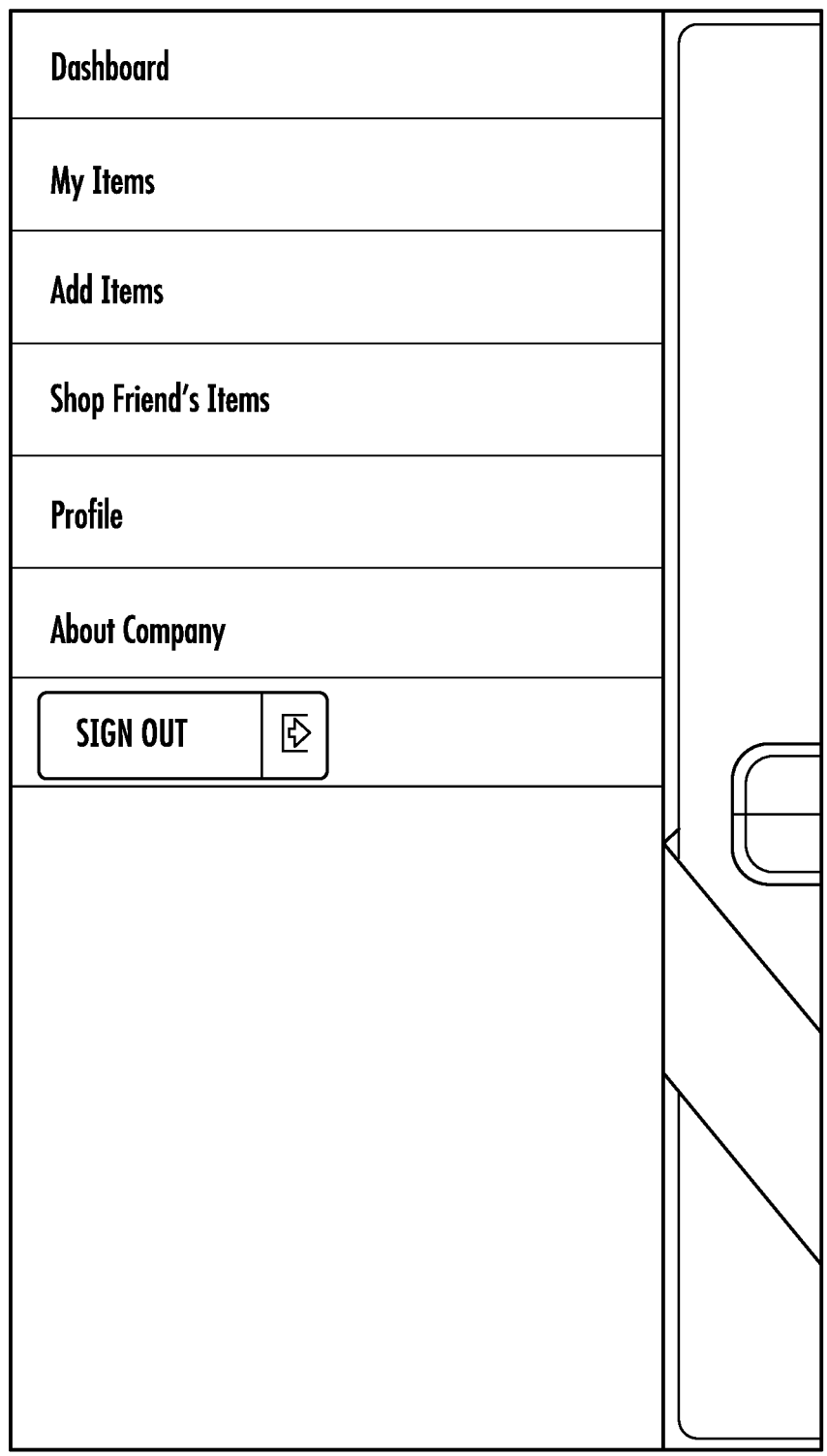
Figure 15:
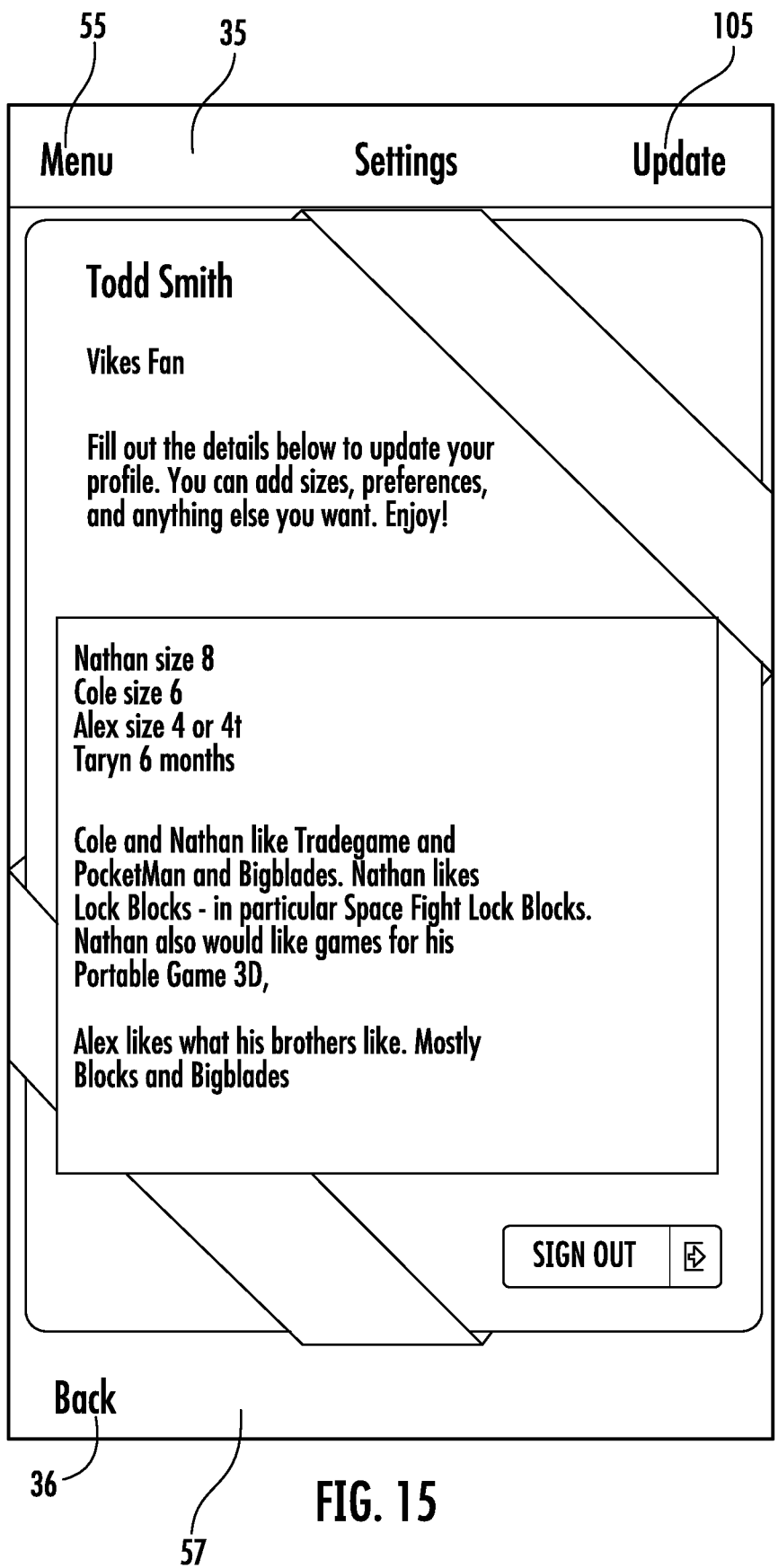
Figure 16:
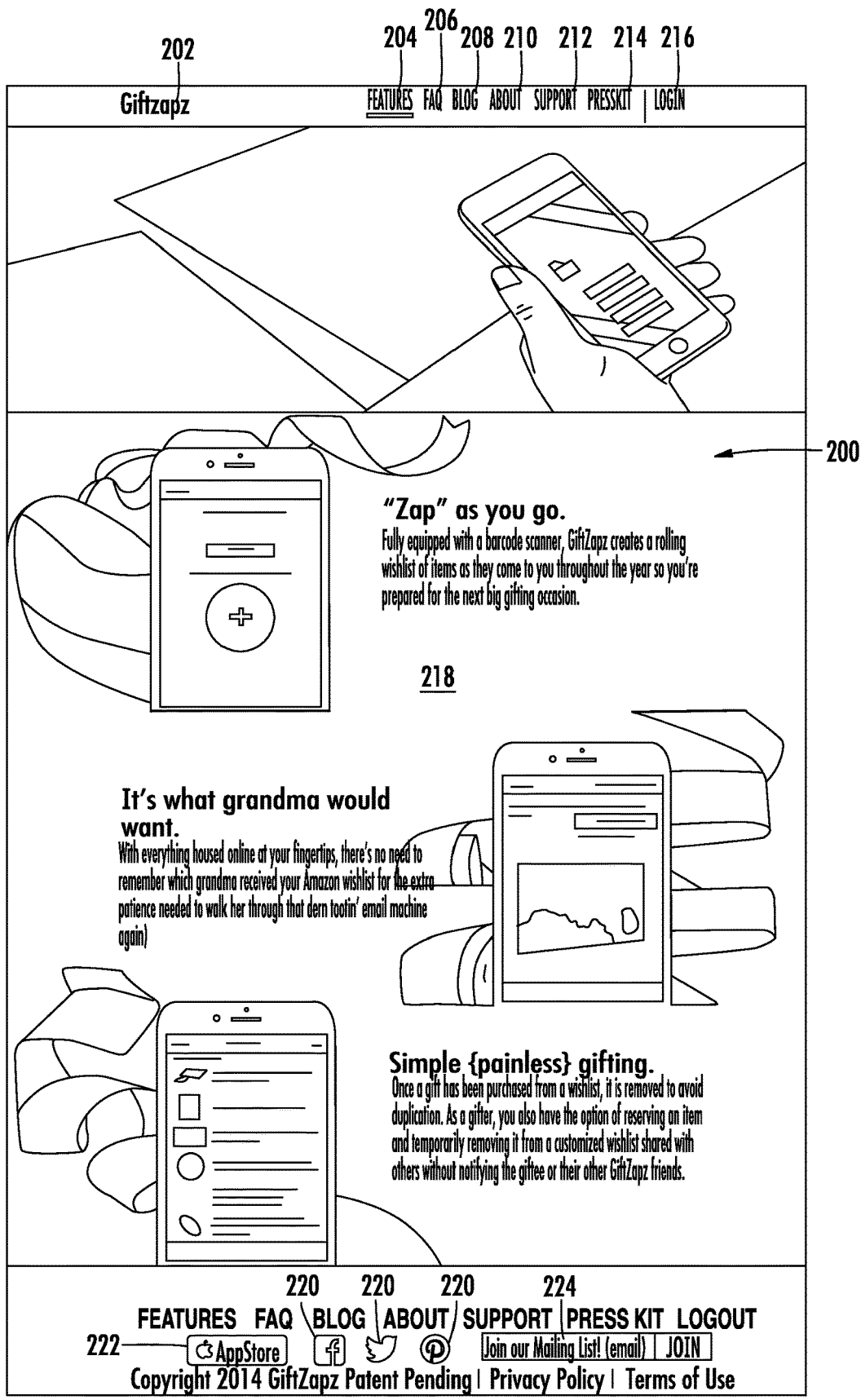
Figure 17:
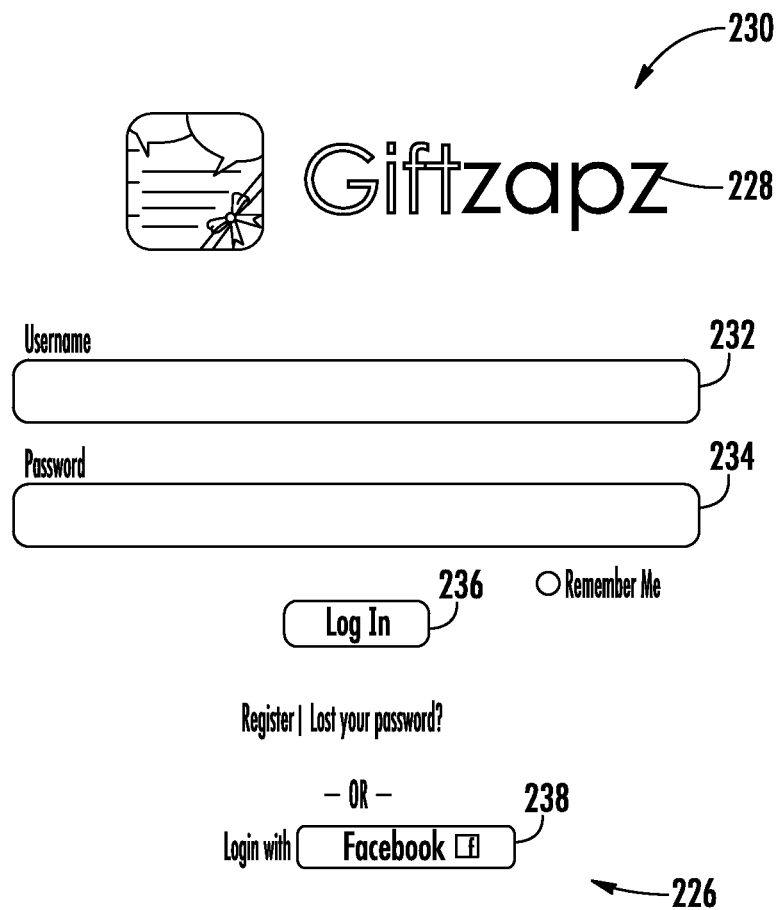
Figure 18:
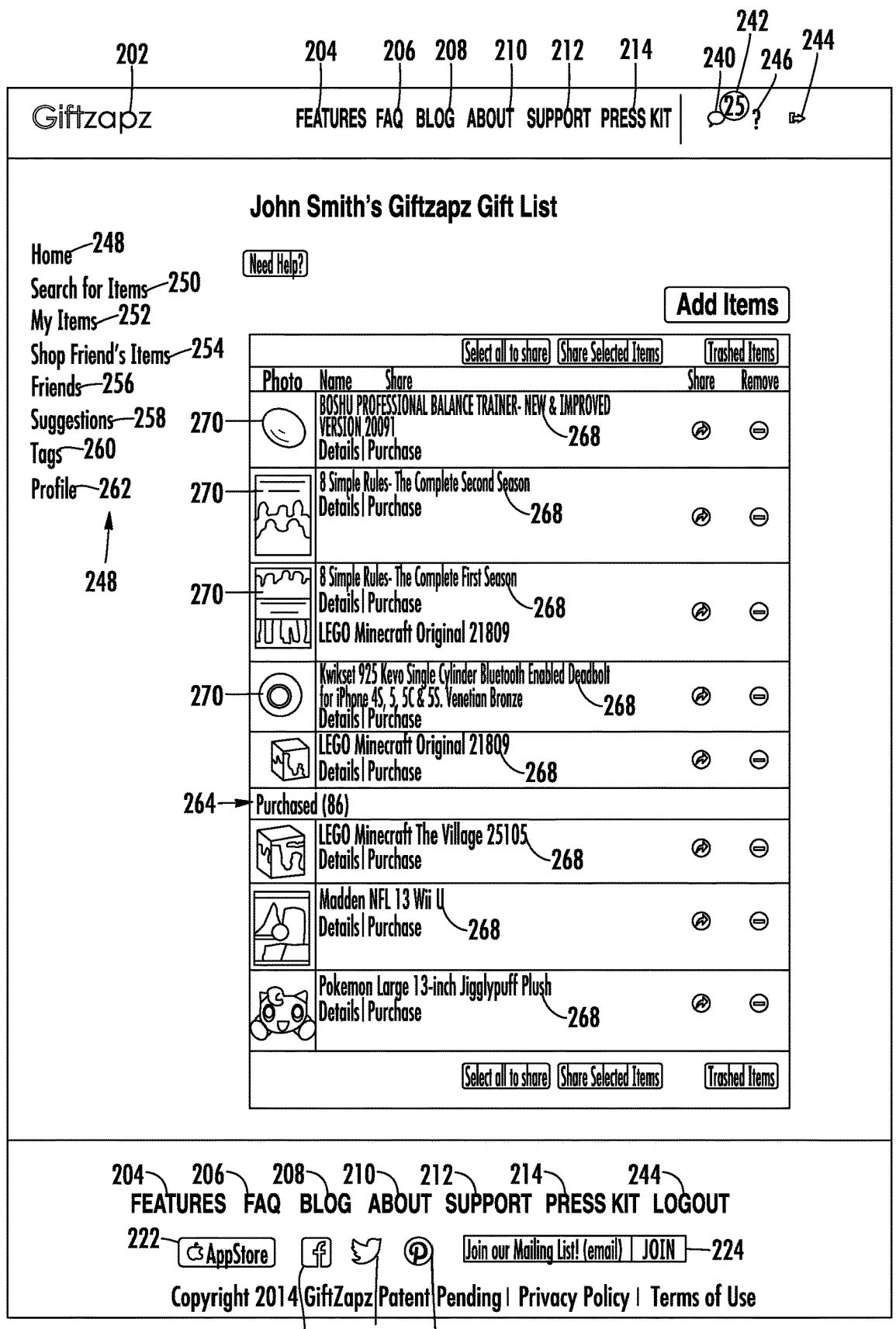
Figure 19:
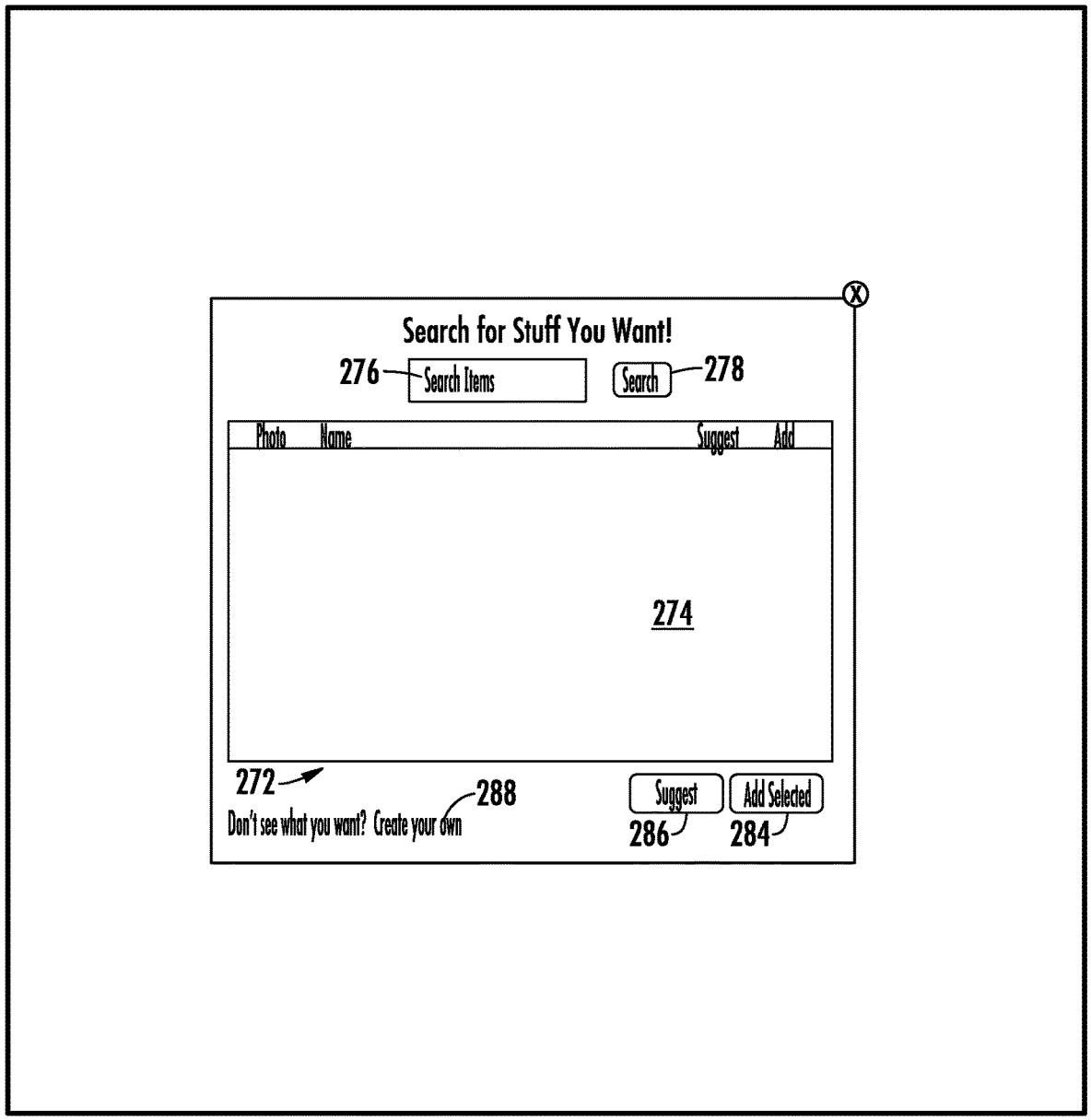
Figure 20:
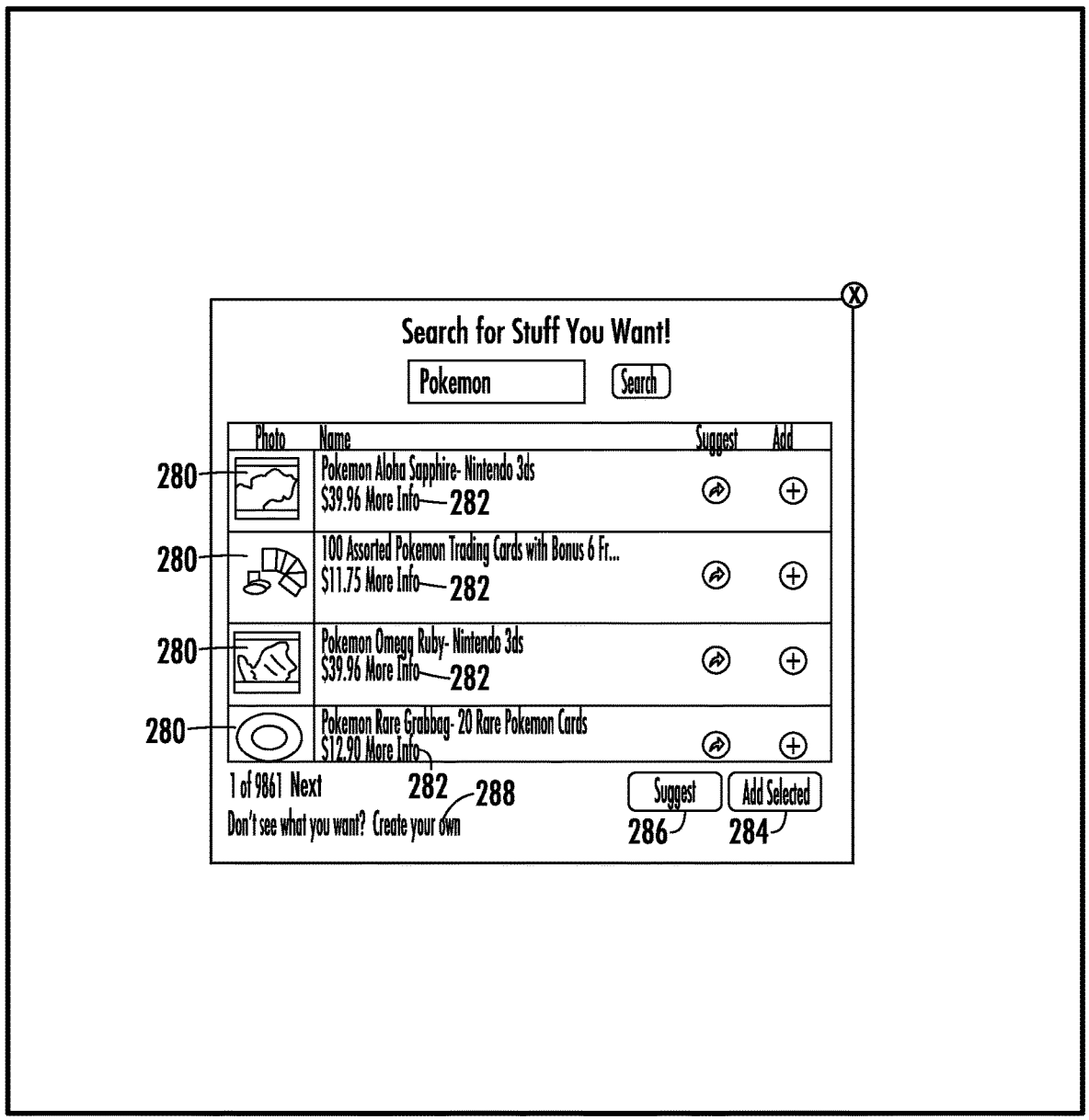
Figure 21:
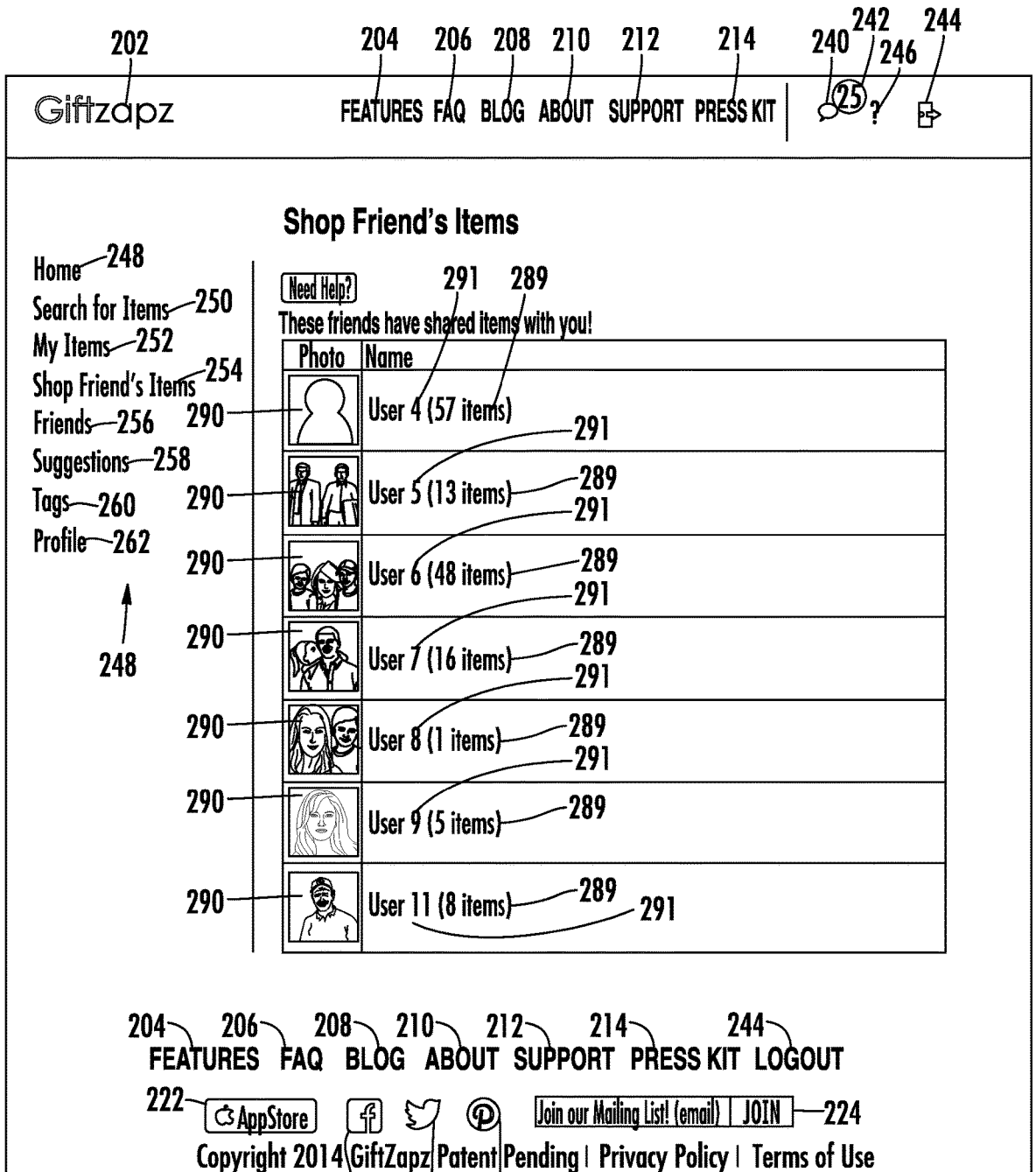
Figure 22:
Figure 23A:
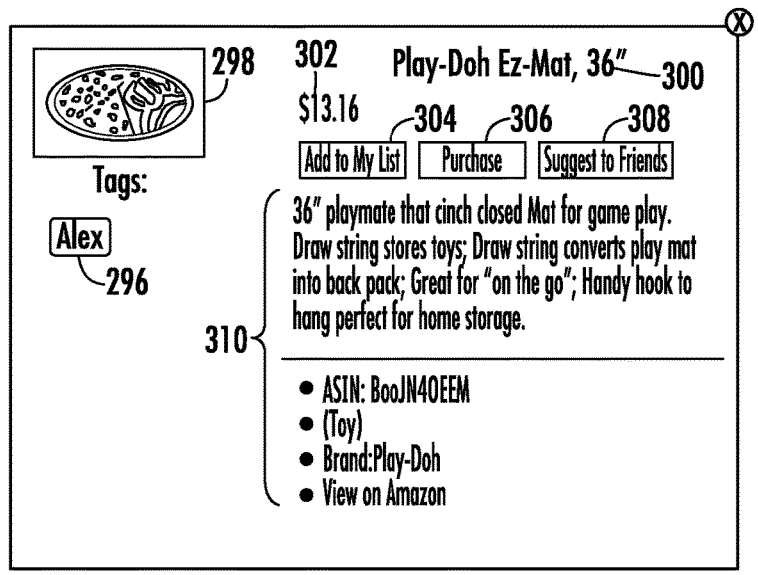
Figure 23B:
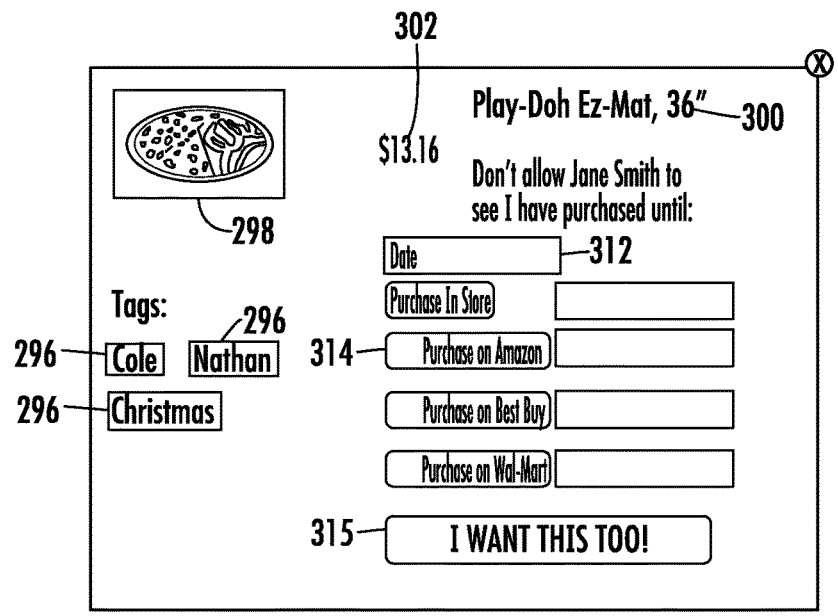
Figure 24A:
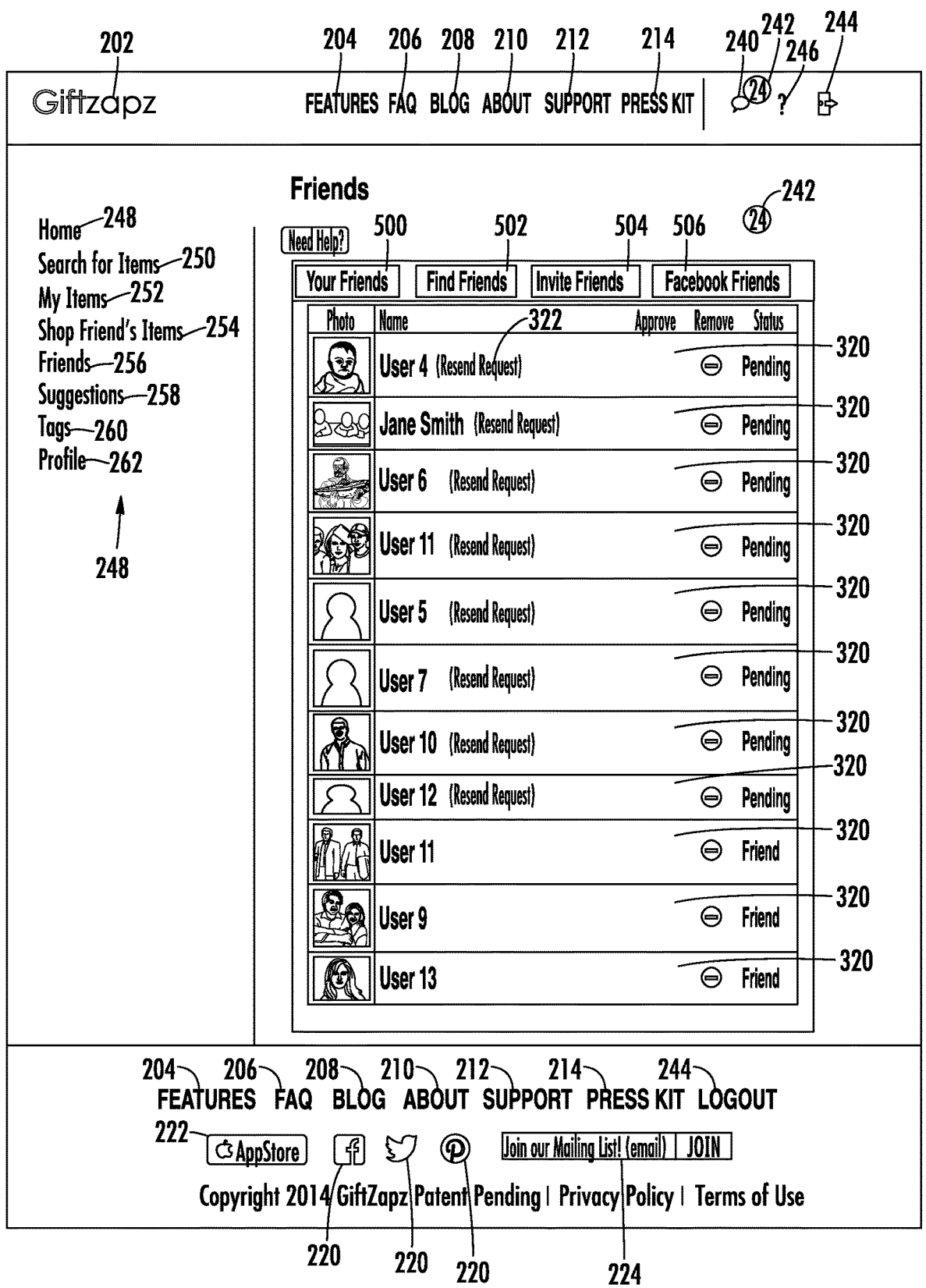
Figure 24B:
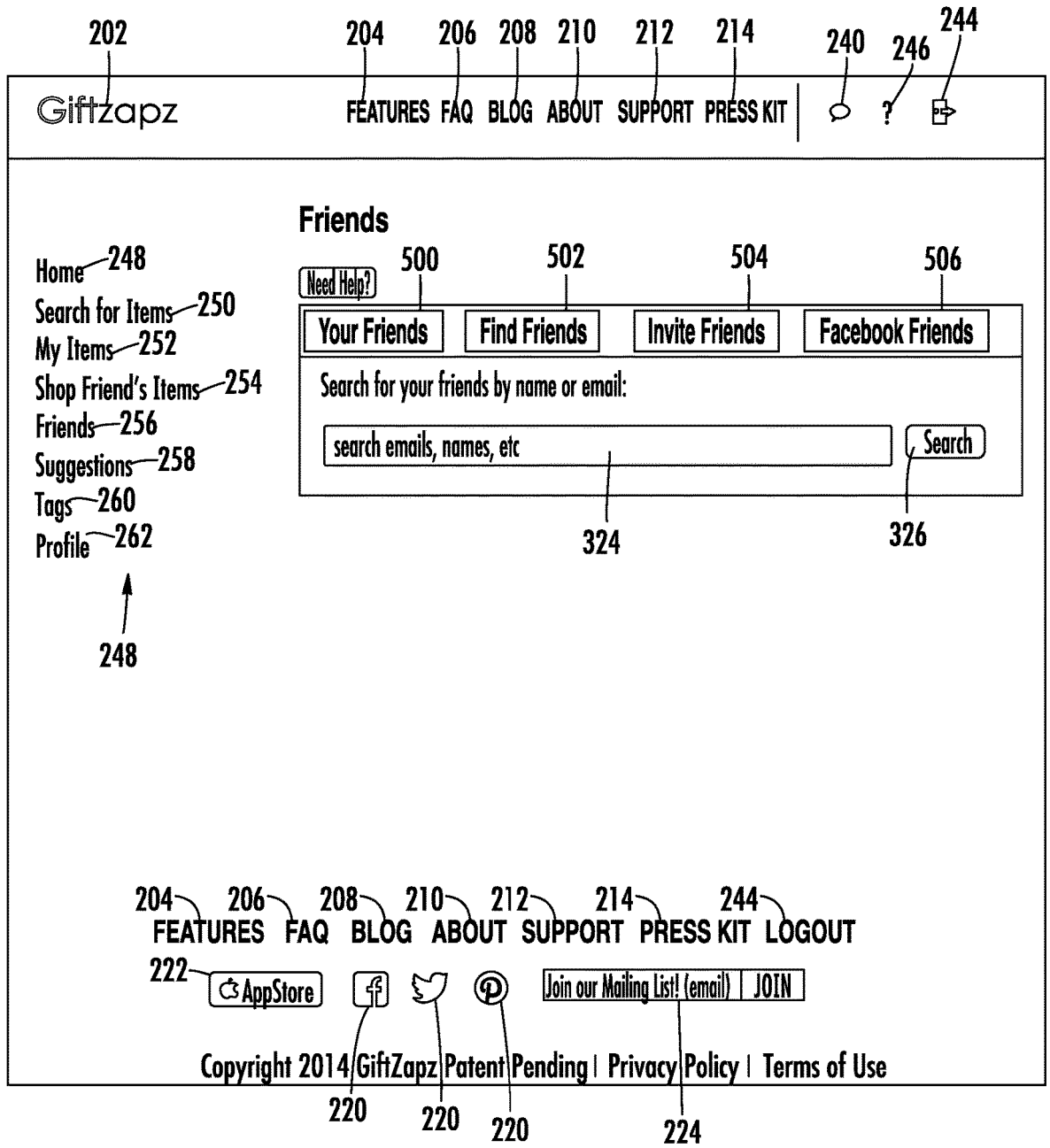
Figure 24C:
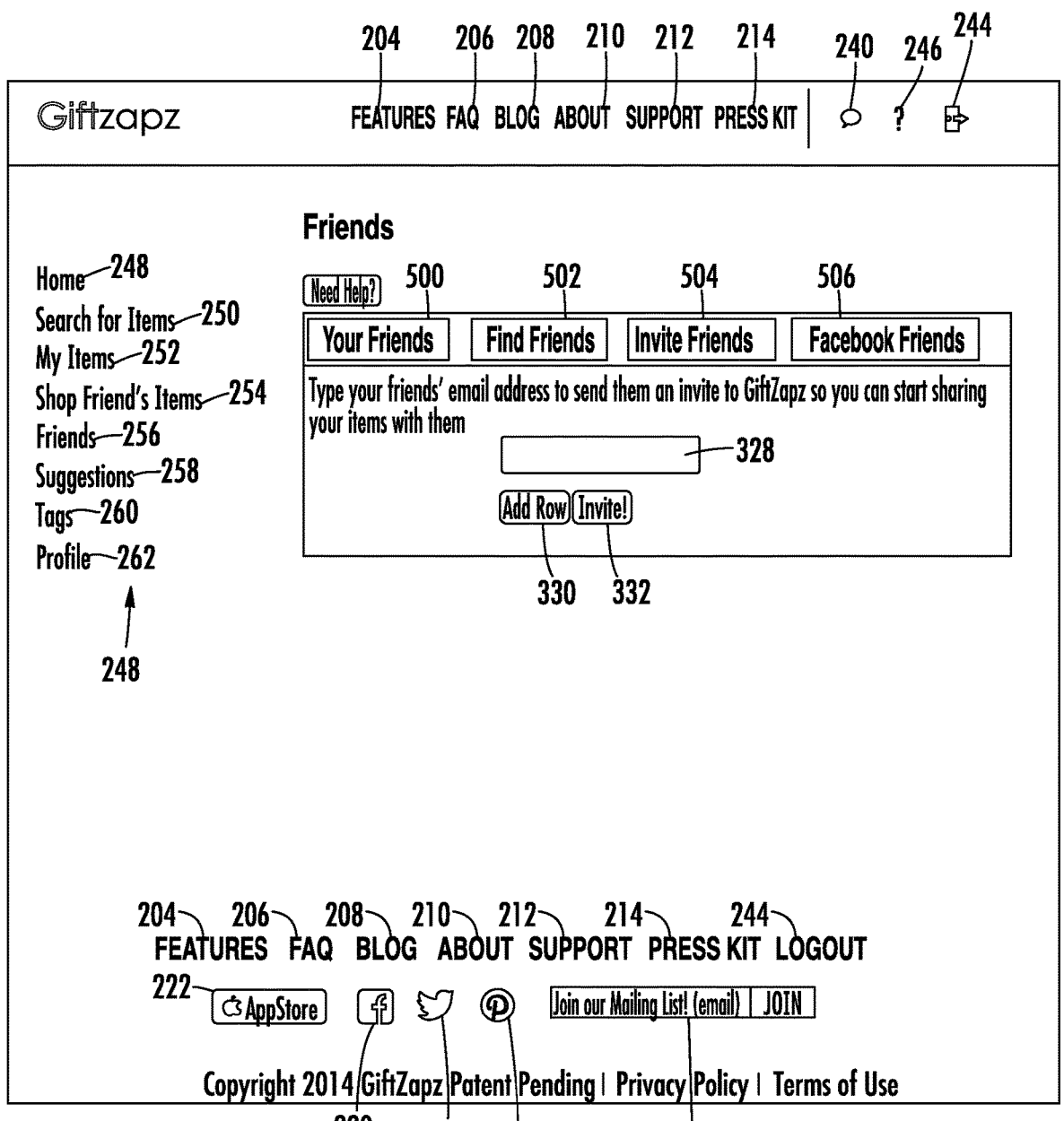
Figure 24D:
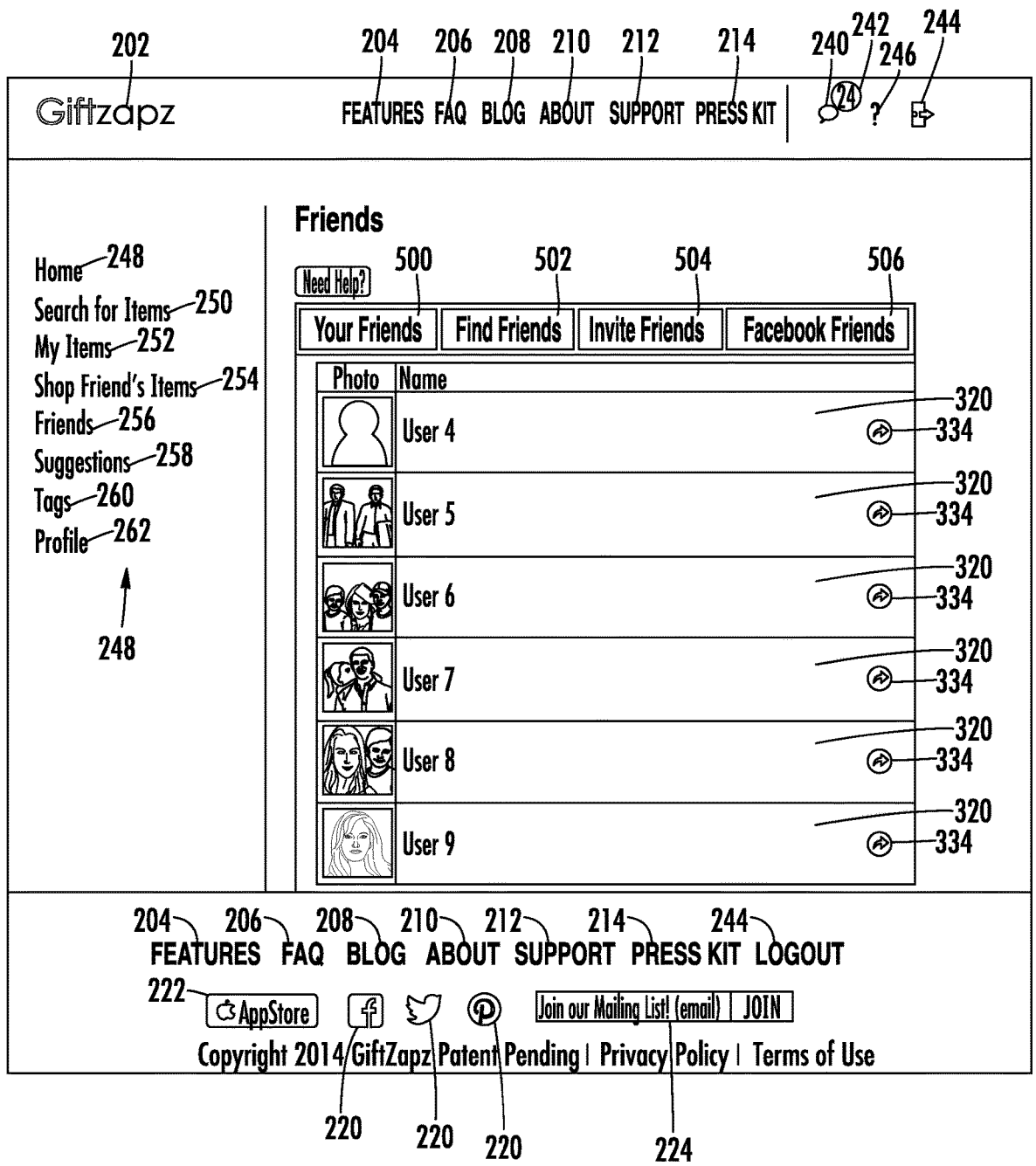
Figure 25:
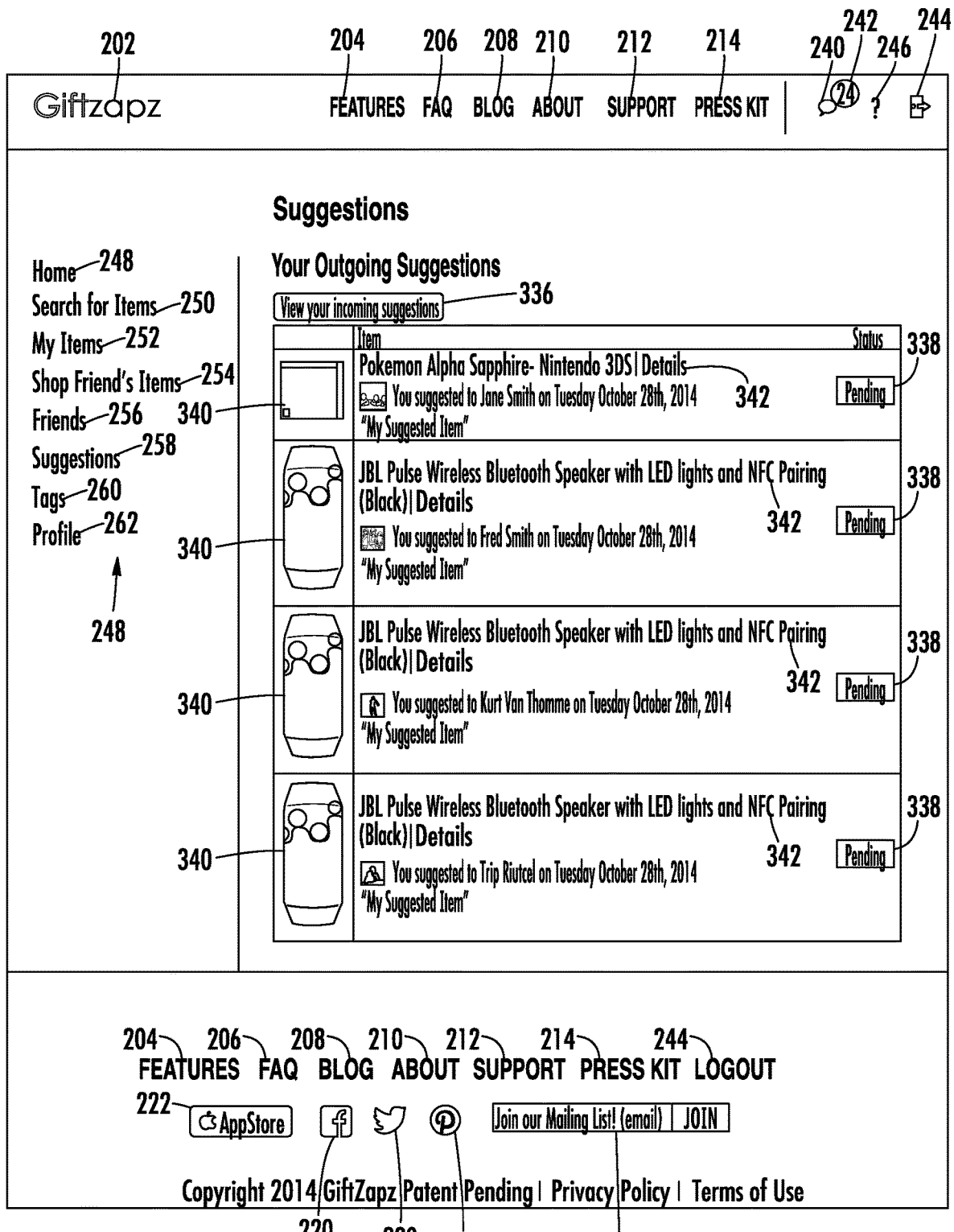
Figure 26:
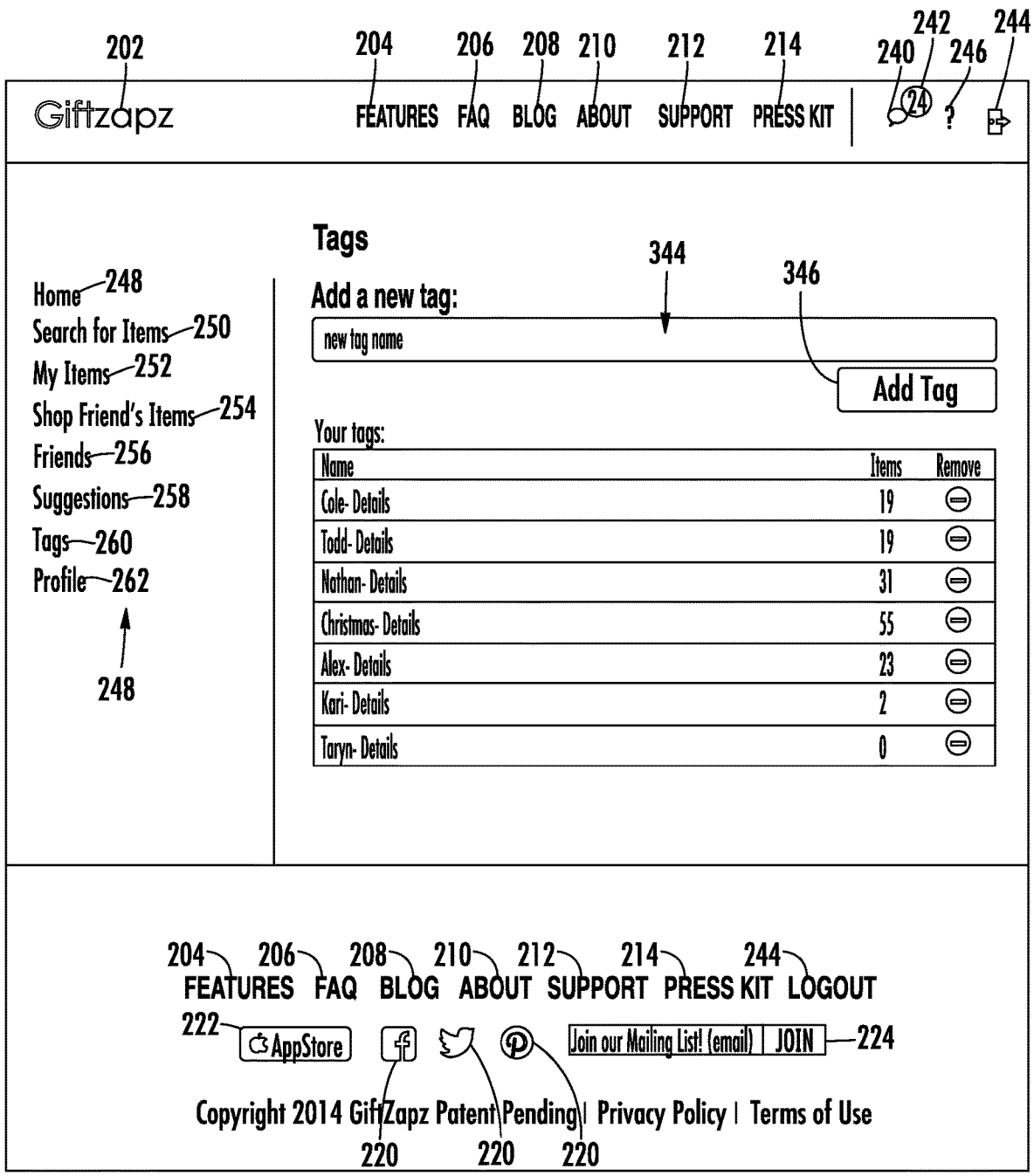
Figure 27:
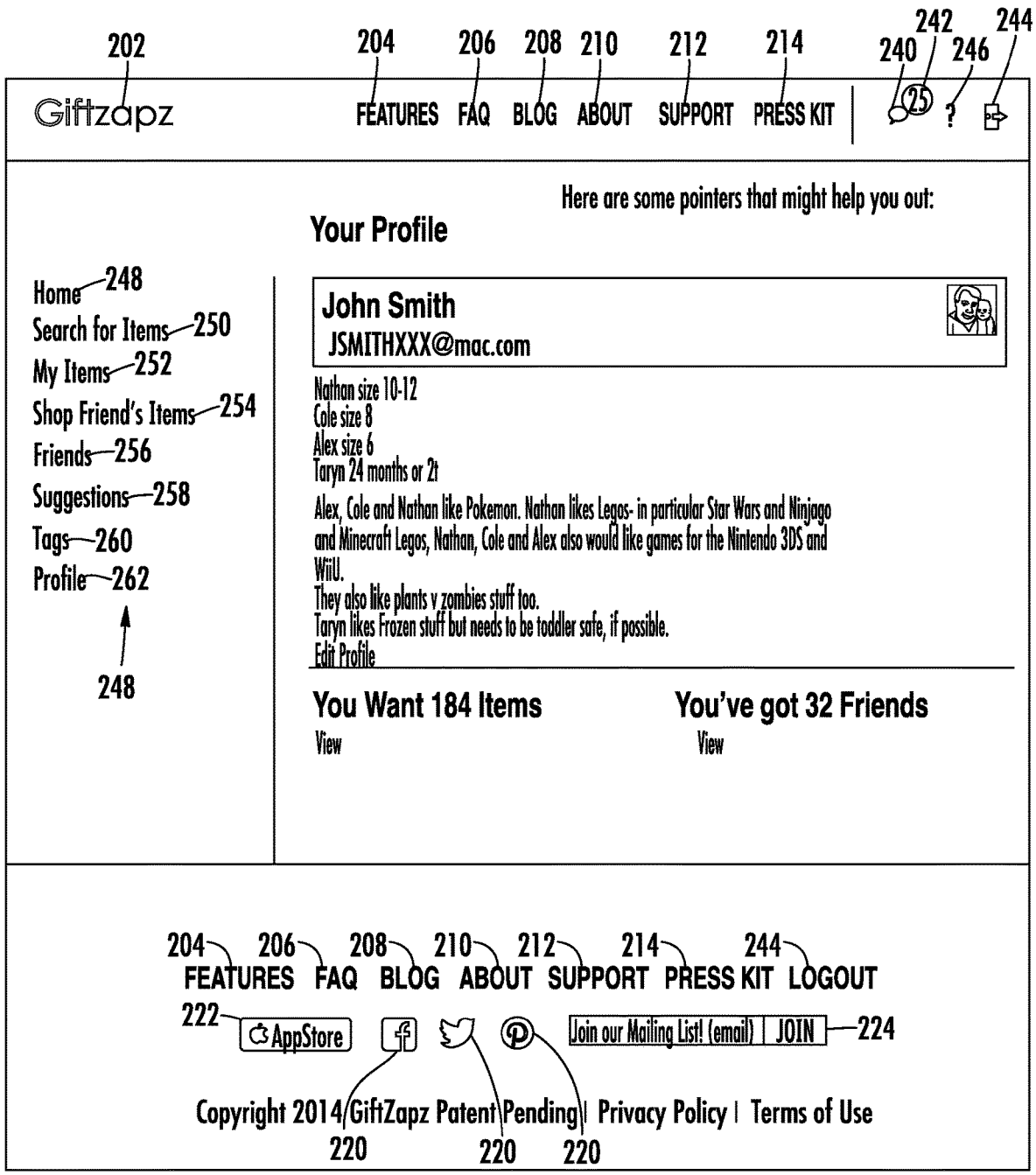
Figure 28:
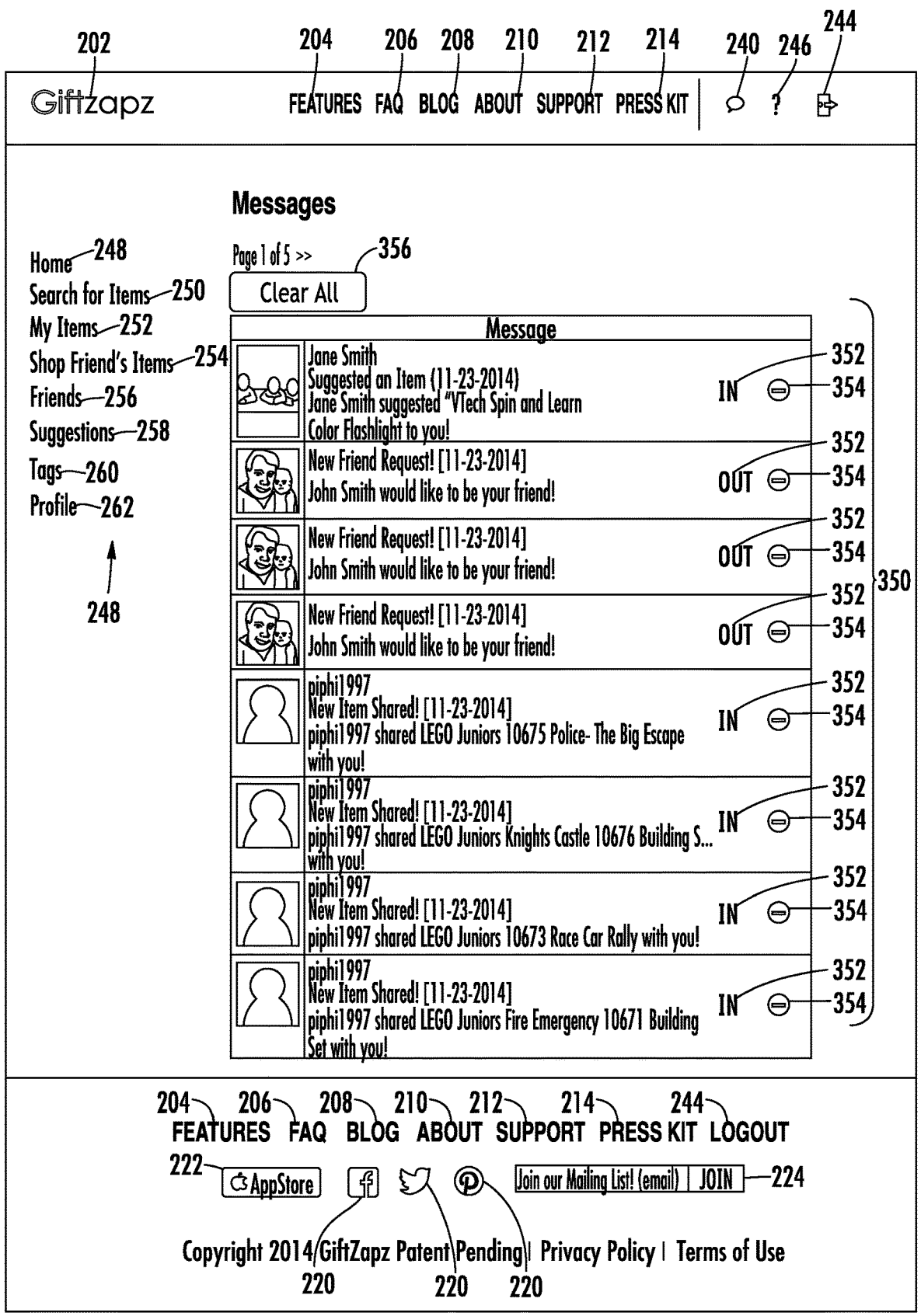
Figure 29:
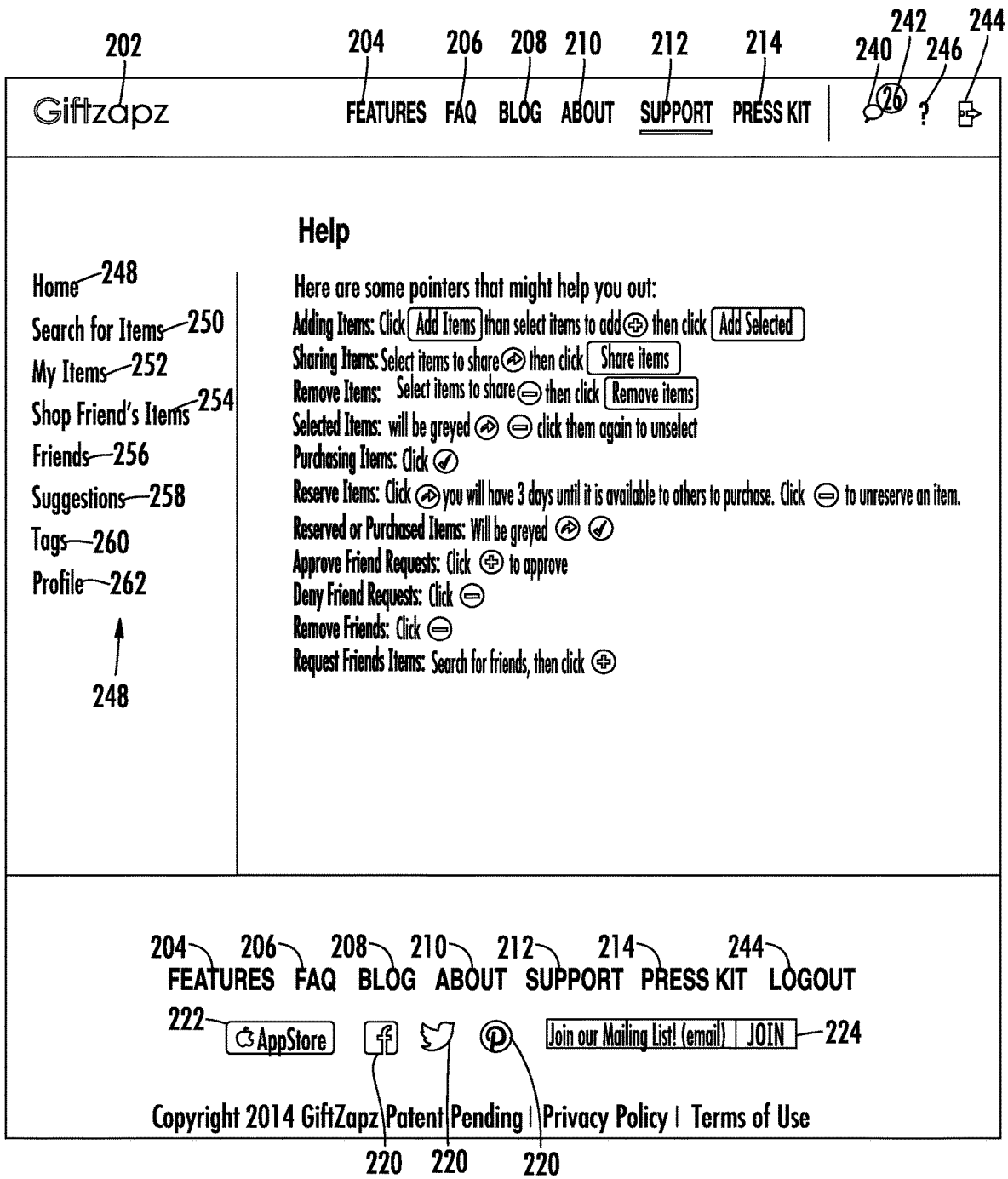
Figure 30:
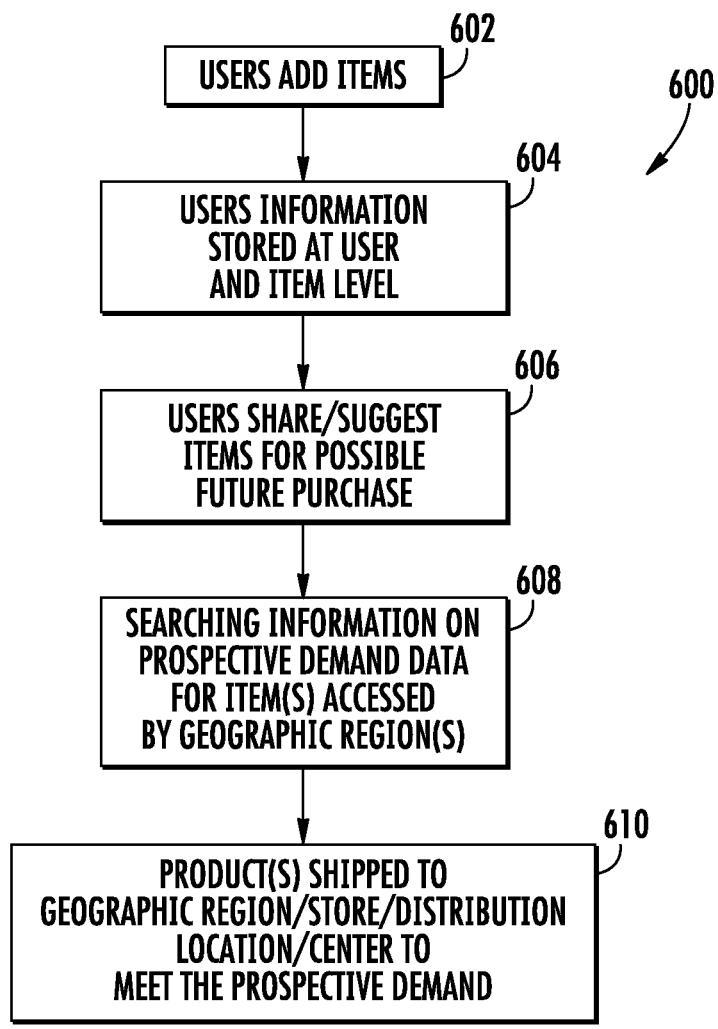

FIGS. 2B-D is an alternative landing screen shown on a mobile computing device incorporating at least one camera, typically on the back side and more typically on the front and back side of the device where the screens each display a different picture and information about the system quickly by the user swiping the touch sensitive screen of the mobile computing device from right to left or left to right;

FIG. 2E is an exemplary login screen reached by activating the "log in" link on the mobile computing device according to the embodiment shown in FIGS. 2B-D;

FIG. 3A is a registration page of a mobile application according to an aspect of the present disclosure;

FIG. 3B is an exemplary "sign up" page reached by activating the "sign up" link on the landing screen in the embodiment shown in FIGS. 2B-D;

FIG. 4A is a home page or dashboard of a mobile application according to an aspect of the present invention where a user is already logged into the application;

FIG. 4B is an exemplary landing screen if the user is already logged into the mobile application portion of the systems of the present disclosure according to the embodiment shown in FIGS. 2B-E and 3B;

FIG. 5 is an add item(s) page of an aspect of a mobile application according to an aspect of the present invention;

FIG. 6 is a perspective and enlarged view showing use of a mobile computing device's rearward camera to scan a code on an item where the code is query to a database and information is displayed to a user to allow the user to easily add the item to an item list within the mobile application according to an aspect of the present invention;

FIG. 7 is an exemplary display of queried search results page from either a code scan or a keyword query by the user through the input information into the add item(s) page of FIG. 5;

FIG. 7A is a detailed view of an item revealed by the database query and shown in FIG. 7;

FIG. 7B is a schematic view of an exemplary display of a page of the mobile application displayed to the user when the database results in no information related to the query by the user or information related to the code scanned by the user to be displayed to the user;

FIG. 7C is schematic view of an exemplary page according to a mobile application of the present invention wherein the user can manually add information about an item into the database and list the item in the user's items page;

FIG. 7D shows an exemplary geo-positioning query that appears when the "Select Location" activation box of FIG. 7C is activated showing retailers/vendors that are proximate the location of the user;

FIG. 7E is an exemplary item tag list page/display of the mobile application of the system according to an aspect of the present disclosure;

FIG. 7F is an exemplary add tag page/display of the mobile application of the system according to an aspect of the present disclosure;

FIG. 8 is an item's listing of items in a user's "My Items" listing, which shows all items both unpurchased, and any purchased items that have been entered into the mobile application (unless deleted by the user);

FIG. 8A is a detailed view of an individual item from the "My Items" listing of FIG. 8 providing the user with the ability to directly purchase items themselves off of the user's own "My Items" list;

FIG. 8B is a display to the user prompting whether or not the user would like to purchase the item via one or more website retail sites (any online shopping site including an online site of a traditional brick and mortar store such as Target.com) or a brick and mortar "In-Store" retail store (physically present at TARGET®, for example;

FIG. 8C is a detailed view of a page related to the website retail site of XYZ (a company offering a good or service online to users—this could be AMAZON.COM® or Target.com or other online retailer) shown on the website XYZ.com allowing for immediate purchase of the item;

FIG. 8D is a user input request screen providing options for when the user would like the item to be displayed in the database as purchased for themselves or the friend they have purchased the item for thereby delaying the notification to the friend of the purchase;

FIG. 8E is the user information request screen that occurs when the user activates the "Custom" indicator in FIG. 8D;

FIG. 9 is a display page within the mobile application that is received when a user selects the "Shop Friend's Items" button of FIG. 4;

FIG. 10 is an exemplary data input screen allowing data entry and searcher for additional "friends" of the user, which appears after the "Plus Symbol" is activated on the mobile application screen of FIG. 9;

FIG. 11A is an exemplary user information request screen that appears when the "Share Items" button is selected on the screen of FIG. 8 or 11;

FIG. 11B is the mobile application page of FIG. 11A with items selected to be shared with one or more friends using the application;

FIG. 11C is a user display, which appears after the user again activates the share items link on FIG. 11B;

FIG. 11D shows FIG. 11C with friends selected to have the selected items of FIG. 11B shared with them;

FIG. 11E is the user display screen that appears in order to confirm to the user that items have been shared with their friends using the mobile application;

FIG. 12 is a display screen according an aspect of the present invention that is displayed to a user when activating the "Shop Friend's Items" button of FIG. 4;

FIG. 13 is a display of information about an individual friend of the user received by the user after selecting one of the friends listed in FIG. 12;

FIG. 13A is an exemplary display on the mobile application of detailed information about an item shared by another user of a system according to an aspect of the present disclosure;

FIG. 13B is an exemplary display on the mobile application according to an aspect of the present disclosure prompting the user for where the item will be purchased after activating the "Purchase Item" link shown in FIGS. 13A and 13B;

FIG. 13C is an exemplary display of an online retailer's website where the item to be purchase may be purchased according to an aspect of the present disclosure;

FIG. 13D is an exemplary display of a delayed notification data entry prompt where the giftor/purchaser may input when the giftee will be informed via the system of the present disclosure that the item has been purchased;

FIG. 13E is an exemplary display shown to the giftor/purchaser if the "Custom" link is selected from FIG. 13D according to an aspect of the present disclosure (it is also contemplated that a calendar view to set the date may be displayed in the alternative);

FIG. 14 is an exemplary view of a quick access tool bar viewable by a user by executing a swiping gesture to the right within any page of the mobile application;

FIG. 15 is an exemplary view of a profile of an individual user according to an aspect of the mobile application of the present disclosure;

FIG. 16 is an exemplary home page view of a website in communication with the database and core system of the present disclosure;

FIG. 17 is an exemplary login page of a website corresponding to an aspect of the present disclosure;

FIG. 18 is an exemplary "My Items" page listing all of the items on a user's wish list according to an aspect of the present disclosure;

FIG. 19 is an exemplary page display screen, which in one embodiment is a pop-up window over the window being displayed and in another embodiment is a separate web page that allows for the keyword search for items wanted by the user to add to the wish list of gift items the user wants and/or for items to suggest to another user to add to that user's wish list;

FIG. 20 is an exemplary page display screen showing search results of an exemplary keyword search in the window of FIG. 19;

FIG. 21 is an exemplary display screen of a listing of friends of the user that have shared items they want to receive as a gift with that particular user;

FIG. 22 is an exemplary display screen of a particular list of items one of the user's friends wants to receive with tags for people, events, and/or locations to purchase the item shared with the user by the user's friend;

FIG. 23A is an exemplary detailed view of an item on a user's friend list of items shared with the user from that friend's wish list that the user's friend would like to receive as a gift;

FIG. 23B is an exemplary display to a user of a purchase detail view of an item on a user's friend list of items shared with the user from that friend's wish list that the user's friend would like to receive as a gift;

FIG. 24A is an exemplary display to a user of a user's friend's with the "Your Friends" tab and listing the user's friends on the system according to an aspect of the present disclosure;

FIG. 24B is an exemplary display of the "Find Friends" tab of the user's friend page of FIG. 24A that allows a user to input data into the data entry field and search for friends by, for example, either their name, email, or some other data that allows for identification of the friend on the system;

FIG. 24C is an exemplary display of the "Invite Friends" tab of the user's friend page of FIG. 24B that allows a user to input data into the data entry field (email address typically) that sends an invitation to a friend of the user to join the system of the present disclosure;

FIG. 24D is an exemplary display of the "Facebook Friends" (or other social network tab) tab of the page of FIG. 24A that allows a user to invite their friends to join the system of the present disclosure via FACEBOOK® and/or other social networking system;

FIG. 25 is an exemplary display of the "Suggestions" page according to an aspect of the present disclosure displaying to a user items that have been shared out to other users/friends on the system;

FIG. 26 is an exemplary display of the "Tags" page that lists and allows a user to modify, add or delete various tags that can be applied to individual items in a user's wish list;

FIG. 27 is an exemplary display of the "Profile" page that displays to a user the user's profile that is able to be seen by other users of the system;

FIG. 28 is an exemplary display of the "Messages" or Notifications received by the user via the system, typically including shared items, suggestions, and friend requests;

FIG. 29 is an exemplary display of the "Help" page describing to the user various help function and the meaning of any/various symbols used in connection with the website portion of the system of the present disclosure; and FIG. 30 is a flowchart describing a process of the present disclosure and use of the system allowing one more retailer to move/transport one product sold by the retailer, but more typically a plurality or substantially all of the items (products) sold by a retailer in a variety of geographic locations or distributed from a variety of locations and shared by users of the system of the present invention based upon information from the systems of the present disclosure, which approximates demand on a specific item in advance of the purchase time to the items sold/to be offered for sale by the retailer.

SUMMARY OF THE INVENTION

A special programs computer, which executes the program on a non-transitory computer readable medium, stores one or more programs and the graphical user interface on a computing device with a touch screen display, a memory, and one or more processors to execute one or more programs stored in the memory, wherein the touch screen device operatively connected to one or more database servers via a wired or wireless network of the present invention, unlike traditional registries, allows for sharing individual selected items (at the item level) off a list with one or more selected individuals and also prevents the gift receiver from being notified that the gifted item has been purchased for them until after a later date, which Is typically set by the gift purchaser, but could be a future date set by the gift list creator so long as that date is set in the future (i.e. a wedding shower date, wedding date, or baby shower date—some event date typically). Most often the date is set by the gift purchaser. As a result, even though the gift has been purchased, the person receiving the gift is unaware. Advantageously and significantly, after the item has been purchased by someone, anyone else who the gift list creator shares that item with will not see the item in the listing of items the gift list creator desires despite the fact that the gift list creator may share that item with them. In this manner duplicative gifts are avoided without the knowledge of the gift receiver/gift list creator.

An aspect of the present disclosure includes a system having a web-enabled computing device in communication with a plurality of computer server systems via the internet wherein the plurality of computer server systems comprise: central hub server system of one or more servers and at least one retailer server system having information stored and configured to be communicated therefrom based upon an instruction received from the central hub server system, wherein the information stored on the at least one retailer server system is information about a plurality of products offered by the retailer including item descriptions, at least one product identifier, product pricing information, and a photograph of the product, and wherein the web-enabled computing device further comprises: a display; one or more processors; memory; and a program. The program is configured to be executed by the one or more processors. The program includes instructions for: displaying a login screen on the touch sensitive display screen of a mobile application whereby a first user may login to use the mobile application; displaying a home screen allowing linking to different functions including an add item instruction set, a shop friend's items instruction set and a list management instruction set wherein activation of the add item instruction set is accomplished by the user touching the touch screen display of the device on the home screen corresponding to the activation instructions for the add item instruction set; wherein activation of the a list management instruction set is accomplished by the user touching the touch screen display of the device on the home screen corresponding to the activation instructions for the an item management instruction set; and wherein activation of the shop friend's items instruction set is accomplished by the user touching the touch screen display of the device on the home screen corresponding to the activation instructions for the shop friend's items instruction set; adding an item to a displayed list of products on a gift item listing shown in response to the instructions for the list management instructions being activated by a first user by activating the add item management instruction set and the first user inputting product chosen from: (1) at least one keyword into a keyword search field and/or (2) a product identifier, wherein the product identifier is added using an input receiving device to intake visual, audio, or visual and audio input and associate the product identifier with a particular product, wherein the product data is transmitted to the central hub server system and to at least one retailer server system where the retailer server systems thereafter transmits to the central hub server system at least one product corresponding to the product data inputted by the first user; and sharing one or more shared items that may include purchased or unpurchased items desired by the first user, with a second user via the central hub server system wherein the second user causes only unpurchased item to be displayed to the second user in response to the second user using the program on a computer system in order to activate the shop friend's items instruction set and the second user may view individual unpurchased items and purchase the unpurchased item for the first user using the program, resulting in the unpurchased item that is purchased by the second user becoming an unpurchased item in the first user's displayed list of products.

Another aspect of the present disclosure is directed to a non-transitory computer readable medium storing one or more programs, wherein the one or more programs, when executed by a processor of a special program computer, execute the steps, including: displaying a GUI for a login screen for a mobile application whereby a first user may login to use the mobile application; displaying a home screen allowing linking to different functions including an add item instruction set, a shop friend's items instruction set and a list management instruction set, wherein activation of the add item instruction set is accomplished by the user touching the touch screen display of the device on the home screen corresponding to the activation instructions for the add item instruction set; wherein activation of the a list management instruction set is accomplished by the user touching the touch screen display of the device on the home screen corresponding to the activation instructions for the a item management instruction set; wherein activation of the shop friend's items instruction set is accomplished by the user touching the touch screen display of the device on the home screen corresponding to the activation instructions for the shop friend's items instruction set; adding an item to a displayed list of one or more gift items listing shown when the instructions for the list management instructions are activated by a first user by activating the add item instruction and the user inputting data chosen from the group consisting of at least one keyword into a keyword search field and a product identifier wherein the product identifier is added using an input receiving device to intake visual, audio or visual and audio input; sharing one or more desired items from the displayed list of one or more gift items desired by the first user with a second user and a third user wherein only unpurchased items to be displayed to the second user are displayed when the second user uses the program executed on a computer system to activate the shop friend's items instruction set, wherein the second user may view individual unpurchased items and, prior to the third user purchasing an unpurchased item, purchase the unpurchased item for the first user using the program such that the unpurchased item that is purchased by the second user becomes a purchased item; and sharing, by the first user, one or more of the unpurchased items with the third user who will be unaware of a desired item if it has already been purchased by the second user through the program and the first user will not be aware of the purchased item until a time set by the second user.

Yet another aspect of the present disclosure is generally directed to a graphical user interface on a computing device with a touch screen display, a memory, and one or more processors to execute one or more programs stored in the memory wherein the touch screen device operative connected to one or more database servers via a wired or wireless network, the graphical user interface including: a home screen having icons for linking to an add product screen, a shop friend's products screen and a one or more product management screen; wherein the add product screen is configured to display to a user at least one of a textual keyword search field and an icon that responds to a user to activate a data receiving device to input data wherein the data that is inputted by the users is chosen from the group consisting of at least one keyword via the textual keyword search field and a product identifier, wherein the product identifier is added using the input receiving device to intake visual, audio or visual and audio input and display a listing of search result or a no search result notification to the user in a search results display, and wherein the search results display allows a user to select one of the search results and either display a detailed product display or communicate with the one or more databases to add the product to the one or more product management screen and wherein the detailed product display has an icon that, in response to being activated by a user, communicates with the one or more databases to add the product to the one or more product management screen; wherein the one or more product management screen displays one or more icons corresponding to one or more products and further displays an icon that enables the user to select one or more of the products on the one or more product management screen and share the selected products with one or more product management screen and share the selected products with one or more other users by displaying a list of other users wherein the user may select one or more of the users to share the one or more shared products with and an icon to finish the sharing that causes the products to be shared with the one or more other users and communicate that sharing with the one or more databases via the wired or wireless network; wherein the shop friend's products display displays a listing of other users, which when selected displays a subsequent screen with a listing of products for the other users that have not been purchased and are available for purchase by the first user and wherein when one of the unpurchased products of the other user is selected either a display permitting the purchase of the unpurchased product is displayed or a detailed view of the unpurchased product is displayed where the detailed view of the unpurchased product permits the purchase of the unpurchased product; and wherein in response to the purchasing the unpurchased product the program displays a graphical user interface that requests the user to identify a date that the other user will be notified that the unpurchased product has been purchased.

In another aspect of the present disclosure, a person (first user/Giftee) who would like to obtain an item inputs a plurality of items into the system to form a listing of desired, unpurchased items. Thereafter, the person shares, at their option and selection, from one to all of the desired items and determines which of a plurality of the desired, unpurchased items are able to be viewed by a plurality of first user selected users other than the person (first user) of the systems of the present disclosure and shares those desired, unpurchased items with the plurality of first user selected users other than the person (first user). After the desired, unpurchased items have been shared, when one of the plurality of first user selected users other than the first person purchases one of the desired items, the one of the plurality of first user selected users other than the first person selects and enters into the system of the present disclosure, the date that the first person will become aware that the desired item has been purchased and wherein the system automatically removes the desired item that has been purchased from be able to be viewed by any other person of the one of the plurality of first user selected users other than the first person.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting in any manner. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Figure 1A:
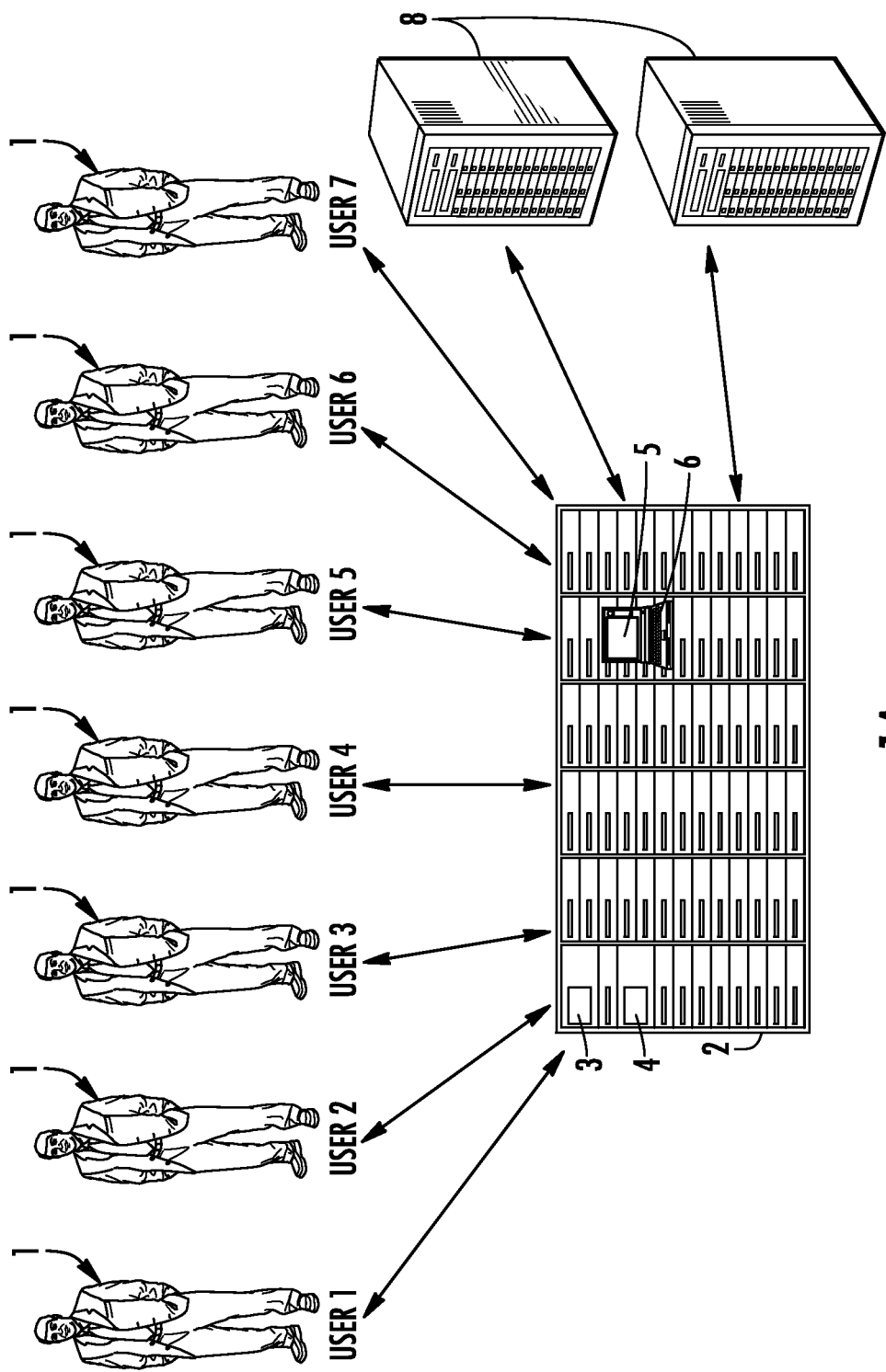
FIG. 1A is a schematic view of an aspect of a system of the present disclosure showing a plurality of users individually interacting with one another dynamically via a wish list server and other communicative components of an exemplary system according to an aspect of the present disclosure.
Figure 1B:
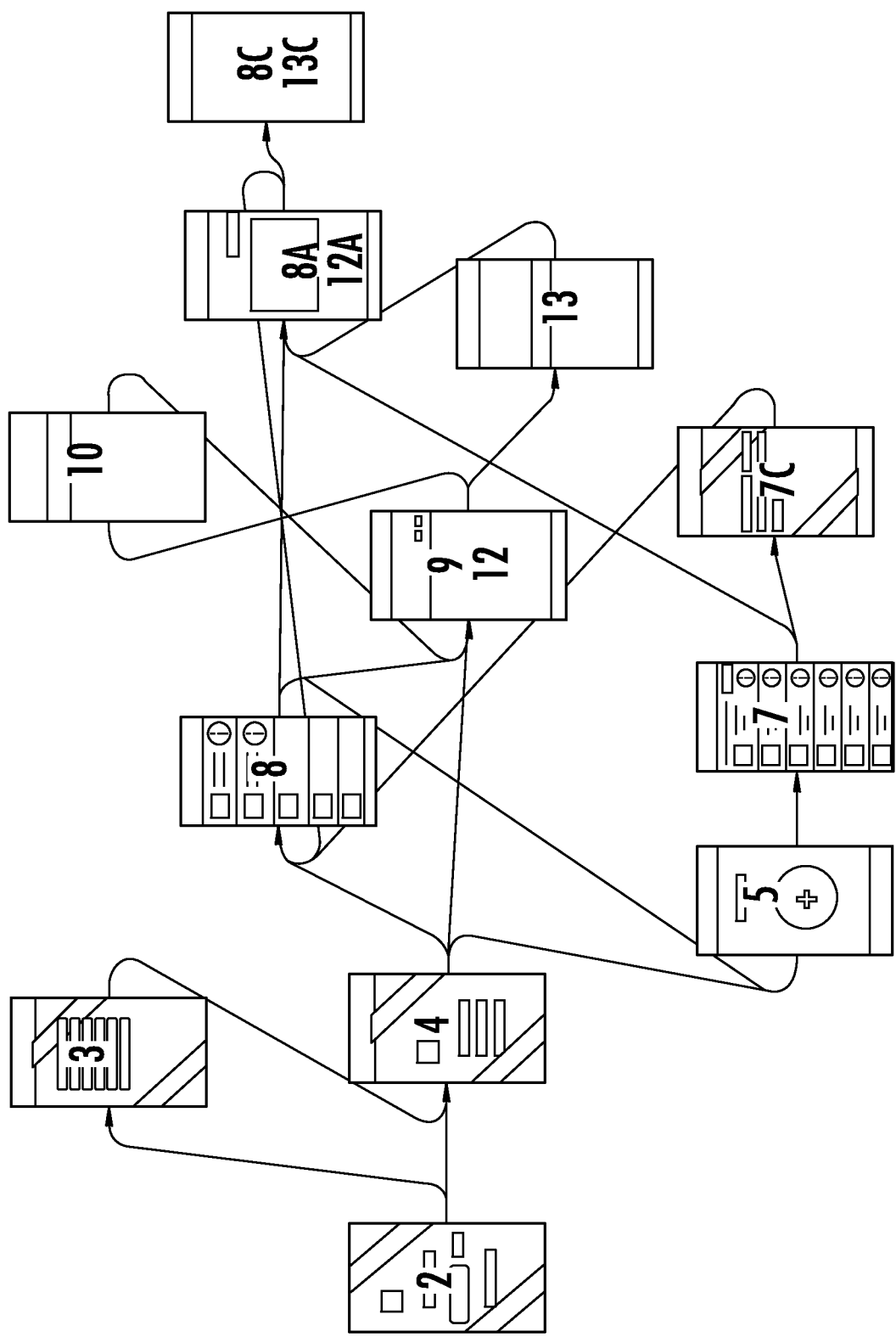
FIG. 1B is a schematic view of various mobile application software display screen portions shown to a user on a touch sensitive mobile device according to an aspect of the invention.

In this specification and the appended claims, the singular forms "a," "an" and "the" include plural reference unless the context clearly dictates otherwise, FIG. 1A shows an overall schematic of how a plurality of users of the system are able to dynamically interact with one another about gifts the users both want and buy on a customizable and substantially immediate basis in a manner that typically avoids duplicate gift receiving if all users operate the system. As shown in FIG. 1A, a plurality of users 1 can use the mobile (See FIGS. 2A-15) or website-based (FIGS. 16-29) user experience interface system to interact with the system. The gift list generation system portion of the overall system of the present disclosure includes at least one wish list server 2. As shown, website server 2 may include one or more processors 3 and one or more memory devices 4. The server may also include a display 5 and various user input devices including, for example, a keyboard 6. The website server 2 may be constructed using known hardware; however, such hardware is modified by storing and executing novel software that transforms the hardware of website server 2 into a specialized machine; i.e., a special purpose computer that performs novel functions by executing the software. Thus, the computer system described herein exhibits improved operation to implement the mobile application and corresponding gift list website. Such improved operations may include the manner in which website server 2 interacts with other web-enabled devices and servicers such as retail servers 7 and facilitates interactions between these other devices and servers. FIG. 1B shows a general schematic of the general flow path of certain screen shots shown in FIGS. 2A-15. Each of the individual screen shots/displays of FIG. 1B are labeled with their corresponding FIG. number.

Wish list server 2 is configured to interact with user web-enabled devices and seller web-enabled devices/servers 8, which can allow for the purchase of one or more item(s) from items shared with the user or on the user's own gift list, as discussed in more detail herein, or can allow the system to access one or more retailer database(s) for item specific information to be transmitted back to the user of the web-enabled device, which may be a mobile device 9 or a desktop computer or laptop computer system. The processor 3 is preferably configured by appropriate programming to enable each of the interaction, further described below, between the user of the web-enabled device and the user. The system allows for virtually instant or substantially simultaneous communication between users across the social networking system portion of the present disclosure. The system maintains a database of the items shared, the items added, the items suggest to another, the dates of each of these actions, and the geographic location of the user or users effected by the action (for example, adding the gift item to a user's list, sharing the user's item with another person would log the registration location, typically the home zip code, of both people). The database records and stores items at the retailer or source level, such as AMAZON® or BESTBUY®, based upon the retailer server that is queried by the system of the present disclosure. These are unique entries stored once per vendor/retailer. The identification from that item can be associated with multiple users as they are stored as a record or user ID to item (product) ID forming a user-item identification in the database. This enables a query of the frequency of item identification in the user item table of the database to determine the popularity of an item within the database. Searching may be further limited by geographic or other queries as discussed herein.

FIG. 2A shows an exemplary log-in screen 10 of a mobile application of the present disclosure including one or more decorative elements 12, which in this embodiment represent a wrapping paper on a gift, but could be other decorative elements corresponding to a narrower scope of the system such as a wedding or baby theme if the system were a system limited to a particular event or related events. Conceivably these elements could be customized by the user of the mobile application or corresponding web site (See FIGS. 16-29) and could include user selected art or photographs. The login screen further typically includes a trademark and/or mobile application icon 14, which is typically positioned proximate the top of the displayed screen in a mobile display header 15. Additionally, the log-in screen 10 typically contains the name of the mobile application or company producing/providing the mobile application to the user for use or some other/additional identifier 16.

The log-in screen 10 further typically Includes a social network log-in link 18. The social network log-in link 18, when activated by the user, typically prompts the mobile computing device utilizing the application to allow for the mobile application to access the user's social networking profile and information, and typically the user's Facebook® profile and related information. This information is typically reported back to the overall system's database structure upon permission provided by the user. The overall database structure provides a link between the mobile application and Internet website if the Internet site is used by the user. If the user does not wish to use the social network log-in link, a previously registered user may log-in with the username and password link by touching the user field, inputting the user's username, touching the password link and inputting the user's password which thereafter activating the log-in button 20. If the user has never previously logged in or the user is logging in through the social network link for the first time, the user will be prompted to enter additional information. In the case of the first log-in via the social network link, the user will typically be prompted to additionally provide the user's zip code or other geographic area designator such as city, state, other postal code and/or country. Activating the "register" link 22 causes the mobile application to display the registration page shown in FIG. 3A.

According to another aspect of the present disclosure, the log-in screen can be displayed as more of a tabular based log-in screen as shown in FIGS. 2B-E. FIGS. 2B-D shows additional information communicated to the user via graphics and/or text in the user information transmission section 11 positioned in the center of the display of the mobile, web-enabled device, such as an iPhone. The screens depicted in FIGS. 2B-D show different information in the information transmission section 11 that can be accessed by swiping the touch sensitive display. The information conveyed is typically information on how the mobile application functions and/or the various benefits to the user of the system. In the case of FIG. 2B, the information conveys that a user can add an item quickly simply by scanning gifts (See FIG. 6) to add to a user's wish list of gifts by typically by scanning the UPC of the item using the mobile, web-enabled device having at least one camera or scanning device. In the case of FIG. 2C, the information conveyed shows the user how the user can see what their friends have shared with them and know what they would like to receive as a gift. FIG. 2C informs the user that the user can share items they want with other users of the system that the user has scanned or manually added by inputting information into the system about an item, as discussed in more detail herein.

In the case of activation of the "log-in" button 20' of FIGS. 2B-2D, the user is taken to the "log-in" screen shown in FIG. 2E, which, as discussed above, allows for the user to login to the system using a social media platform or a username and password, as the user would be able to similarly do in the dashboard login display shown in FIG. 2A and discussed above. In the case of the embodiment of FIGS. 2B-E, the mobile computing device may store login information to enable the mobile application to launch and initially display to the user the tabs and interface of FIG. 4B, which is shown as not displaying any items, but would typically show the listing of items on a user's list and have a plurality of tabular interface links (28', 30', 32', 33, 35). The links 28', 30', and 32' correspond to the links 28, 30 and 32 discussed below in connection with the alternative embodiment. The notifications link causes the display of a summary of notifications including one or more of the following: items shared from other users, friend requests, suggestion notifications of item(s) to add to the user's list received from one or more other individuals. The fact that this embodiment recalls the login information of a user and allows for information last displayed to the user when the application was previously used to be displayed to the user upon reopening the application on the user's mobile device.

As discussed previously, in the case of activation of the "register" link 22, in the dashboard login shown in FIG. 2A, the registration screen shown in FIG. 3A is shown. Similarly the "Sign up," link 22' of FIGS. 2B-E, which is largely the same as the "register" link of FIG. 2A, causes the mobile, web-enabled, computing device to display the "sign up" screen shown in FIG. 3B, which is another version of the registration page. Typically, the registration page of either embodiment requests the user's first name, last name and/or full name, user name, the user's electronic mail address, a password and the user's zip code or other geographic designator as discussed above. Additionally, the registration page. 24 typically includes the initial free form profile information where the user can input various information that the user selects about themselves and/or members of their family or any other information the user would like to share with other friends using the mobile application, website and overall system of the present invention. As shown in the free entry profile box 26 in FIG. 3A, the information may include children's names, clothing sizes, ages, and/or favorite colors; the user's clothing sizes, favorite colors, favorite sports and other personal information may be relevant to the user's friends while making their purchasing decisions.

The typical board seen by the user upon opening the mobile application, after the user has already initially registered and used the mobile application on the mobile computing device, is shown in FIG. 4A. FIG. 4A typically has three user selected paths that a user may follow including an activation link to the "My Items" page 26, an activation link to an "Add item(s)" page 28 and an activation link to a "Shop Friend's Items" page 30.

In the case of either aspect shown in FIG. 4A or 4B, additional linked out information related to the other concepts disclosed herein and in the specification and additional Figures described in U.S. Provisional Application Ser. No. 61/909,615, filed on Nov. 27, 2013, entitled SYSTEM AND METHODS FOR GENERATING A GIFT LIST OF ITEMS, MANAGING THE LIST AND SHARING ONE OR MORE ITEMS, the entire disclosure of which is hereby incorporated by reference, such as trips, particular events and recommended items may also be added to this dashboard page. However, in the case of these typically lesser used function, in the embodiment shown in FIG. 4B, the other features are typically accessed by interaction with the "More" link 35. Any of these features may be used, but any of the features can also be omitted.

In the case of each of the pages shown in FIGS. 5-15, the same tabular links shown in FIG. 4B may be displayed on the page or not, but typically would be present on each of the pages to allow for ease of navigation around the various functional aspects of the mobile application.

Activation of the "Add Items" link 30 or the "Zap" link 30' causes the search and scanning page 34, shown in FIG. 5, to be displayed to the user. In a case where the tabular interface links are not present, this page has a previous page "back" link 36, which reverts to the previous page the user viewed prior to reaching the search and scanning page 34. The "back" link 36 could optionally be omitted from the header 35. Additionally, the search and scanning page typically includes a manual search entry text receiving field 38 where user can manually enter a keyword search for items to be added to their item list by typing the keyword into the text receiving field and activating the search button 40, which would reveal the results of a database search for the keyword such as that shown in FIG. 7. If no results are revealed, an indicator screen, such as that shown in FIG. 7B would typically be displayed. Additionally, the search and scanning page also has the ability for user to activate and enlarge the UPC or other product code scanning button 42. The product code scanning button 42 allows the user to view a picture seen by at least one of the cameras of the mobile computing device, which is typically the camera located on the opposite side of the user display such that the user can place the code on an item they would like to add to the list within the view of the camera until the camera captures the code. Once the camera captures the code, the code is transmitted to the database where a query is conducted. If the query results in a hit, the information about the item is displayed in a listing such as that shown in FIG. 7.

In FIG. 6, a toy is being shown as being scanned with the camera that it should be appreciated that any item with a code that may be analyzed by a database may be used including a UPC code, a QR code (Quick Response Code), or other product identifier code. Additionally, it is contemplated that in addition to utilizing a camera, the system, while not shown in the FIGS., may utilize the one or more microphones of the device and activation by the user, the device may listen to inputted sounds or information such as those from a commercial or other advertisement on a television or other media device and, if matched in a query pull up information related to the information being discussed on a television commercial or other media having audio or audio and video. This is similar to a SHAZAM® music inquiry where the user utilizes their mobile device to obtain information about the song and artist for a particular piece of music.

In yet another embodiment, a 3D image sensing system may be used to scan an individual item or displayed items and obtain information about one or a plurality of items contained therein within the physical store based upon a data entry/sensory system used instead of or in addition to a standard camera on a mobile computing device. Additionally, a link in associated with the system of the present disclosure, may be provided by a retailer or producer of a product in connection with the product on the retailer or producer's website for example, which upon activation by the user would access the wish list server and cause the display of the detailed item display of, for example, as shown in FIG. 7A, allows the user to easily add an item. Additionally, if the retailer or producer's website with the link associated with the system of the present invention (a trademark icon for example) is accessed by the user via the web-enabled mobile device, the user's mobile device may automatically launch the mobile application of the present disclosure and display the screen shown in FIG. 7A, for example. Similarly, if such a link is activated by the user through the website system portion of the present disclosure, the website may launch the display shown in FIG. 18. Finally, one or more, or a combination of these inputs as well as location information from either a BLUETOOTH™ source or cellular information (geotagging latitude and longitude) may also be used to locate potential item information.

Once an item has been scanned, keyword search inputted or input received by the mobile computing device, the database query results are typically displayed in the "Find Items" screen shown in FIG. 7. The find items screen typically includes a plurality of one or more individual items at an inquiry separated by a dividing line or other indicator 46. Each individual item listed will typically include a photograph 48 or other graphical display that relates to the database search results as well as textual information 50, which typically includes a name, maker and price of the item located. Additionally, the search results typically include an information accessing icon 52, which in the embodiment shown in FIG. 7, is a circle. Additionally, the "Find item" page typically includes a back link that is typically positioned on the lower left or upper left of the overall page, but is shown on the lower left of the depiction in FIG. 7.

If the user activates the further information accessing icon for an individual information accessing icon (or any portion of the item line or proximate the individual icon 52), the mobile application discloses details about the individual item as shown in FIG. 7A. These details typically include the name of the item, the price of the item, the item identifier, (typically a UPC code or other universal product designator code) as well as a photograph of the product (typically an enlarged photograph 49 compared to the find item page display photograph of the product) and textual information (additional information beyond that displayed on the find item page) shown in FIG. 7. The details display page typically also displays the price for an item at one or more retailer based upon information received from a retailer server in response to a communicative query from the wish list server system or the mobile application to the retailer server system. The details display page of FIG. 7A also typically displays a prominent, typically colored or otherwise highlighted, user interaction button/link also typically labeled "Add to my list" link 53. The "Add to my list" link 53 causes the system to add the item to a user's list of items in the user's wish list and the system documents the item information, date and other user related information into the system database. Once the "Add to My List" link has been activated by the user, the system typically will use a location of a user to prompt a user, using latitude and longitude information and a database such as a FOURSQUARE® to display to the user a listing (see FIG. 7D) of locations close to the current latitude and longitude of the mobile device being used by the user. If the location is within the listing, such as that shown in FIG. 7D, the user may select a particular retailer/vendor and that information will automatically be tagged to the item to inform the user and any friends of the user where the item was originally seen by the user and where the item was added to the listing. For example, in FIG. 8A, the Cartoony Video Game was added at TOYS R US®. Again, when the tabular interface links are not employed, the detailed item page will typically include a back link and a menu link 55, which may be located in the header 35 or in the footer 57.

When an item is found and viewed in detail, as shown in FIG. 7A, the page may allow a user to add/edit tags by activating the "add/edit tags" link 70. The link will cause the display of the item tags page (FIG. 7E), which lists all of the tags for an individual user and optionally some pre-established tags for certain holidays, such as Valentine's Day, Christmas, Wedding Anniversary etc. Tags often employed by users, as discussed herein, may include a name, such as a child's name, a user defined holiday or event, or a retailer's name. The custom tags may be added by activating the "+" link 81 or similar add custom tag link, which activates the display of the screen shown in FIG. 7F and allows user to input custom information about the tag. If related to a person, such as a child, the information may include sex and age information and, for example, the birthday of the child. Once one or more tag(s) 72 are added, they are displayed on the item tags page and are able to be used to tag an item with one or more tags by selecting one or more tags which is shown as selected, typically by highlighting or, as shown, a check or other indicator 83.

As discussed above, if no search results are revealed through a scan of the code of an item or through the keyword search, a user will receive a notification page display 54 (See FIG. 7B). The notification page display, as shown in FIG. 7B, typically also includes a menu 55 and back button 36, but also typically includes a predominant pop-up indicator 56 to inform the user that no matching items were located. The pop-up indicator 56 typically includes the message that no matching items were located as well as a user activated acknowledgement button 59, which is shown in FIG. 7B as an "okay" button. Once the okay button is depressed, the mobile application typically immediately displays a manual data input page such as that shown in FIG. 7C.

FIG. 7C shows a manual input page 58, which typically include at least a location to purchase data field 60. The location to purchase data field 60 may be a manual entry field, but more typically activates a user prompt, which uses latitude and longitude information and a database such as a Foursquare® to display to the user a listing (see FIG. 7D) of locations close to the current latitude and longitude of the mobile device being used by the user. If the location is within the listing such as that shown in FIG. 7D, the user may select a particular retailer/vendor and that information will automatically be loaded into the purchase field location. Next, the manual page 58 typically includes a main field 62, an item price field 64 and a free form description or note field 66. Each of these fields may be manually entered by the user. Additionally, it is contemplated that even though an initial scan of an individual UPC or other code may have failed to reveal information from the database being queried, the UPC or other scanned information may further be included on the manual information page automatically. Additionally, the page may further include a photographic taking link 61 (typically in the form of a depiction of a camera), which activates the mobile device's rear camera to enable the user to take a picture of the item that was not located in the initial database query and attach it to the item entry being manually added by the user. The photograph may be displayed after it is taken in a photographic preview 63 once taken and selected for use. Once complete, the user simply activates the "+" icon 65 or a similar icon such as "Add this Item" typically located in the header 35 of the manual input page 58. This is depicted in FIG. 7C in the upper right corner of the header (the header of each page is the top portion of each page), The manual input, as with various other pages of the mobile application according to this aspect of the present disclosure, typically includes a menu link 55 in the upper left in the header 35 and a back link 36 in the lower left of the footer 57, but the location of these links may be elsewhere on the page. These links, if used at all, are typically located in the header and/or footer (the footer is the bottom portion shown on each page). A defined (color separated, for example) header or footer may or may not be used.

Referring again to the dashboard view of FIG. 4A, activation of the "My Items" link 28 of FIG. 4A causes the mobile computing device to display a "My Items" page such as shown in FIG. 8. As discussed above, when the tabular interface links are used, the listing of items on the user's wish list are immediately displayed (or displayed after login if the login is not recalled by the device). As shown in FIG. 8, the "My Items" page is typically divided into unpurchased items and items that have been indicated to a user as already purchased. The items indicated as already purchased are typically located at the bottom of the "My Items" page. The "My Items" page, as shown in the embodiment of FIG. 8, may include a filtering function which will sort the items by price, date added, keyword and other information, such as by user added tag information. As discussed above, user added tag information will typically be added by a user to each individual item and may include an event such as the person's birthday, anniversary, wedding, baby shower, a date or holiday, a person's name or retailer's name (TOYS R US®. TARGET®, BESTBUY® and the like) or some other identifier. Additionally, the tags themselves may carry date or geographic information or perhaps size information for an individual such that when another user views this information the additional information is accessible by the user. Any date information may also be used by the programs/systems of the present disclosure to display the later purchase date that may be selected when another user buys the item, i.e. a person's birthday or holiday date, such as Christmas day, may automatically appear as a choice in the later dates shown in FIGS. 8D and 13D, for example. The use of tags typically provides further information about who the individual item is suggested for, such as which of the user's children (or more than one child) the item should be purchased for when the item is purchased by another user and/or an event and/or the retailer where the user recorded the item into the user's list. This can be particularly useful when the user is providing information for a variety of individuals within their household such as their spouse, especially children or elderly individuals. The individual tags 72 may be shown on the "My Items" page (FIG. 8). The "My Items" page typically contains information similar to the search results "Find Item" page including a photograph of information, such as the name, perhaps some additional textual information about the item, the item's price and possibly also the retailer or geolocation of where the user was when the item was added to the list as well as the UPC or other identifier. Additionally, as before, it may be possible to with recent technology, such as Apple Inc. iBEACON® technology, to use BLUETOOTH® systems to provide indoor location systems based on indoor Bluetooth beacons, which will be discussed in further detail below. Conceivably, it would also possibly display to the user either in the "My Items" or in a more detailed view, such as that shown in FIG. 8A, the distance between where the user is currently located and where the item was added into the "My Items" listing. As discussed previously, the "My Items" listing typically includes a header bar 76 below the main header 35 as well as a purchased header 78, which is typically located below the unpurchased items on the listing of items at the bottom of the "My Items" page. The individual items on the "My Items" page scroll up and down through gesturing by the user on the display of the touch sensitive mobile computing device.

Touching an individual item in the "My Items" list typically reveals a detailed view such as that shown in FIG. 8A. The detailed view as seen by the user by the user's own "My Items" list includes the ability to remove the item from a list by activation of the remove from list link/button 80, which is typically located in the header. Additionally, the UPC code or other product identifier code is typically displayed along with photographic 49 and textual information 51 including the title, price and item details provided by the database and/or the user. Additionally, the detail item view from the user's own "My Item" list provides the user the ability to purchase an item off of the individual's own list by the activating the purchased item button 82.

Activation of the purchase item link/button 82 causes the pop-up window 84 to be displayed querying the user about where the user would like to purchase the item (FIG. 8B). The query may include a plurality of items, but typically includes one or more online locations and traditional brick and mortar "In-Store" retailers. The "In-Store" retailers may be displayed based upon the user's location to provide additional detail. For example, if the user is proximate Target®, a similar display, as shown in FIG. 7D, may appear with Target® being selectable in addition to the online retailers. The pop-up query may also include a cancellation of the purchase indication.

If the user indicates that the purchase may be made by an online retailer, such as Best Buy®, WalMart® or Amazon®, and the mobile, web-enabled computing device has access to the internet either through a wireless Wi-Fi network, the mobile application may display the mobile or full version of the online retailer's website, such as shown in FIG. 8C, to provide the user with the ability to immediately purchase the item from the online retailer via the retailer's site provided within the mobile application. Typically included in the online retailer's site within the mobile application as shown in FIG. 8C, is a depiction of the product to be purchased, the item's price, reviews, user information, an indication of who is providing the product if the product is being distributed through an online retailer but sold by another corporation and most typically, an add to cart link and the ability to make a credit card or PayPal™, ApplePay™ transaction or other secure online transaction to complete the purchase. Once the purchase has been completed, the user activates the "finished" link in the upper right of the screen as shown in FIG. 8C, which causes the application to prompt the user for additional information about when the item should be removed from the user's own list. This is a final indication that the user cannot remove the item from the "My Items" listing by activating the "I didn't purchase this" or similar link. While shown in FIG. 8D, including an "I didn't purchase this" and additional dates call out, these choices would not typically be made by a user. Additionally, if the user chooses to activate the custom date entry, a further user input box appears where the user inputs a date into the date picker (see FIG. 8E). After the time has entered by the user, the item will thereafter is indicated as purchased to the friend the item is being purchased for as a gift by the user or immediately if the item is being purchased by the user for the user and "now" is selected. Most typically, a purchaser purchasing his or her own item should indicate that the item was just purchased "now".

Returning to FIG. 4A, the user activating a shop friend's items link 32 will typically be taken to a screen similar to that shown in FIG. 9 displaying the user's friends, which may or may not be separated into a grouping of friends based on commonalities between friends such as school attended or family. Additionally, the screen typically includes an indication of who the user has sent invitations to also using the mobile application of the present invention. If the user wants to add additional friends, the user may activate the plus symbol located in the upper right of the mobile application and a search field such as shown in FIG. 10, or more typically (although not depicted) a view of additional Facebook friends or electronic mail contacts will be displayed based upon the mobile user's access to the social network such as Facebook, LinkedIn or other social network, or the mobile application's ability to access the user's contact information on the mobile device or other personal computer. Alternatively, as shown, an "invite Facebook friends" link, which is meant to be exemplary for any social network link or a plurality of social network links, may be displayed to the user. Upon activation of the link, a display of listing of the user's social network (Facebook) friends and a user activated invite to invite the social network friends of the users or become friends of the user using the system of the present disclosure. In this manner the system of the present disclosure allows a user to easily invite other friends to become users.

To share one or more items off of the "My Items" page shown in FIG. 8, the user activates the share items link 86 as shown in FIG. 11A, in the footer. Activation of this share items link 86 typically causes the mobile application to display the "My Items" listing along with a selection indicator, which is shown in FIG. 11A as a circle for items that have yet to be purchased. The circle indicator is shown with reference numeral 88. As shown in FIG. 11B, as a user activates the indicators 88, the background for each of the individual items selected typically changes color as well as the indicator typically significantly darkens or otherwise changes to indicate to a user that it has been selected. Thereafter, the user again activates the share items link/ button 86, which causes a select friends screen (see FIG. 11C) to be displayed. Next, the user can indicate one or more of the mobile application friends to share the one or more selected individual items or the entire item list of unpurchased items with the selected users. Touching on the names of the individual friends activates an indicator 91 shown as a check mark in FIG. 11D but could be another indicator of any type as long as the user can identify which individual friends have been selected to have to the one or more items shared with them. Finally, the user activates the "Done" link 93, other link or takes some other action to indicate to the system the friend selection process is complete. The "Done" link 93 is typically located in the upper right corner of the header 35 and activated to finally transmit and share the items within the mobile application and overall system of the present disclosure. Once the user activates the "Done" link and the items are successfully shared, the mobile application displays a pop-up window 95, as shown in FIG. 11E, indicating that the items have been shared. The pop-up window, as shown in FIG. 11E, typically includes an "Okay" link 97 which returns the user back to the "My Items" page or other destination within the application such as the dashboard. Typically, the user is returned to the "My Items" page for the ability to share additional items or add additional items.

Returning to the dashboard shown in FIG. 4A, if the user would like to shop for items that their friends have shared with them for possible purchase, the user activates the shop friend's items link 32 and a page similar to that shown in FIG. 12 is displayed to the user. In the case of the tabular embodiment shown in FIG. 4B, the user would activate the "Friends" link 32', which would cause a display similar to that shown in FIG. 12 to be displayed to the user. Once the display is shown in FIG. 12, the user can select any one of the user's friends that are also using the system of the present disclosure. Once the individual friend is selected, the detail about the individual friend including their free form information and other profile information chosen to be shared with user is displayed (See FIG. 13). Typically, this display includes at least a photo and the person's name. In a table format shown below, the profile of the friend listing information about the friend and anyone else such as children or other dependent(s) the friend wants to share with others, the items that the friend has shared for possible purchase and any accompanying tags will typically be shown. The item information for items that friend would like to receive as a gift and that have been shared typically will include a photo and textual materials. Significantly, only items that have not been purchased are displayed even if the friend may not have received the gift yet. Another person may have purchased the gift and the item would not be displayed. As will be discussed in more detail below, only unpurchased items are displayed for purchase by a friend. Other friends are unable to view items that have been previously purchased. If an item is shared by the user's friend and that item has already been purchased by a third user (or conceivably the user himself/herself), that item will not appear in the listing of items shared. Significantly, the item may still appear in the friend's my items list the user is shopping for with a date set by the third party user when the item was marked as purchased by the third party user. In this manner, the friend does not know that an item has been purchased until after a date set by the person who has purchased the item for a friend, but the user's other friends also will not purchase the item as these items will be immediately be removed from the shared items displayed for that person.

If the user activates the individual item link 99 for one of the items listed for the friend as shown in FIG. 13, they are typically taken to a detailed view similar to that shown in FIG. 8A, but more accurately shown in FIG. 13A, which is identical to FIG. 8A, but does not have the ability to remove the item from the list in the header. If the item is to be purchased by the user for the friend, the user activates the purchase item link 82 and a similar prompt, as previously discussed is displayed (see FIG. 13B) where the user selects at location/manner in which to purchase and item, typically through either an online or traditional brick or mortar retailer. If the user purchases the item on an online retailer, the user activates the link to one or plurality of particular online retailer(s) and the selected online retailer's mobile or other related Internet page is displayed to the user to complete the transaction/purchase. Typically, through this retailer system, a display of which is shown in FIG. 13C, the user may purchase the item. After the user has purchased the item, the user may activate the finished button or link 101 typically located at the top right of the header of the mobile application as shown in FIG. 13C, which prompts the user inquiry of FIG. 13D.

Significantly, the user input from the display of FIG. 13D allows the purchaser to direct a mobile application/inventive system to notify the friend the user has just purchased an item when the friend the user just purchased the item for views the friend's own "My Items" page. Significantly, as discussed above, while this action delays the notification to the friend the item has purchased for until the date set within the system by the user who made the purchase of the item, it immediately indicates to all other third parties that the friend may have shared this identical item with, that the item has been purchased by removing the item from the shared items page for the friend such that it does not appear in the listing for any other users (see FIG. 13). In the case of a wedding gift list or baby gift list of the present disclosure, this feature may be eliminated at a setting set which is included at the set up stage such that it only will immediately display the items as purchased and provide the only option as "Now" under the menu "When should your friend see that this item was purchased?" This menu requiring input from the user may be eliminated in such instances.

FIG. 14 discloses the short cut menu that appears if a user gestures across the touch sensitive screen of the web-enabled mobile application device from left to right on any page of the mobile application or by application of the menu link 35. The listing provides a short cut to a variety of the individual strings within the mobile application. Any number of short cut links may be provided in this menu including those shown in FIG. 14 and others not shown that are described herein such as trips, links, or maps feature as shown in subsequent Figures.

FIG. 15 shows what the user will typically see when the user activates the Profile link shown in FIG. 14. This provides the user with the ability to update the personal information provided to other friends who might be purchasing an item. As shown in FIG. 15, individual names of children, ages and sizes for individuals including the user and/or children may be provided as well as various likes and dislikes. Additionally, the screen may optionally have the ability to sign-out of the application completely. The menu may also have/display links from one to all of the various displays discussed herein. Once the profile material has been edited/added, the user may activate the update link 105 typically located in the upper right corner of the header 35, which updates the user profile information in the database of the present system, typically stored in the wish list server system remote from the user. The system is updated through communication via the internet.

An alternative add item(s) page such as shown in FIG. 5 may be augmented by notably adding the ability to display to a user a recommended item(s) for the user, typically displayed in the footer, generated by other users or the server systems of the present disclosure based upon the user profile. Instead, suggested items might be inserted within the user's wish list of items added or displayed at the top or bottom of the wish list of the user. For example, such recommended items may be any of the following items. One such recommended item might be items recommended for the user by other friends of the user who may input the item into the system and suggest it to a friend. This may be done by the user making the selection through a link displayed on any of the various displays discussed above, in particular those of FIG. 7A (see "Suggest to a Friend" link 103), 8 and 8A, for example. Any menu where a particular item is being viewed may include such a link. Thereafter, the user making the suggestion to another user will display their listing of Friends such as depicted in FIG. 9, for example. The user then selects the one or more friends to suggest an item to and indicates that the selection is complete by a user input, typically by activating a "Done" link or some other link displayed to the user which in turn activates the system to show the suggestion to the friend or friends selected by the user when the friend or friends next access the system and view their suggested items. As discussed above, the suggestions may further be enhanced by allowing a retailer to display time sensitive or non-time sensitive discounts to the user. These discounts may be from online retailer or brick and mortar retailers. In the case of brick and mortar retailer, these discounts may be displayed based on the geolocation of the user using the web-based mobile application device, based on location within the building structure or other area. The APPLE® branded iBEACON® transmitter is a BLUETOOTH® low energy signaling beacon that enable microlocation and triggers action within the mobile application. This system may be used to communicate information about items to be suggested to a user for additions to their wish list and may be further customized based upon information within the wish list server system of the present disclosure such as the nature of other items in the user's wish list, electronics or type of products indicated by the user in the user's profile or otherwise as of interest to the user. In this manner, items of more tailored interest to the user may be displayed and other items of lesser or not any interest to the user of the system would not be displayed.

A friend of the user that receives the suggestion will typically receive a notification display of the suggestion and typically an audio signal and/or other indicator to the user will be initiated. In response to the suggestion, once a detailed screen about the item is viewed by the user receiving the suggestion, the user receiving the suggestion may indicate that the user receiving the suggestion would like to add it to their "My Items" list or not by indicating a positive acceptance by activating, for example a plus (+) or thumbs up icon, or a negative indication by activating a minus (−) or thumbs down icon on the item detail screen. A notification would then be sent to the user originally suggesting the item to the friend that the item is both added to the list and therefore shared with the friend who suggested the item or whether the item was declined by the friend. Additionally, the footer may include a shop for icon, which would be short cut link that may display a user's most recent or top shopped items for friends and their friend's listing or friends that have been flagged or otherwise identified by the user be included in this pop-up menu. Alternatively, the pop-up menu may be a link on the shop for friend's page.

The web-enabled mobile application is presently conceived to also have the ability to notify an individual of price changes of items within the individual's list as well as other notification elements such as activities of that individual's friends, a notification of featured deals, as discussed above, and a notification of any additions to the list.

Additionally, the application may further include a shopping trips feature where user can set locations where the user will shop for items that the user would like to shop for certain friends and the mobile application will generate the most efficient route using third party or first part mapping applications and display those to the user in the mobile application. One such application would be Google's maps, Apple's maps application or a mobile application from another party such as TomTom® and Garmin®, Additionally, it is presently contemplated that the mobile application may provide a notification to a user if the user carrying the user device is within a certain distance of a location of an item where an item a friend shared with them may be located. The location information would be based on where the friend added the information to the friend's "My Items" item list based on location data. Additionally, the user may be able to set this notification to limit its functionality too so that the notifications will only appear during certain time intervals such as within one week of the friend's birthday, other holiday, or within a time frame of the date identified in a tag on an item such as Christmas or an anniversary.

Additionally, in addition to offering targeted discounts to user as discussed above, the suggested items listing(s) may be used to display items recently added by other users in a certain geographic range or within a zip code, for example, have similar demographics to the user such as age, gender or keyword interest based on tags or profile information such that the user is provided with trending information about items desired in and around their geographic area either or both from where they are residing or where they are currently located. In this manner, a user may be able to see what other users are adding and simply add those items by viewing a detailed view of that item by linking through to the detailed view (see FIG. 7A) from the recommended for you banner/footer or other link associated with the item being suggested to the user including within the "My Items" list itself (FIG. 8) perhaps and the user indicating that he/she would like to add an item to the "My Items" list.

It is presently contemplated that online retailers may provide a link to either the companion internet website or mobile application where the link is displayed adjacent an individual item being offered for sale by the online retailer. The link, if followed, would cause either the mobile application or the companion internet website to open and either automatically or by further user interaction confirm the condition of the item to a user's "My Items" list add the item on the online retailer's site to an individual's "My Items" list, for example, the trademark or mobile application icon 14 may be displayed substantially adjacent the description of the product on the retailer site. When user activates the link by clicking on the trademark or mobile application icon, the internet would either open the mobile application nor direct the user to the companion website for the mobile application and allow for the user to easily add, as discussed above, either automatically or by a further user indication confirming an addition or canceling an addition, to the "My Items" list.

If the user chooses to provide the user's email address, and other location information such as their home address, business address, phone number or any combination thereof, after an event has passed where an item has been tagged and the item is now displayed as purchased to the user, it is presently contemplated that the mobile application may deliver a generated "thank you" list where the name of the friend who provided the gift, the name of the gift, the location where the gift was purchased, and other information regarding the item would be provided to the person who received the item as a gift in a condensed readily usable form such as an excel or other spreadsheet format/chart. As such, after an event has passed such as Christmas, an anniversary or wedding, a thank you list would be automatically generated and provided to the person/user who received the gifts such that they would be more easily able to write handwritten or electronic thank you notes to the friends that gave the user one or more gifts for the event. As such, it is presently contemplated that a companion mobile application with a similar construction to that shown in FIGS. 1-15 may be uniquely targeted to only a single event, such as a wedding or baby showers, whereby the user could thereafter receive the condensed thank you listing after the date of an event set by the user.

Additionally, it is presently contemplated that the mobile and Internet website will allow a friend to upload a photo of the user opening the gift given to the user by the friend and the thank you information would contain a link to a file for downloading from a server, typically the server system used in connection with the present invention, or a photographic file showing the user opening the gift. In this manner, each of the friends who typically take a picture of the user opening their gift, but not the user opening gifts from others, will allow the user to receive photographs of the user opening each gift such that the user may potentially receive photographs of the user opening each gift or a plurality of the gifts the user was given. The photos may be displayed to the user receiving the gifts and optionally select, download and print either individually, in a printed photo book or other collection that would be mailed to the user.

Additionally, it is presently contemplated that the friend who purchases an item for the user may have the ability to either link an email delivered receipt for the transaction, or copy and paste into a data entry field gift receipt information, which would also be delivered the user after the identified purchase (see, for example, FIGS. 8D, 8E, 13D and 13E). It is contemplated that the dates may be custom set at the initial setup, such that a wedding's only mobile application may include dates for various wedding showers and actual wedding date as well as a custom date instead of the standard listed timing of now, one day later, one week later, one month later and a custom is shown in FIGS. 8D and 13D.

The methods for creating and showing individual gift list items and the other methods and system described herein may be implemented by using a mobile computing device that is operably connected to the Internet via a local or wide area wired or wireless network to one or more servers. The servers retain, record, and manage the database data for use in connection with the software and practice the methods of the present invention. The methods may be a subroutine executed by a processor. The method may be embodied in a non-transitory computer readable medium having stored their own software instructions that when executed by a processor, cause the processor to control the computer or mobile computing device, by executing the steps of the method described herein. Typically, as discussed above, the portable personal computing devices may be touch sensitive tablets, personal computer display screens operably connected to a personal computer phones or other device such as a wearable computerized glasses that would display information to the user when the glasses are worn. One such example of glasses include the Google® glasses which is a wearable computer with an operable head-mounted display (OHMD) that displays information in a smart phone-like hands free format that can communicate with the internet via natural language voice commands.

Exemplary computing systems used in connection with the methods and systems of the present invention can include one or more of the implementations of the technology described herein. A computing system can include one or more panel processors and peripherals, and a panel subsystem associated with an input device (which may correspond to a mobile computing input device). Peripherals can include, but are not limited to, random access memory (RAM) or other types of memory or storage, watchdog timers, and the like. The panel subsystem can include, but is not limited to, one or more sense channels, channel scan logic and driver logic. The channel scan logic can access Radom access memory, autonomously read data from the sense channels and provide control for the sense channels. In addition, channel scan logic can control driver logic to generate stimulation signals at various frequencies and phases that can be selectively applied to drive lines of a touch sensor panel. In some implementations, the panel subsystem, panel processor and peripherals can be integrated into one application specific Integrated circuit (ASIC).

A touch sensor panel can include a capacitive sensing medium having a plurality of drive lines and a plurality of sense lines, although other sensing media also can be used. Each intersection of drive and sense lines can represent a capacitive sensing node and can be viewed as picture element (pixel), which can be particularly useful when touch sensor panel is viewed as capturing an "image" of touch. In other words, after the panel subsystem has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). Each sense line of the touch sensor panel can drive the sense channel in the panel subsystem. The touch sensor panel can enable multi-touch gesture detection so that shapes can be generated and modified according to implementations of the technology.

The computing system also can include a host processor for receiving outputs from the panel processor and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications, such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, prompting the generation of a signal of any kind, and/or the like. The host processor also can perform additional functions that may not be related to panel processing, and can be coupled to a program storage medium and a display device (which may correspond to the computing system) such as an LCD display for providing a user interface to a user of the device. The display device together with the touch sensor panel, when located partially or entirely under the touch sensor panel, can form a touchscreen.

One or more of the functions described throughout the above application can be performed by instructions (e.g., programming, software, firmware) stored in memory (e.g. one of the peripherals) and executed by the panel processor, or stored in the program storage and executed by the host processor. The instructions also can be stored and/or transported within any computer-readable storage medium for use by or in connection with an instruction execution system, apparatus, or device (hereinafter referred to as "instruction execution system"), such as a computer-based system, processor-containing system, or other system that can fetch the instructions from the memory. In the context of this document, a "computer-readable storage medium" can be any medium that can contain or store the program of instructions for use by or in connection with the instruction execution system. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVE-RW, or flash memory such as compact flash cards, secured digital cards, USB memory devices, memory sticks, and the like.

In some embodiments of the present invention, the device used by a user is a desktop computer, which may have a touch screen display. In some embodiments, the device is portable (e.g., a notebook computer or handheld device). In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch screen display. Executable instructions for performing the functions of the presently described methods and systems may be included in a computer readable storage medium or other computer program product configured for execution by one or more processors.

The instructions/method of the present invention also can be propagated within any transport medium for use by or in connection with an instruction execution system, such as a computer-based system, processor-containing system, or other system that can fetch the instructions from the memory and execute the Instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Building on the discussion above, in other words, aspects of the inventive methods and systems may be achieved by software stored on a non-transitory tangible computer readable medium or software modifications or updates to existing software residing in a non-transitory computer readable medium. Such software or software updates may be down-loaded into a first non-transitory readable media of a controller (or locally associated with a controller or some other processor) typically prior to being installed in a mobile computing device from a second non-transitory computer readable media located remote from the first non-transitory computer readable media, i.e. a server system. The second non-transitory computer readable media may be in communication with the first non-transitory computer readable media which may be any suitable means including the internet, a local or wide area wired or wireless network. In this manner, a user may download via the wired or wireless network the software from a computer server system to the mobile computing device.

Additionally, the present invention contemplates the ability to request gift cards or make charitable donations by linking the mobile application to a third party site that would allow charitable donations or, in the case of gift cards, have the gift cards be a manually entered item or appear in the database inquiry. Alternatively, the gift cards may be accessed by a gift card request link on the search for items page or other page within the mobile application, which would bring up a manual entry request form or automated request form for the user to complete. If the automated information appears such as if the user requests a Starbucks® gift card and Starbucks® is an affiliate partner with the mobile application, a user may link out to the Starbucks® website and purchase a gift card directly through the mobile application of the present invention. Alternatively, instead of linking to the Starbucks® website, the mobile application may link to another mobile application offered by the retailer offering the gift card, in this case Starbucks®.

Generally speaking, the same features and capabilities available to a user of the web-enabled mobile computing device accessing the system of the present invention via the mobile application are also available via a corresponding website structure of pages that are also accessible by the user. Moreover, as with other social networking sites, actions taken by a user on the mobile application are reflected in the website system and vice versa.

FIG. 16 shows a general layout of the "home" page of a website 200 according to an aspect of the present disclosure. Each individual web page of the site typically has a header navigation system that has the site name at the top 202, which also function as a link back to the home page when activated by a user. The navigation links in the header may include, but are not limited to the following: a link that when activated by a user instructs the system to display to the user a page describing features of the site 204, a link 206 that when activated by a user causes a display of frequently asked questions about the system, mobile application, and/or website, a link 208 that when activated by a user causes a display of a blog about the subject matter (typically gifting, but conceivably more narrowly focused such as weddings for a wedding based system or baby gifts or baby care topics if the system is centered around gifts for a baby, such as for a baby shower), and a support page link 212 that accesses a page to reach out and contact administrative and technical support related to the site. The navigation links may also include a link 214 which when activated displays to the user various press releases or other press kit related information about the system and website. A login link 216 is also typically positioned on the home page of the website that when activated by the user displays either a login with username and password or presents a link to login via another social networking system such as Facebook or Twitter. This can be displayed on the home page or on a separate page such as shown in FIG. 17. The home page typically further provides the user with additional information regarding various features and benefits of the system and/or the mobile application. This information is typically positioned in the center section 218 of the home page. The information can be presented and is often presented in graphical and textual form, but could also include video that may, for example, show a user adding an item onto the user's wish list of items.

In the footer, typically each webpage of the site will also display one or more of the navigation links discussed above as well as social network links 220 to other social networks allowing for easy sharing of the website across other social networking server systems. The footer or elsewhere on the home page may be positioned one or more link 222 to download the mobile application from a mobile application providing server system such as the Apple® App Store or Google Play™. The home page or any page of the website system may further include an email signup data entry field 224 that allows a user to enter one or more email addresses and sign up for notifications and/or newsletters or other communications from the system of the present disclosure.

As discussed above, activating the login link 216 may cause the web-enabled desktop or laptop computer system or a mobile computing system not interacting with the wish list server system of the present disclosure through the mobile application of the user to communicate with the wish list server system and cause to be displayed to the user a login web page 226. The login web page will typically have a header 230 with a trademark icon representing the system or other display 228 within the header 230. The web page will also typically have a username data entry field 232 and a password field 234 as well as a login activation link 236. The system has a user activated "remember me" option to recall, typically via the internet browser's ability to recall username and password information, the user and skip the login step on the website when the user next visits the website using the same web-enabled computing device. The login page will also have a social network login link 238 that allows a user to login using a social network, such as Facebook, login function.

As shown in FIG. 18, once logged into the website, the header typically additional contains a notification link/icon 240 with an indicator showing the number of notifications 242 sent to the user via the social network system of wish list server system of the present disclosure. The header will also typically contain a logout link 244 and a help link 246 (designated by a question mark in FIG. 18). Similar to the mobile application of the present disclosure, the web pages of the system, once a user has logged in, have links to the various feature of the system. In the embodiment shown in FIG. 18, the links include a "Home" link 246, which typically returns the user to a display of the user's gift list as shown in FIG. 18, in the side menu similar to the side hidden menu of the mobile application as shown in FIG. 14. The sidebar menu 248 also typically includes a "Search for Items" link 250, a "My Items" link 252, a "Shop Friend's Items" link 254, a "Friends" link 256, a "Suggestions" link 258, a "Tags" link 260, and a "Profile" link 262.

The "My Items" page, as shown in FIG. 18, typically lists all of the items on a user's wish list and includes unpurchased items, which are typically located at the top of the list, and purchased items, which are typically listed at the bottom of the listing. The items are typically listed in the same order as if they were viewed from the web-enabled mobile computing device employing the mobile application of the present disclosure. This is achieved by communication with the wish list server(s) and storage of the data at the server(s). This enables synchronization between the website interface and the mobile application interfaces with the system for the user. There is typically a "purchased" divider 264 in the chart of items 266. The item listing typically also contains textual information 268 and a photograph of the item 270.

The "Search for Items" link 250, when activated by a user causes the computer system to display the page exemplified in FIG. 19, which may be a separate page, browser window or, as shown, a pop up window 272. The display typically has a results field 274, a data entry field 276 for receiving text from the user for keyword searching of the item database from one or more retailers via communication with the retailer server computer systems. The "search" button 278 activates the search function after data is entered into the date entry field. Once the search for relevant items occurs, the results are typically displayed in a manner as shown in FIG. 20. A photo of the item 280 is shown, a textual description 282 typically provided, and icons to allow items to be suggested to another or to be added (see plus symbol). The textual description typically includes the price from at least one retailer (the retailer whose data was searched typically) and a written description of the item itself. Depending on the action requested, the particular icon is selected. After the items have been highlight for addition to the wish list of a user or suggestion as something to be sent to another user/friend of the system, one of the "Add Selected" 284 or "Suggest" 286 activation buttons or both buttons are activated at different times by the user to instruct the system to perform the selected task. If the results displayed to the user after the keyword search are not what the user wanted, the system presents a link ("Create your own" link) 288 may be activated, which prompts a data entry field that allows for user addition to the various fields to manually add an item or manual add an item to be suggested to another user.

Activation of the "Shop Friend's Items" link 254, will execute instructions to the system to display for the user a web page typically having the layout shown in FIG. 21, which presents to the user a listing of friends who have shared items they would like to receive as gifts with the user. Typically this shows a photo of the friend or other graphical display associated with the friend 290. The display also presents a link 289 associated with, typically positioned proximate and adjacent the friends name in the list that displays the number of items that friend has shared with the user of the system. Activating a link 291 associated with the friend (typically the friend's name, but could also be a username of the friend) causes the system to display a friend specific page as shown in FIG. 22.

The friend specific page(s) (see FIG. 22) typically displays details of the items that particular friend would like to receive, but, as was the case for the display of items a friend wants with the mobile application, only items that have not been marked as purchased or reserved by another user who the friend has also shared the item with will be displayed. As mentioned above, if another user has purchased the item, the system will not display that item on the listing for that friend for any other user. In this manner duplicate gift giving can be significantly lessened or eliminated. The item would not appear in a list of items 291 wanted by the friend so the user would never know to purchase it. The listing of items that a friend may want typically has a photo 292 and textual information 294. Tags 296 that have been associated with the item by a friend are also typically shown to the user in this view. The various tags 296 may also be displayed as filter links to cause only those items with a particular tag be shown. In this manner the user can sort what items have been shared to quickly view a more detailed view of the item (See FIG. 23). Additionally, the friend specific page further typically displays items the user has shared with that particular friend from the user's wish list for the "My Items."

The detailed view of a specific item, as shown in FIG. 23A, is typically a window that appears over the display of page of FIG. 22 as a type of pop up window or a display of a new page with the details of a specific item selected by the user. The detailed view also displays any tags 296 associated with the item by the friend that are typically displayed proximate the photo of the item. The photo 298 is typically positioned proximate the top of the window/display. Most typically, the tags are shown below the photo. The title 300 of the item is typically shown on the top of the window/display along with the price 302 of the item. Various action buttons are also shown to the user including, but not limited to, an "Add to My List" button 302 that does exactly that, adds the item to the user's list; a "Purchase" link 306 that directs the system to a purchase window and allows the user to select the brick and mortar or online retailer to purchase an item from for the friend; and a "Suggest to Friends" link 308 that suggests the item to other friends in the user's network. Additional details 310 such as text, photographic, video or otherwise may be displayed as well, but any such additional information is typically shown below the action buttons and item title information. Activation of the purchase link causes the system to display a date entry field 312 for the system to record when the friend you are purchasing the item for can see that the item has been purchased and a link to either purchase the item from the online retailer or a brick and mortar retailer. If an online retailer, activating, for example, the "Purchase on Amazon" link 314 would direct the user's web-enable computing system to launch a new browser window at the page of the online retailer displaying the item for purchase. Additionally, this view also will typically show a variety of retailers where the item can be found if that retailer server system is accessed by the user, for example information about the price of the item at another retailer such as Best Buy® or Target® or Wal-Mart® may also be displayed making the system a gifting and shopping tool for the user. The purchase price 302 may be stored in the data base or dynamically checked by the system reaching out to and communicating with each retail server system when the details are requested by the wish list server system of the present disclosure in response to the user input. If a user selects the "Suggest to Friends" link 315 or the related "Suggest to Friends" link 308 on the previous view (FIG. 23A), the user is prompted to select the friends to suggest the item to and allows the user the ability to send a personalized message via a data entry field about the item to be sent to the friend along with the suggestion. If the user selects any of the Purchase links 314, 316, 318 for a given retailer, the system will display for the user, typically in a separate browser window, the website for the retailer corresponding to the user input and display the details of the product at the retailer's website to allow the user to purchase the item directly from the retailer.

As shown in FIG. 24A, activation of the "Friends" link 256 instructs the web-enabled computing system to display in a browser window a friends listing of "Your friends," which is a listing of the friends of the user on the system of the present disclosure activated by user interaction/activation of the "Your Friends" tab 500, but also displays as an initial display when activating the "Friends" link 256. The tabular display may be changed to the display of FIG. 24B by activating the "Find Friends" tab 502, the display of FIG.

24C by activating the "Invite Friends" tab 504 and the display of FIG. 24D by activating the "Facebook Friends" tab 506. In the case of FIG. 24A, the display for each friend 320 may provide a link to approve an incoming friend request that has been received, remove a friend from the list of friends of the user on the system of the present disclosure and may also display the status of a friend request made by the user of the other person (potential friend in the system). Additionally, the listing will also typically have a link 322 that will instruct the system of the present disclosure to resend a friend request to the person listing if an initial request has already been sent. The request may be sent to the potential friend's email or via Facebook or other social network system.

As shown in FIG. 24B the "Find Friends" tab allows a user to search for and/or among friends within the system by entering a name (first or last name), email, or other information and initiating a search by activating the search button, which will cause the listing of search results to appear within the window.

As shown in FIG. 24C, the "Invite Friends" tab allows a user to enter one or more email address to send an electronic mail request to the potential friend within the system of the present disclosure containing an invitation to join the system of the present disclosure and become a friend of the user on the system, A user would input the email address into one or more email address data entry fields 328. If more than one email address data entry field is desired to send more than one invitation, the user can activate the "Add Row" button 330 to cause one or more additional email address data entry fields 328 to be displayed to the user. Once all the email addresses have been added to the email address data entry fields 328, the user would initial the invitation through the system of the present disclosure by activating a send or invite link 332.

As shown in FIG. 24D, the "Facebook Friends" tab, when activated by a user, displays friends of the user 320 that are friends of the user on one or more other social networking system such as Facebook®, Twitter®, and the like and allows for sending invitations to join the system of the present disclosure via the other social network system, i.e. send a Facebook message with an invitation to join the social network/system of the present disclosure. To send such an Invitation, the user would activate a link 334, shown in the figure as an arrow that would cause a potential invitation message to be presented to the user within the other social network. Typically, invitation are automatically generated and displayed to the user within a draft Facebook message allowing customization of the message after the user activates the request activating link, in the case of FIG. 24D the arrow on the right of the listed Facebook friend.

Activation of the "Suggestions" link 258 causes the system of the present disclosure to display to the user a display as shown in FIG. 25. The suggestions display web page of the website displays both incoming suggestions and outgoing suggestions that can be filtered by selecting an appropriate user input 336 positioned at the top of the suggestion listing. This allows the user to toggle between incoming and outgoing suggestion, according to one aspect of the present disclosure. Alternatively, both could be presented simultaneously and then a filter function provided to allow the user to filter the suggestions that have been received and sent. They may be filtered by incoming and outgoing, but also could be filtered by friend, for example, or date. The status 338 of each suggestion is show as well, typically on the right side of the listing of items. As with other listings in the system, the display typically includes at least a photograph of the item 340 and typically text 342 associated with and describing the item being suggested.

Activation of the "Tags" link 260 causes the system of the present disclosure to display to the user a display as shown in FIG. 26. The system has a textual data entry field 344 that allows a user to enter any tag into the system of the present disclosure for use and association with an individual item. As shown in FIG. 26 the system generically adds a tag without capturing additional information about the tag by activation of the "Add Tag" link; however, additional detail for the user and the user's friends that might purchase the item may also be added. For example, if the tag is related to a person, which might be indicated by activation of a "Add Person Tag" (not shown in FIG. 26) instead of a generic Add Tag link 346 the system may further request the person's name, sex, age, size information, and other personal information that may optionally be provided. In this manner this information would be available to a potential purchaser by activating the tag, which would appear as a link instead of solely text. The information may be presented in a pop up window or roll over pop up window fashion such that when the user rolls his/her cursor over the tag the additional information appears and the disappears when it moves off the tag. The information may also be displayed by activation of the tag link via a mouse or via a touch sensitive display on the user's web-enabled desktop computing device, laptop computing device or mobile computing device. Similarly, if an "Add Event" tab is presented, if the user adds and event such as Christmas or Baby Shower, the system may prompt the user for the date of the event or, in the case of Christmas or another day that is fixed in the calendar, automatically associate a date with the event. As discussed above in connection with the mobile application of the present system, the system then may use that date information to present to a friend purchasing a gift through the system having that tag the date associate with the event tag (December 25 in the case of Christmas) as a date that the user will be able to see that the gift was purchased for them.

Activation of the "Profile" link 262 causes the system of the present disclosure to display to the user a display as shown in FIG. 27. The profile may be partially free form as shown in the figure or have readily finable data entry information segments for items such as birthday, where a calendar may be displayed to the user to allow for easy entry of the user's birthday or the sex with a dropdown menu of either M or F presenting itself. The free form data entry field 348 allows the user to enter information such as children's sizes, general likes and dislikes of toys, clothing, colors etc. This information is also editable and seen via the mobile application of the present disclosure and, as with other aspect of the present disclosure, when the profile is updated via the website profile, the same changes are reflected when the user views the profile on the mobile application.

Activation of the "Notification" link 240 in the header of the display causes the system of the present disclosure to display to the user a display as shown in FIG. 28. FIG. 28 shows a listing 350 of notifications received by the user via the system. The notifications can include items that have been share out by the user and items that have been shared with the user. Additionally, notifications that an item has been purchased for the user can be presented to the user via this notifications page. An indicator 352 is typically presented showing whether the notification is and incoming notification from a friend on the system (another user) or an action sent out by the user. Additionally, for each notification there is typically a link 354 that deletes the individual notification from the listing and a "clear all" button 356 that clears all notifications from the system.

Activation of the "Help" or "?" link 246 of the various display screens of the present disclosure typically presents a glossary of terms such as shown in FIG. 29 and/or instructional material on use of the site which can include photographic material, textual material, video, or any combination of the above. Additionally, a data entry field for the user to enter a search query may be provided and potential resolutions presented to the user after entry of the query by the user.

Additional benefits are also offered by the present mobile application and overall system. As users share individual items based on product code and provide tagged information with date information, commercial retailers will better be able to align logistics delivery of materials with geographic regions and times for demand for such products. It is contemplated that a retailer may be able to anonymously search by geographic information, times and product identifier where individual items are most desired and shipped delivery of products where more demand for such products exist. No personal information would be accessible via the commercial retailer database access portal, which would be a website and/or an alternative mobile application that may be used by the user. As shown in FIG. 30, the present disclosure includes a method of delivering products based upon measured prospective demand 600 based upon use of the systems related to the wish list server (mobile application and website, in particular). The method typically includes the step of users adding and sharing items 602 in the manner and using one or more of the systems discussed herein. Next, the system stores items/products on each user's wish list at the user and item level 604. Next, users share and/or suggest items/products for possible future purchase to other users for gift giving for a future occasion 606. The data related to these shares, including geographic information and dates for the future events the products (gifts) will be purchased for are stored in a database structure of the wish list server system(s). The next step is the search for information on a particular product 608, typically by a commercial retailer or their representative or a marketing professional. The data of what particular items are being shared, the geographic designation of those sharing the information and the geographic data of those users the potential gift items are being shared with allow for search criterial based upon the product identifier, a UPC or keyword search, to be done and associated/correlated with demand within a geographic region (typically the area where the users to have had a potential gift share with the for purchase by another). In this manner, a retailer or online distributor can better logistically ship inventory to stores or distribution centers 610 to better match prospective demand as measured by the data of the gift giving and receiving social networking systems of the present disclosure. The system/method will better assist purchasers by ensuring supply of products are best positioned where demand is highest and vice versa.

By way of example, if numerous people want and have shared that they want a particular toy for Christmas and the shares for that item went to a majority of people in certain states, cities, or zip codes, more of the toy may be shipped by the retailer to those states, cities, or zip codes (regions).

Additional various aspects and features that may be included in the mobile and/or website of the present invention/system are shown in the various FIGS. 1-30 and also described in U.S. Provisional Application Ser. No. 61/909, 615, filed on Nov. 27, 2013, entitled SYSTEM AND METHODS FOR GENERATING A GIFT LIST OF ITEMS, MANAGING THE LIST AND SHARING ONE OR MORE ITEMS, the entire disclosure of which is hereby incorporated by reference, in its entirety.

The invention claimed is:

1. A system of a plurality of computing devices comprising a web-enabled computing device in communication with a plurality of computer server systems via an internet, wherein the plurality of computer server systems comprise: a central hub server system of one or more servers and at least one retailer server system having information stored and configured to be communicated therefrom based upon an instruction received from the central hub server system, wherein the information stored on the at least one retailer server system is information about a plurality of products offered by a retailer including item descriptions, at least one product identifier, product pricing information, and a photograph of the product, and wherein the web-enabled computing device further comprises: a touch sensitive display screen; one or more processors; a non-transitory memory; and a program, and wherein the program is configured to be executed by the one or more processors, the program including instructions for:

displaying a login screen of the program on the touch sensitive display screen of the web-enabled computing device whereby a gift requester may login to use the program;

displaying a home screen allowing linking to different functions including an add item instruction set, a shop friend's items instruction set and a list management instruction set;

wherein activation of the add item instruction set is accomplished by the gift requester touching the touch sensitive display screen of the web-enabled computing device on the home screen corresponding to activation instructions for the add item instruction set; wherein activation of the list management instruction set is accomplished by the gift requester touching the touch sensitive display screen of the web-enabled computing device on the home screen corresponding to the activation instructions for the an item management instruction set; and wherein activation of the shop friend's items instruction set is accomplished by the gift requester touching the touch sensitive display screen of the web-enabled computing device on the home screen corresponding to the activation instructions for the shop friend's items instruction set;

adding an item to a list of products on a gift item listing shown in response to activation of the list management instructions by the gift requester:

activating the add item management instruction set;

inputting product data chosen from the group consisting of: (1) at least one keyword into a keyword search field and (2) a product identifier, wherein the product identifier is input by the gift requester using an input receiving device of the web-enabled computing device to intake visual, audio, or visual and audio input and associate the product identifier with a particular product;

wherein the product data is transmitted to the central hub server system and to the at least one retailer server system where one of the at least one retailer server system thereafter transmits to the central hub server system at least one product corresponding to the product data inputted by the gift requester and to the web-enabled computing device;

wherein a geographic data regarding the location of a user is used to display one or more particular retailer or vendor identifier to the user wherein at least one of the displayed one or more particular retailer or vendor identifier corresponds to the retailer or vendor where the product data was transmitted to the central hub server system from and the user selects the retailer or vendor where the product data was transmitted to the central hub server system from and a name of the user selected retailer or vendor where the product data was transmitted to the central hub server system from is automatically added to the gift item being added to the list of products on the gift item listing;

the gift requester adds a gift item to a displayed list of products on the gift item listing;

sharing one or more shared items that include purchased or unpurchased items desired by the gift requester, with a user of the program via the central hub server system wherein the sharing causes only unpurchased items to be displayed to the user of the program when the user activates the shop friend's items instruction set;

the user views individual unpurchased items;

the user purchases the unpurchased item for the gift requester using the program to access at least one retailer server system to purchase the unpurchased item from within the program and wherein the at least one retailer server system's display within the program to the user includes at least a description or depiction of the unpurchased item and an ability to make a credit card or other secure online transaction to complete the purchase of the unpurchased item from an online retailer while within the program resulting in that the unpurchased item that is purchased by the user becoming a purchased item in the gift requester's displayed list of products at a time set and inputted by the user using an input prompt after a time the unpurchased item is purchased where the time set and inputted by the user using the input prompt is selectable between a date in the future and immediately;

wherein after the user purchases the unpurchased item from the online retailer a displayed list of the gift receipient's purchased items with a future notification date is removed from a displayed list of any other non-purchasing user the gift requester shared the same item with previously using the program without the gift requester being notified; and wherein a gift management instruction set allows the gift requester to determine the items to be purchased for display and selection by individual users.

2. The system of a plurality of computing devices of claim 1, wherein the program, using a geographic location of the web-enabled computing device, notifies a user when the user is within a distance of an identified retailer where at least one gift item was added to the gift item listing by the gift requester.

3. The system of a plurality of computing devices of claim 2 wherein the product identifier is a UPC code; the web-enabled computing device is a computer system that is a mobile computer system with a touch sensitive display and the input receiving device is a camera of the mobile computer system that scans the UPC code of a product and wherein at least one item of the gift item listing further comprises at least one tag associated with the at least one item and including at least one piece of information chosen from the group consisting of: date information for a birthday, date information for a holiday, a name of a person for which the item will be a gift, and combinations thereof and wherein the tag is visually displayed to the user who is purchasing the tagged item shared with the user by the gift requester when the user views the display of the tagged item using the program, which is a mobile application prior to purchasing the item.

4. The system of a plurality of computing devices of claim 1, wherein the product identifier is a UPC code; the web-enabled computing device is a computer system that is a mobile computer system with a touch sensitive display and the input receiving device is a camera of the mobile computer system configured to scan the UPC code of a product and wherein at least one item of the gift item listing further comprises at least one displayed tag associated with an item to form a tagged item within the gift item listing and wherein the tag includes at least one piece of information chosen from the group consisting of: date information for a birthday, date information for a holiday, a name of a person for which the item will be a gift, and combinations thereof and wherein the tag is visually displayed to the user who is purchasing the tagged item shared with the user by the gift requester when the user views the display of the tagged item using the program, which is a mobile application, prior to purchasing the item and wherein the mobile application displays a plurality of dates between a date in the future and immediately for the user to input the time the unpurchased item is purchased, at a time set and inputted by the user using an input prompt after the time the unpurchased item is purchased where the time set and inputted by the user using the input prompt is selectable between a date in the future and immediately.

5. The system of a plurality of computing devices of claim 1, wherein the at least one retailer server system comprises a plurality of different, independent retailer server systems each corresponding to an online retailer or a retailer having brick and mortar stores open to the public.

6. The system of a plurality of computing devices of claim 5, wherein the web-enabled computing device is a mobile computing device with a touch sensitive display and at least one camera configured to read a product identifier wherein the product identifies is a UPC code or a QR code and wherein the gift requester's list of items comprise a tagged item having at least one tag of information associated therewith and presented to the user when the tagged item is viewed by the user prior to purchasing the tagged item using the program.

7. The system of a plurality of computing devices of claim 1, wherein the web-enabled computing device is a mobile computing device with a touch sensitive display and at least one camera configured to read a product identifier wherein the product identifies is a UPC code and wherein the product identifier is input at a retail location by the gift requester using the at least one camera of the mobile computing device to scan the UPC code of a retail item at the retail location and wherein the gift requester's list of items comprise a tagged item having at least one tag of information associated therewith and presented to the user when the tagged item is viewed by the user prior to purchasing the tagged item using the program.

8. The system of a plurality of computing devices of claim 1, wherein the program further includes a suggest items instruction set that, when executed, allows a purchasing user to suggest a product of potential interest to a gift requester via the central server system and cause a notification of the suggested item to be displayed on the touch sensitive screen of the gift requester's web-enabled computing device.

9. The system of a plurality of computing devices of claim 8, wherein a suggested items instruction set displays the suggested item to the gift requester and displays information to the gift requester related to the suggested item as well as a link to add the suggested item to the gift requester's displayed list of products on the gift requester's gift item listing or reject an addition of the suggested item to the gift requester's displayed list of products on the gift requester's gift item listing and notifying the purchasing user of the addition or rejection of the suggested item.

10. The system of a plurality of computing devices of claim 1, wherein the user activates the add item instruction set; and prompts the user to input product data chosen from the group consisting of: (1) at least one keyword into a keyword search field and (2) a product identifier, wherein the product identifier is added input by the user using an input receiving device of the web-enabled computing device to intake visual, audio, or visual and audio input and associate the product identifier with a particular product; wherein the product data is transmitted to the central hub server system and to the at least one retailer server system where one of the at least one retailer server system thereafter transmits to the central hub server system at least one product corresponding to the product data inputted by the user and to the web-enabled computing device; wherein thereafter the user selects one of the at least one products to suggest to a gift recipient thereby defining a suggested product and activates instructions within the web-enabled computing device to suggest the suggested product to the gift recipient who receives a displayed notification on the gift recipient's web-enabled computing device and optionally an audio signal or other indicator; wherein, once the notification is received, the gift recipient indicates a positive acceptance or negative indication using the gift recipient's web-enabled computing device and thereby automatically adding, upon a positive acceptance, the suggested product to the gift recipient's gift item listing and automatically sharing the suggested item and providing notification of the positive acceptance to the user who originally suggested the suggested item or whether that item was declined by the gift requester to be added to the gift requester's gift item listing.

11. The system of a plurality of computing devices of claim 10, wherein the web-enabled computing device is a mobile computer system and one or more low-energy wireless transmitters are positioned within a retail store and the one or more low-energy transmitters are configured to communicate with the mobile computer system after the mobile computer system has crossed a perimeter of an area around one of the one or more low-energy wireless transmitters and away from the perimeter by a minimum predefined distance for a predetermined amount of time before initiating a notification to be displayed by the program.

12. The system of a plurality of computing devices of claim 1, wherein the product identifier is a UPC code; the web-enabled computing device is a computer system that is a mobile computer system with a touch sensitive display and the input receiving device is a camera of the mobile computer system that scans the UPC code of a product and the system further comprises a plurality of wireless low-energy transmitters that transmit around an area around each of the plurality of wireless low-energy transmitters and the plurality of wireless low-energy transmitters are configured to communicate with the mobile computer system after the mobile computer system has crossed a perimeter of the area around at least one of the plurality of wireless low-energy transmitters and moved away from the perimeter by a minimum predefined distance for a predetermined amount of time before initiating a notification to be displayed by the program of an item that the gift requester may want to add to the gift item listing.

13. A computing system employing a plurality of mobile computing devices each having non-transitory computer readable medium storing one or more programs, wherein the one or more programs comprise a mobile application, when executed by a processor of a mobile computing device of the computing system, executes the steps comprising:

displaying a GUI with a login screen of the mobile application on the mobile computing device of a gift requester, whereby a gift requester may login to use the mobile application;

displaying a home screen linking to different functions including an add item instruction set, a shop friend's items instruction set and a list management instruction set, wherein activation of the add item instruction set is accomplished by the gift requester touching a touch screen display of the mobile computing device on the home screen corresponding to activation instructions for the add item instruction set; wherein activation of the a list management instruction set is accomplished by the gift requester touching the touch screen display of the mobile computing device on the home screen corresponding to the activation instructions for the a item management instruction set; wherein activation of the shop friend's items instruction set is accomplished by the gift requester touching the touch screen display of the mobile computing device on the home screen corresponding to the activation instructions for the shop friend's items instruction set, wherein products from one or more companies are added;

adding an item to a displayed list of one or more gift items listing shown in response to the instructions for the list management instructions being activated by a gift requester wherein the one or more programs provide at least two ways to add items to the displayed list of one or more gift items listing wherein the at least two ways include: (1) the gift requester activating the add item instruction and the gift requester inputting data chosen from the group comprising at least one keyword into a keyword search field and a product identifier such that the mobile application uses a retailer server system to provide a display of possible corresponding products for the gift requester to select and by selecting a possible corresponding product add the selected possible corresponding product to the displayed list of one or more gift items listing of the gift requester and wherein the product identifier is added using an input receiving device which intakes visual, audio or visual and audio input and wherein the mobile computing device displays a name of a retailer where the product identifier is added to the input receiving device and where the retailer is identified based upon a geographic location of where the product was added to the input receiving device and the name of the retailer is automatically added to the gift item being added to the displayed list of one or more gift items; and (2) the gift requester receiving a displayed notification of a suggested item from a suggesting user other than the gift requester and the gift requester indicating a positive acceptance of the suggested item to the displayed list of one or more gift items listing by submitting positive acceptance input in response to the notification using the touch screen display of the mobile computing device and thereby automatically adding the suggested item from the suggesting user other than the gift requester to the displayed list of one or more gift items listing of the gift requester and providing notification of the positive acceptance to the suggesting user other than the gift requester and automating sharing the suggested item with the suggesting user other than the gift requester;

sharing one or more desired items from the displayed list of one or more gift items desired by the gift requester with a first other user of the mobile application and a second other user of the mobile application wherein only unpurchased items to be displayed to the first other user of the mobile application and the second other user of the mobile application are displayed in response to the first other user of the mobile application or the second other user of the mobile application activating the shop friend's items instruction set, wherein the first other user of the mobile application views individual unpurchased items and, prior to the second other user of the mobile application purchasing an unpurchased item, the first other user of mobile application purchases the unpurchased item for the gift requester using the program to access an online retailer's website where the wherein the unpurchased item that is purchased by a shop friend becomes a purchased item;

wherein a gift management instruction set allows the gift requester to establish different lists of unpurchased items to be displayed for purchase to each individual user other than the gift requester from a single master listing of the one or more gift items desired by the gift requester; and wherein the individual user purchases an unpurchased item for the gift requester from an individual user's list of unpurchased items shared with the individual user via the mobile application by the gift requester by accessing an online retailer server system to purchase the unpurchased item from within the mobile application and wherein the online retailer server system's display within the mobile application to the individual user includes at least a description or depiction of the unpurchased item and an ability to make a credit card or other secure online transaction to complete the purchase of the unpurchased item from an online retailer while within the mobile application; and the individual user who purchased the unpurchased item establishes a time when the gift requester may see when an unpurchased item has been purchased wherein the time is set by the individual user who purchases the unpurchased item after the unpurchased item is purchased based upon an input display that presents a plurality of different times and wherein purchased items remain listed as unpurchased items in the gift requester's displayed list of one or more gift items listing until after a time set by the individual user who purchases the unpurchased item as passed.

14. The computing system of claim 13, wherein at least one item of the displayed list of one or more gift items listing further comprises at least one tag of information associated with the at least one item and including at least one piece of information chosen from the group consisting of: date information for a birthday, date information for a holiday, a name of a person for which the item will be a gift, and combinations thereof.

15. The computing system of claim 14, wherein the product identifier is a UPC code; the mobile computing device is a mobile computer system with a touch sensitive display and the input receiving device is a camera of the mobile computer system that scans the UPC code of a product, wherein the UPC code is transmitted to a plurality of retailers each having a retail server system and a listing of potential items received from at least one of the corresponding to the UPC code scanned by the camera is presented to the gift requester prior to selecting one of the listing of potential items for addition to the gift.

16. The computing system of claim 13, wherein the product identifier is a UPC code; the mobile computing device is a computer system that is a mobile computer system with a touch sensitive display and the input receiving device is a camera of the mobile computer system that scans the UPC code of a product and wherein at least one item of the gift item listing further includes the name of an identified retailer where at least one gift item was added to the gift item listing by the gift requester where the identified retailer is identified based upon the geographic location of where a particular product was added to the gift requester's gift item listing; and wherein the one or more programs, using the geographic location of the mobile computing device, notifies a user via the user's mobile computing device when the user is within a distance of the identified retailer where the at least one gift item was added to the gift item listing by the gift requester.

17. The computing system of claim 13, wherein the program further includes a suggest items instruction set that, when executed, allows a suggesting user to suggest a suggested product of potential interest to a gift requester via a central server system and display a notification of the suggested item to the gift requester wherein the notification of the suggested item to the gift request further comprises a positive input receiving input on the touch screen display of the gift requester and a negative indicator receiving input on the touch screen display of the gift requester and wherein, upon the gift requester providing positive input the suggested product is automatically added to the gift requester's displayed list of one or more gift items and notification of the positive input is provided to the suggesting user to enable the suggesting user to purchase the suggested item for the gift requester.

18. The computing system of claim 13, wherein the program further includes a suggested items instruction set that displays the suggested item to the gift requester and displays information to the gift requester about the suggested item as well as a link to add the suggested item to the gift requester's displayed list of products on the gift requester's gift item listing or reject an addition of the suggested item to the shop friend's displayed list of products on the shop friend's gift item listing.

* * * * *